US011979912B2

(12) United States Patent
Sarkis et al.

(10) Patent No.: US 11,979,912 B2
(45) Date of Patent: May 7, 2024

(54) SIGNALING OF TRANSMISSION PARAMETERS

(71) Applicant: QUALCOMM Incorporated, San Diego, CA (US)

(72) Inventors: Gabi Sarkis, San Diego, CA (US); Jing Lei, San Diego, CA (US); Alexandros Manolakos, San Diego, CA (US); Alberto Rico Alvarino, San Diego, CA (US); Chih-Ping Li, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/783,149

(22) Filed: Feb. 5, 2020

(65) Prior Publication Data

US 2020/0260499 A1     Aug. 13, 2020

(30) Foreign Application Priority Data

Feb. 7, 2019    (GR) .............................. 20190100065

(51) Int. Cl.
*H04W 74/08*      (2009.01)
*H04L 5/00*       (2006.01)
(Continued)

(52) U.S. Cl.
CPC ....... *H04W 74/0833* (2013.01); *H04L 5/0051* (2013.01); *H04L 5/10* (2013.01);
(Continued)

(58) Field of Classification Search
CPC ......... H04W 74/0833; H04W 56/0045; H04W 74/004; H04W 74/02; H04W 74/0808; H04W 74/006; H04L 5/0051; H04L 5/10
See application file for complete search history.

(56) References Cited

U.S. PATENT DOCUMENTS 9,674,796 B2 *  6/2017  Nan .................... H04W 52/362
11,202,282 B2   12/2021  Chen et al.
(Continued)

FOREIGN PATENT DOCUMENTS

RU         2641666 C1      1/2018
WO     WO-2017105802      6/2017
(Continued)

OTHER PUBLICATIONS

International Search Report and Written Opinion—PCT/US2020/016985—ISA/EPO—dated Aug. 25, 2020 (190822WO).
(Continued)

*Primary Examiner* — Ajit Patel
*Assistant Examiner* — Wilfred Thomas
(74) *Attorney, Agent, or Firm* — Holland & Hart LLP

(57) ABSTRACT

Methods, systems, and devices for wireless communications are described. A user equipment (UE) may use easily detectable transmission parameters to infer difficult-to-detect parameters for communications with a base station. For example, the base station may provide the UE with multiple sets of transmission parameters, and the UE 115 may choose from among these sets of transmission parameters for the communications. In some cases, the UE may be configured with a reference set of transmission parameters, receive one or more transmission parameters that are different relative to the reference set of transmission parameters, and then determine to use the different transmission parameters for the communications. Additionally or alternatively, the multiple sets of transmission parameters may be specified for a certain uplink message (e.g., random access channel messages), where the UE selects the transmission parameter set based on one or more characteristics of the uplink message.

47 Claims, 20 Drawing Sheets

(51) Int. Cl.
*H04L 5/10* (2006.01)
*H04W 56/00* (2009.01)
*H04W 74/00* (2009.01)
*H04W 74/02* (2009.01)
*H04W 74/0808* (2024.01)
*H04W 74/0833* (2024.01)

(52) U.S. Cl.
CPC ..... *H04W 56/0045* (2013.01); *H04W 74/004* (2013.01); *H04W 74/02* (2013.01); *H04W 74/0808* (2013.01)

(56) References Cited

U.S. PATENT DOCUMENTS

| | | | | |
|---|---|---|---|---|
| 11,432,332 | B2* | 8/2022 | Rico Alvarino | H04L 5/0094 |
| 2014/0086176 | A1 | 3/2014 | Liu et al. | |
| 2014/0226614 | A1* | 8/2014 | Kato | H04L 5/0094 |
| | | | | 370/329 |
| 2016/0301515 | A1* | 10/2016 | Ouchi | H04W 72/0446 |
| 2017/0310447 | A1* | 10/2017 | Kusashima | H04W 72/0406 |
| 2018/0020441 | A1* | 1/2018 | Lo | H04W 76/14 |
| 2018/0049249 | A1* | 2/2018 | Li | H04L 5/0005 |
| 2018/0176961 | A1 | 6/2018 | Babaei et al. | |
| 2019/0053120 | A1* | 2/2019 | Park | H04W 76/27 |
| 2019/0053183 | A1* | 2/2019 | Park | H04L 5/0092 |
| 2019/0053271 | A1* | 2/2019 | Islam | H04W 74/0866 |
| 2019/0104554 | A1* | 4/2019 | Amuru | H04W 72/042 |
| 2019/0373642 | A1* | 12/2019 | Suzuki | H04L 5/0051 |
| 2020/0252972 | A1* | 8/2020 | Rico Alvarino | H04L 5/0053 |
| 2020/0260499 | A1* | 8/2020 | Sarkis | H04W 56/0045 |
| 2020/0288502 | A1* | 9/2020 | Lee | H04W 74/0833 |
| 2020/0305187 | A1* | 9/2020 | Takeda | H04W 28/18 |
| 2020/0367079 | A1* | 11/2020 | Chen | H04W 24/08 |
| 2020/0389879 | A1* | 12/2020 | Zhang | H04L 5/0092 |
| 2021/0076445 | A1* | 3/2021 | Tsai | H04W 76/19 |
| 2022/0039138 | A1* | 2/2022 | Takeda | H04L 5/0053 |
| 2022/0110160 | A1* | 4/2022 | Takeda | H04L 5/0053 |
| 2022/0132576 | A1* | 4/2022 | Maeder | H04W 74/006 |

FOREIGN PATENT DOCUMENTS

| | | |
|---|---|---|
| WO | 2018124030 A1 | 7/2018 |
| WO | WO-2018135640 A1 | 7/2018 |
| WO | WO-2018136300 A1 | 7/2018 |
| WO | WO-2018175809 A1 | 9/2018 |
| WO | WO-2018177262 A1 | 10/2018 |
| WO | 2018200779 A1 | 11/2018 |

OTHER PUBLICATIONS

Nokia, et al., "On 2-step Random Access Procedure", 3GPP Draft, 3GPP TSG RAN WG1 Ad-Hoc Meeting 1901, R1-1901192 on 2-step Random Access Procedure, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 11, 2019 (Jan. 11, 2019), XP051576722, 7 Pages, Retrieved from the Internet: URL: http://www.3gpp.org/ftp/tsg%5Fran/WG1%5FRL1/TSGR1%5FAH/ NR%5FAH%5F1901/Docs/R1%2D1901192%2Ezip, [retrieved on Jan. 11, 2019], Section "2.3 Resource and Link Parameter Configuration".

Partial International Search Report—PCT/US2020/016985—ISAEPO—dated Jun. 9, 2020 (190822WO).

Qualcomm Incorporated: "Report of Email Discussion [103#55] [NR-U] 2-step RACH Model and Initial Information Contents (Qualcomm)", 3GPP Draft, 3GPP TSG-RAN WG2 Meeting #103bis, R2-1815564_Report_Email_Disscussion_NRU_2Step, 3rd Generation Partnership Project (3GPP), Mobile Competence Centre, 650, Route Des Lucioles, F-06921, Sophia-Antipolis Cedex, France, vol. RAN WG2, No. Chengdu, China, Oct. 8, 2012-Oct. 12, 2018, Oct. 12, 2018 (Oct. 12, 2018), XP051524883, 17 pages, Retrieved from the Internet: URL:http://www.3gpp.org/ftp/tsg%5Fran/WG2%5FRL2/ TSGR2%5F103bis/Docs/R2%2D1815564%2Ezip [retrieved on Oct. 12, 2018], section 1 "Introduction", section 2 "Discussion", Question 2, section 2 "Discussion", Question 9, Question 7 and subsequent answers;p. 12-p. 13.

Taiwan Search Report—TW109103853—TIPO—dated Jun. 8, 2023 (190822TW).

Mediatek Inc: "On UCI Encoding", 3GPP TSG RAN WG1 RAN1 Meeting AH#1801, R1-1801091, Vancouver, Canada, Jan. 22-26, 2018, 6 Pages.

Qualcomm Incorporated: "Procedures Related to NOMA", 3GPP Draft, 3GPP TSG RAN WG1 Meeting #95, R1-1813407, Procedures Related to NOMA, 3rd Generation Partnership Project (3GPP), Mobile Competence Centre, 650, Route Des Lucioles, F-06921 Sophia-Antipolis Cedex, France, vol. RAN WG1. No. Spokane, USA, Nov. 12, 2018-Nov. 16, 2018, Nov. 11, 2018, XP051555446, pp. 1-9, Paragraph [0005]-Paragraph [0006], Paragraph [0001], Paragraph [02.2], Paragraph [0005], Paragraph [0004].

Samsung: "Procedures Related Consideration to Noma", 3GPP TSG RAN WG1 Meeting #95, R1-1812968, Spokane, USA, Nov. 12-16, 2018, 5 Pages.

Sierra Wireless: "NOMA Procedure Considerations", 3GPP TSG RAN WG1 Meeting #95, R1-1812721, Spokane, USA, Nov. 12-16, 2018, 6 Pages.

VIVO: "Discussion on NOMA Procedures", 3GPP TSG RAN WG1 Meeting #95, R1-1812295, Spokane, USA, Nov. 12-16, 2018, 4 Pages.

ZTE: "Procedures Related to Noma", 3GPP TSG RAN WG1 Meeting #94, R1-1808153, Gothenburg, Sweden, Aug. 20-24, 2018, 8 Pages.

* cited by examiner

SIGNALING OF TRANSMISSION PARAMETERS

CROSS REFERENCE

The present Application for Patent claims the benefit of Greece Provisional Patent Application No. 20190100065 by SARKIS, et al., entitled "SIGNALING OF TRANSMISSION PARAMETERS," filed Feb. 7, 2019, assigned to the assignee hereof, and expressly incorporated herein.

BACKGROUND

The following relates generally to wireless communications, and more specifically to signaling of transmission parameters.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE may transmit one or more uplink messages to a base station and receive one or more downlink messages from the base station as part of ongoing communications. For example, in terms of the uplink messages, the UE may transmit uplink messages dynamically based on control information received from the base station, based on configured grants received from the base station, as part of a random access procedure with the base station, or a combination thereof. Each of these uplink messages may be transmitted according to one or more transmission parameters as indicated by the base station. However, some of the transmission parameters may be difficult to detect or require additional signaling for the UE to receive all the necessary transmission parameters. Efficient techniques are desired for signaling and determining transmission parameters to be used for one or more uplink messages.

SUMMARY

The described techniques relate to improved methods, systems, devices, and apparatuses that support signaling of transmission parameters. Generally, the described techniques provide for a base station to signal a reference uplink grant configuration to a UE, where the reference uplink grant configuration includes a set of transmission parameters for the UE to use for subsequent communications with the base station. In some cases, the base station may indicate one or more transmission parameters to the UE that are different than corresponding transmission parameters in the reference uplink grant configuration. The UE may then determine to use these one or more different transmission parameters and communicate with the base station according to the different transmission parameters. The base station may signal the reference uplink grant configuration based on a specific configuration index when indicating the one or more different transmission parameters that corresponds to the reference uplink grant configuration, via a field that indicates the reference uplink grant configuration is a reference configuration for any different transmission parameters that are indicated to the UE, via a dedicated reference configuration, or via a configured uplink grant and indicating the one or more different transmission parameters through dependent uplink configurations. Additionally, the base station may modify, deactivate, or perform similar actions that reconfigure or deactivate the reference uplink grant configuration at the UE. In some cases, the base station may indicate a set of uplink grant configurations to the UE, and the UE may select one of the set of uplink grant configurations based on the one or more different transmission parameters indicated by the base station.

Additionally or alternatively, the base station may transmit one or more transmission parameter sets that the UE may use for a random access channel (RACH) procedure. The UE may then select one of the transmission parameter sets and transmit a RACH message using the selected transmission parameter set. In some cases, the UE may select the transmission parameter set based on a purpose for the RACH procedure (e.g., initial access, radio resource control (RRC) resume, timing advance refresh, etc.), whether the RACH procedure is contention-based or contention-free, whether uplink control information (UCI) is to be included with the RACH message, or a combination thereof. Additionally, the UE may receive a dual connectivity (DC) configuration, select the transmission parameter set based on communicating with a primary cell (PCell) or secondary cell (SCell) of the DC configuration, and transmit the RACH message to the appropriate cell using the selected transmission parameter set. In some cases, the UE may also receive a timing advance parameter and an alignment timer from the base station, where the UE transmits the RACH message based on when the alignment timer expires.

EXAMPLE 1

A method of wireless communications at a UE is described. The method may include: identifying, at the UE, a reference uplink grant configuration including a set of reference transmission parameters for subsequent communications within a single bandwidth part (BWP); receiving, at the UE, at least one transmission parameter that is different from a corresponding transmission parameter of the set of reference transmission parameters in the reference uplink grant configuration; determining to use the at least one transmission parameter instead of the corresponding transmission parameter of the set of reference transmission parameters for the subsequent communications within the single BWP' and communicating using the at least one transmission parameter.

EXAMPLE 2

An apparatus for wireless communications at a UE is described. The apparatus may include a processor, memory coupled with the processor, and instructions stored in the memory. The instructions may be executable by the processor to cause the apparatus to: identify, at the UE, a reference uplink grant configuration including a set of reference transmission parameters for subsequent communications within a single BWP; receive, at the UE, at least one transmission parameter that is different from a corresponding transmission parameter of the set of reference transmission parameters in the reference uplink grant configuration; determine to use the at least one transmission parameter instead of the corresponding transmission parameter of the set of reference transmission parameters for the subsequent communications within the single BWP; and communicate using the at least one transmission parameter.

EXAMPLE 3

Another apparatus for wireless communications at a UE is described. The apparatus may include: means for identifying, at the UE, a reference uplink grant configuration including a set of reference transmission parameters for subsequent communications within a single BWP; receiving, at the UE, at least one transmission parameter that is different from a corresponding transmission parameter of the set of reference transmission parameters in the reference uplink grant configuration; determining to use the at least one transmission parameter instead of the corresponding transmission parameter of the set of reference transmission parameters for the subsequent communications within the single BWP; and communicating using the at least one transmission parameter.

EXAMPLE 4

A non-transitory computer-readable medium storing code for wireless communications at a UE is described. The code may include instructions executable by a processor to: identify, at the UE, a reference uplink grant configuration including a set of reference transmission parameters for subsequent communications within a single BWP; receive, at the UE, at least one transmission parameter that is different from a corresponding transmission parameter of the set of reference transmission parameters in the reference uplink grant configuration; determine to use the at least one transmission parameter instead of the corresponding transmission parameter of the set of reference transmission parameters for the subsequent communications within the single BWP; and communicate using the at least one transmission parameter.

EXAMPLE 5

In some examples of the method, apparatuses, and non-transitory computer-readable medium described herein, identifying the reference uplink grant configuration may include operations, features, means, or instructions for receiving one or more reference uplink grant configurations with a reference configuration index for each reference uplink grant configuration, where the at least one transmission parameter indicates one reference configuration index for determining to use the at least one transmission parameter instead of the corresponding transmission parameter of the set of reference transmission parameters.

EXAMPLE 6

In some examples of the method, apparatuses, and non-transitory computer-readable medium described herein, identifying the reference uplink grant configuration may include operations, features, means, or instructions for receiving the reference uplink grant configuration with a field that indicates the reference uplink grant configuration may be used for determining to use the at least one transmission parameter instead of the corresponding transmission parameter of the set of reference transmission parameters after the reference uplink grant configuration may be received.

EXAMPLE 7

In some examples of the method, apparatuses, and non-transitory computer-readable medium described herein, identifying the reference uplink grant configuration may include operations, features, means, or instructions for receiving a dedicated reference uplink configuration, where the at least one transmission parameter may be determined to be used instead of a corresponding transmission parameter based on the dedicated uplink configuration; and activating a type one or a type two configured grant based on a higher-layer configured uplink grant in the dedicated reference uplink configuration.

EXAMPLE 8

In some examples of the method, apparatuses, and non-transitory computer-readable medium described herein, the dedicated reference uplink configuration may include operations, features, means, or instructions for receiving an uplink grant configuration for the subsequent communications, where the uplink grant configuration includes the higher-layer configured uplink grant with no transmission parameters; and activating the type two configured grant based on receiving the higher-layer configured uplink grant with no transmission parameters.

EXAMPLE 9

Some examples of the method, apparatuses, and non-transitory computer-readable medium described herein may further include operations, features, means, or instructions for receiving an uplink grant configuration for the subsequent communications, where the uplink grant configuration includes the higher-layer configured uplink grant; and activating the type one configured grant based on receiving the higher-layer configured uplink grant.

EXAMPLE 10

In some examples of the method, apparatuses, and non-transitory computer-readable medium described herein, identifying the reference uplink grant configuration may include operations, features, means, or instructions for receiving a configured uplink grant including the reference uplink grant configuration; and receiving, in a dependent uplink configuration, the at least one transmission parameter that may be different from the corresponding transmission parameter of the set of reference transmission parameters in the reference uplink grant configuration.

EXAMPLE 11

Some examples of the method, apparatuses, and non-transitory computer-readable medium described herein may further include operations, features, means, or instructions for receiving a modification to the reference uplink grant configuration, determining whether to apply the modification to the at least one transmission parameter that may be different from the corresponding transmission parameter of the set of reference transmission parameters in the reference uplink grant configuration; and modifying the at least one transmission parameter based on the determination.

EXAMPLE 12

Some examples of the method, apparatuses, and non-transitory computer-readable medium described herein may further include operations, features, means, or instructions for deactivating the at least one transmission parameter, the reference uplink grant configuration, or a combination thereof based on receiving the modification.

EXAMPLE 13

Some examples of the method, apparatuses, and non-transitory computer-readable medium described herein may further include operations, features, means, or instructions for reconfiguring the at least one transmission parameter based on receiving the modification.

EXAMPLE 14

Some examples of the method, apparatuses, and non-transitory computer-readable medium described herein may further include operations, features, means, or instructions for receiving an indication to deactivate the reference uplink grant configuration; determining whether to deactivate the at least one transmission parameter; and deactivating the at least one transmission parameter based on the determination.

EXAMPLE 15

Some examples of the method, apparatuses, and non-transitory computer-readable medium described herein may further include operations, features, means, or instructions for combining the at least one transmission parameter and the reference set of transmission parameters based on receiving the indication to deactivate the reference uplink grant configuration; and communicating using the combination of the at least one transmission parameter and the reference set of transmission parameters.

EXAMPLE 16

Some examples of the method, apparatuses, and non-transitory computer-readable medium described herein may further include operations, features, means, or instructions for receiving the reference uplink grant configuration including the set of reference transmission parameters; determining a difference between the at least one transmission parameter and the set of reference transmission parameters; identifying an additional transmission parameter based on the determined difference; and communicating using the additional transmission parameter and the at least one transmission parameter.

EXAMPLE 17

In some examples of the method, apparatuses, and non-transitory computer-readable medium described herein, identifying the reference uplink grant configuration may include operations, features, means, or instructions for receiving an uplink grant configuration, where the uplink grant configuration includes a set of configured uplink grants; and selecting one of the set of configured uplink grants from the uplink grant configuration based on an indication received with the at least one transmission parameter.

EXAMPLE 18

In some examples of the method, apparatuses, and non-transitory computer-readable medium described herein, identifying the reference uplink grant configuration may include operations, features, means, or instructions for receiving a set of uplink grant configurations, where each of the set of uplink grant configurations includes one of a set of configured uplink grants; and selecting one of the set of configured uplink grants from the set of uplink grant configurations based on an indication received with on the at least one transmission parameter.

EXAMPLE 19

In some examples of the method, apparatuses, and non-transitory computer-readable medium described herein, determining to use the at least one transmission parameter instead of the corresponding transmission parameter of the set of reference transmission parameters may include operations, features, means, or instructions for identifying a frequency allocation parameter associated with the at least one transmission parameter, where the at least one transmission parameter may be used instead of the corresponding transmission parameter of the set of reference transmission parameters for a portion of the single BWP based on the frequency allocation parameter.

EXAMPLE 20

In some examples of the method, apparatuses, and non-transitory computer-readable medium described herein, determining to use the at least one transmission parameter instead of the corresponding transmission parameter of the set of reference transmission parameters may include operations, features, means, or instructions for identifying a demodulation reference signal (DMRS) parameter with the at least one transmission parameter, where the at least one transmission parameter may be used instead of the corresponding transmission parameter of the set of reference transmission parameters for a portion of the single BWP based on the DMRS parameter.

EXAMPLE 22

In some examples of the method, apparatuses, and non-transitory computer-readable medium described herein, the reference uplink grant configuration includes at least one of a modulation and coding scheme (MCS), a transport block size (TBS), power control parameters, spreading factor for non-orthogonal multiple access (NOMA), or a combination thereof.

EXAMPLE 23

In some examples of the method, apparatuses, and non-transitory computer-readable medium described herein, the reference uplink grant configuration may be identified via RRC signaling, system information block (SIB) transmissions, or specified configurations for the UE.

EXAMPLE 24

In some examples of the method, apparatuses, and non-transitory computer-readable medium described herein, the at least one transmission parameter that may be different than the corresponding transmission parameter of the set of reference signals includes a time resource allocation, a frequency resource allocation, a DMRS port, a DMRS scrambling seed, a DMRS seed identification, a DMRS physical uplink shared channel (PUSCH) rate matching parameter, a traffic to pilot ratio, or a combination thereof.

EXAMPLE 25

A method of wireless communications at a UE is described. The method may include receiving, at the UE, a set of transmission parameter sets for a RACH procedure, each of the set of transmission parameter sets differing by at least one transmission parameter; selecting, at the UE, a set of transmission parameters from the set of transmission parameter sets for transmitting a RACH message of the RACH procedure; and transmitting, to a base station, the RACH message using the selected set of transmission parameters.

EXAMPLE 26

An apparatus for wireless communications at a UE is described. The apparatus may include a processor, memory coupled with the processor, and instructions stored in the memory. The instructions may be executable by the processor to cause the apparatus to receive, at the UE, a set of transmission parameter sets for a RACH procedure, each of the set of transmission parameter sets differing by at least one transmission parameter; select, at the UE, a set of transmission parameters from the set of transmission parameter sets for transmitting a RACH message of the RACH procedure; and transmit, to a base station, the RACH message using the selected set of transmission parameters.

EXAMPLE 27

Another apparatus for wireless communications at a UE is described. The apparatus may include means for receiving, at the UE, a set of transmission parameter sets for a RACH procedure, each of the set of transmission parameter sets differing by at least one transmission parameter; selecting, at the UE, a set of transmission parameters from the set of transmission parameter sets for transmitting a RACH message of the RACH procedure; and transmitting, to a base station, the RACH message using the selected set of transmission parameters.

EXAMPLE 28

A non-transitory computer-readable medium storing code for wireless communications at a UE is described. The code may include instructions executable by a processor to receive, at the UE, a set of transmission parameter sets for a RACH procedure, each of the set of transmission parameter sets differing by at least one transmission parameter; select, at the UE, a set of transmission parameters from the set of transmission parameter sets for transmitting a RACH message of the RACH procedure; and transmit, to a base station, the RACH message using the selected set of transmission parameters.

EXAMPLE 29

In some examples of the method, apparatuses, and non-transitory computer-readable medium described herein, selecting the set of transmission parameters may include operations, features, means, or instructions for identifying a purpose of the RACH procedure; and selecting the set of transmission parameters based on the identified purpose.

EXAMPLE 30

In some examples of the method, apparatuses, and non-transitory computer-readable medium described herein, the purpose of the RACH procedure includes at least one of an initial access procedure, an RRC resume procedure, a timing advance refresh procedure, or a combination thereof.

EXAMPLE 31

In some examples of the method, apparatuses, and non-transitory computer-readable medium described herein, selecting the set of transmission parameters may include operations, features, means, or instructions for identifying if the RACH procedure may be contention based or contention free, and selecting the set of transmission parameters based on the identified contention based or contention free RACH procedure.

EXAMPLE 32

In some examples of the method, apparatuses, and non-transitory computer-readable medium described herein, selecting the set of transmission parameters may include operations, features, means, or instructions for identifying UCI to be transmitted in the RACH message; and selecting the set of transmission parameters based on transmitting the UCI, whether the UCI may be carried on a PUSCH or a PUCCH, a format of the PUCCH used to carry the UCI, a modulation order of the UCI, a size of the UCI, or a combination thereof.

EXAMPLE 33

Some examples of the method, apparatuses, and non-transitory computer-readable medium described herein may further include operations, features, means, or instructions for receiving a configuration for DC communications with a PCell and a SCell, selecting the PCell or the SCell for the RACH procedure; selecting the set of transmission parameters for transmission of the RACH message based on which of the PCell or the SCell may be selected; and transmitting the RACH message to the selected PCell or SCell using the selected set of transmission parameters.

EXAMPLE 34

In some examples of the method, apparatuses, and non-transitory computer-readable medium described herein, the PCell or SCell may be selected based on a quality of service, a listen-before-transmit (LBT) outcome, an interference measurement, coverage requirements, or a combination thereof.

EXAMPLE 35

Some examples of the method, apparatuses, and non-transitory computer-readable medium described herein may further include operations, features, means, or instructions for indicating the selected PCell or SCell using a preamble for the RACH message, a DMRS for the RACH message, RACH resources for the RACH message, or a combination thereof.

EXAMPLE 36

Some examples of the method, apparatuses, and non-transitory computer-readable medium described herein may further include operations, features, means, or instructions for receiving a timing advance parameter and an alignment timer; cancelling one or more transmissions based on the timing advance parameter and the alignment timer; and transmitting uplink data with the RACH message after the alignment timer expires.

EXAMPLE 37

Some examples of the method, apparatuses, and non-transitory computer-readable medium described herein may further include operations, features, means, or instructions for receiving a second timer that indicates a time window after the alignment timer expires, where the uplink data may be transmitted with the RACH message within the time window.

EXAMPLE 38

In some examples of the method, apparatuses, and non-transitory computer-readable medium described herein, the RACH procedure includes a two-step RACH procedure.

EXAMPLE 39

In some examples of the method, apparatuses, and non-transitory computer-readable medium described herein, the set of transmission parameter sets for the RACH procedure may be received via RRC signaling, SIB transmissions, or specified configurations for the UE.

EXAMPLE 40

In some examples of the method, apparatuses, and non-transitory computer-readable medium described herein, the at least one transmission parameter includes a RACH preamble for the RACH message, time and frequency resources for the RACH message, DMRS parameters, or a combination thereof.

EXAMPLE 41

A method of wireless communications at a base station is described. The method may include transmitting, to a UE, a reference uplink grant configuration including a set of reference transmission parameters for subsequent communications within a single BWP; transmitting, to the UE, at least one transmission parameter that is different from a corresponding transmission parameter of the set of reference transmission parameters in the reference uplink grant configuration; and communicating, with the UE, using the at least one transmission parameter.

EXAMPLE 42

An apparatus for wireless communications at a base station is described. The apparatus may include a processor, memory coupled with the processor, and instructions stored in the memory. The instructions may be executable by the processor to cause the apparatus to transmit, to a UE, a reference uplink grant configuration including a set of reference transmission parameters for subsequent communications within a single BWP; transmit, to the UE, at least one transmission parameter that is different from a corresponding transmission parameter of the set of reference transmission parameters in the reference uplink grant configuration; and communicate, with the UE, using the at least one transmission parameter.

EXAMPLE 43

Another apparatus for wireless communications at a base station is described. The apparatus may include means for transmitting, to a UE, a reference uplink grant configuration including a set of reference transmission parameters for subsequent communications within a single BWP; transmitting, to the UE, at least one transmission parameter that is different from a corresponding transmission parameter of the set of reference transmission parameters in the reference uplink grant configuration; and communicating, with the UE, using the at least one transmission parameter.

EXAMPLE 44

A non-transitory computer-readable medium storing code for wireless communications at a base station is described. The code may include instructions executable by a processor to transmit, to a UE, a reference uplink grant configuration including a set of reference transmission parameters for subsequent communications within a single BWP; transmit, to the UE, at least one transmission parameter that is different from a corresponding transmission parameter of the set of reference transmission parameters in the reference uplink grant configuration; and communicate, with the UE, using the at least one transmission parameter.

EXAMPLE 45

In some examples of the method, apparatuses, and non-transitory computer-readable medium described herein, transmitting the reference uplink grant configuration may include operations, features, means, or instructions for transmitting one or more reference uplink grant configurations with a reference configuration index for each reference uplink grant configuration, where the at least one transmission parameter includes an indication of one reference configuration index for the UE to identify the at least one transmission parameter that may be different than the corresponding transmission parameter of the set of reference transmission parameters.

EXAMPLE 46

In some examples of the method, apparatuses, and non-transitory computer-readable medium described herein, transmitting the reference uplink grant configuration may include operations, features, means, or instructions for transmitting the reference uplink grant configuration with a field that indicates the reference uplink grant configuration may be used by the UE to identify the at least one transmission parameter instead of the corresponding transmission parameter of the set of reference transmission parameters after the reference uplink grant configuration may be transmitted.

EXAMPLE 47

In some examples of the method, apparatuses, and non-transitory computer-readable medium described herein, transmitting the reference uplink grant configuration may include operations, features, means, or instructions for transmitting a dedicated reference uplink configuration, where the at least one transmission parameter may be identified by the UE to be used instead of a corresponding transmission parameter based on the dedicated uplink configuration.

EXAMPLE 48

Some examples of the method, apparatuses, and non-transitory computer-readable medium described herein may further include operations, features, means, or instructions for transmitting a higher-layer configured uplink grant in the dedicated reference signal, where the higher-layer configured uplink grant activates a type one configured grant for the UE.

EXAMPLE 49

In some examples of the method, apparatuses, and non-transitory computer-readable medium described herein, transmitting the reference uplink grant configuration may include operations, features, means, or instructions for transmitting a configured uplink grant including the reference uplink grant configuration, and transmitting, in a dependent uplink configuration, the at least one transmission parameter that may be different from the corresponding transmission parameter of the set of reference transmission parameters in the reference uplink grant configuration.

EXAMPLE 50

Some examples of the method, apparatuses, and non-transitory computer-readable medium described herein may further include operations, features, means, or instructions for transmitting a modification to the reference uplink grant configuration, and communicating, with the UE, based on the modification.

EXAMPLE 51

Some examples of the method, apparatuses, and non-transitory computer-readable medium described herein may further include operations, features, means, or instructions for reconfiguring the at least one transmission parameter based on the modification; and transmitting, to the UE, the at least one reconfigured transmission parameter.

EXAMPLE 52

Some examples of the method, apparatuses, and non-transitory computer-readable medium described herein may further include operations, features, means, or instructions for receiving an indication to deactivate the reference uplink grant configuration; and communicate, with the UE, based on the indication to deactivate the reference uplink grant configuration.

EXAMPLE 53

Some examples of the method, apparatuses, and non-transitory computer-readable medium described herein may further include operations, features, means, or instructions for transmitting, to the UE, the reference set of transmission parameters, where the subsequent communications may be transmitted based on a difference between the at least one transmission parameter and the reference set of transmission parameters.

EXAMPLE 54

In some examples of the method, apparatuses, and non-transitory computer-readable medium described herein, transmitting the reference uplink grant configuration may include operations, features, means, or instructions for transmitting, to the UE, an uplink grant configuration, where the uplink grant configuration includes the reference uplink grant configuration.

EXAMPLE 55

In some examples of the method, apparatuses, and non-transitory computer-readable medium described herein, transmitting the reference uplink grant configuration may include operations, features, means, or instructions for transmitting a set of uplink grant configurations, where each of the set of uplink grant configurations includes one of a set of reference uplink grant configurations.

EXAMPLE 56

In some examples of the method, apparatuses, and non-transitory computer-readable medium described herein, the reference uplink grant configuration includes at least one of an MCS, a TBS, power control parameters, spreading factor for NOMA, or a combination thereof.

EXAMPLE 57

In some examples of the method, apparatuses, and non-transitory computer-readable medium described herein, the reference uplink grant configuration may be transmitted via RRC signaling, SIB transmissions, or specified configurations for the UE.

EXAMPLE 58

In some examples of the method, apparatuses, and non-transitory computer-readable medium described herein, the at least one transmission parameter that may be different than the corresponding transmission parameter of the set of reference signals includes a time resource allocation, a frequency resource allocation, a DMRS port, a DMRS scrambling seed, a DMRS seed identification, a DMRS PUSCH rate matching parameter, a traffic to pilot ratio, or a combination thereof.

EXAMPLE 59

A method of wireless communications at a base station is described. The method may include transmitting, to a UE, one or more transmission parameter sets for a RACH procedure, each of the transmission parameter sets differing by at least one transmission parameter; and receiving, from the UE, a RACH message for the RACH procedure in accordance with one of the transmission parameter sets.

EXAMPLE 60

An apparatus for wireless communications at a base station is described. The apparatus may include a processor, memory coupled with the processor, and instructions stored in the memory. The instructions may be executable by the processor to cause the apparatus to transmit, to a UE, one or more transmission parameter sets for a RACH procedure, each of the transmission parameter sets differing by at least one transmission parameter; and receive, from the UE, a RACH message for the RACH procedure in accordance with one of the transmission parameter sets.

EXAMPLE 61

Another apparatus for wireless communications at a base station is described. The apparatus may include means for transmitting, to a UE, one or more transmission parameter sets for a RACH procedure, each of the transmission parameter sets differing by at least one transmission parameter; and receiving, from the UE, a RACH message for the RACH procedure in accordance with one of the transmission parameter sets.

EXAMPLE 62

A non-transitory computer-readable medium storing code for wireless communications at a base station is described. The code may include instructions executable by a processor to transmit, to a UE, one or more transmission parameter sets for a RACH procedure, each of the transmission parameter sets differing by at least one transmission parameter; and receive, from the UE, a RACH message for the RACH procedure in accordance with one of the transmission parameter sets.

EXAMPLE 63

In some examples of the method, apparatuses, and non-transitory computer-readable medium described herein, the RACH procedure may be performed for an initial access procedure, an RRC resume procedure, a timing advance refresh procedure, or a combination thereof.

EXAMPLE 64

In some examples of the method, apparatuses, and non-transitory computer-readable medium described herein, the RACH procedure may be a contention based RACH procedure or a contention free RACH procedure.

EXAMPLE 65

Some examples of the method, apparatuses, and non-transitory computer-readable medium described herein may further include operations, features, means, or instructions for transmitting, to the UE, a configuration for DC communications with a PCell and a SCell; and receiving the RACH message on the PCell or SCell.

EXAMPLE 66

Some examples of the method, apparatuses, and non-transitory computer-readable medium described herein may further include operations, features, means, or instructions for receiving an indication of the PCell or SCell via a preamble of the RACH message, a DMRS for the RACH message, RACH resources for the RACH message, or a combination thereof.

EXAMPLE 67

Some examples of the method, apparatuses, and non-transitory computer-readable medium described herein may further include operations, features, means, or instructions for transmitting, to the UE, a timing advance parameter and an alignment timer; and receiving, from the UE, uplink data with the RACH message after the alignment timer expires.

EXAMPLE 68

Some examples of the method, apparatuses, and non-transitory computer-readable medium described herein may further include operations, features, means, or instructions for transmitting a second timer that indicates a time window after the alignment timer expires, where the uplink data may be received with the RACH message within the time window.

EXAMPLE 69

In some examples of the method, apparatuses, and non-transitory computer-readable medium described herein, the RACH procedure includes a two-step RACH procedure.

EXAMPLE 70

In some examples of the method, apparatuses, and non-transitory computer-readable medium described herein, the set of transmission parameter sets for the RACH procedure may be transmitted via RRC signaling, SIB transmissions, or specified configurations for the UE.

EXAMPLE 71

In some examples of the method, apparatuses, and non-transitory computer-readable medium described herein, the at least one transmission parameter includes a RACH preamble for the RACH message, time and frequency resources for the RACH message, DMRS parameters, or a combination thereof.

EXAMPLE 72

A method of wireless communications at a UE is described. The method may include: receiving a timing advance parameter and an alignment timer, the alignment timer specifying a time window for which the timing advance parameter is valid for transmissions via a data channel; determining that the time window has expired; and transmitting a data message on the data channel subsequent to the expiration of the time window based at least in part on the data message being transmitted with a random access preamble of a random access procedure.

EXAMPLE 73

An apparatus for wireless communications at a UE is described. The apparatus may include a processor, memory coupled with the processor, and instructions stored in the memory. The instructions may be executable by the processor to cause the apparatus to: receive a timing advance parameter and an alignment timer, the alignment timer specifying a time window for which the timing advance parameter is valid for transmissions via a data channel; determine that the time window has expired; and transmit a data message on the data channel subsequent to the expiration of the time window based at least in part on the data message being transmitted with a random access preamble of a random access procedure.

EXAMPLE 74

Another apparatus for wireless communications at a UE is described. The apparatus may include: means for receiving a timing advance parameter and an alignment timer, the alignment timer specifying a time window for which the timing advance parameter is valid for transmissions via a data channel; means for determining that the time window has expired; and means for transmitting a data message on the data channel subsequent to the expiration of the time window based at least in part on the data message being transmitted with a random access preamble of a random access procedure.

EXAMPLE 75

A non-transitory computer-readable medium storing code for wireless communications at a UE is described. The code may include instructions executable by a processor to: receive a timing advance parameter and an alignment timer, the alignment timer specifying a time window for which the timing advance parameter is valid for transmissions via a data channel; determine that the time window has expired; and transmit a data message on the data channel subsequent to the expiration of the time window based at least in part on the data message being transmitted with a random access preamble of a random access procedure.

EXAMPLE 76

In some examples of the method, apparatuses, and non-transitory computer-readable medium described herein may further include operations, features, means, or instructions for: receiving a second timer specifying a second time window for which transmissions via the data channel are valid, the second time window commencing at a time after the expiration of the time window, where the data message is transmitted during the second time window.

EXAMPLE 77

In some examples of the method, apparatuses, and non-transitory computer-readable medium described herein, the transmission is a message A of a two-step random access procedure or a message 3 of a four-step random access procedure.

DETAILED DESCRIPTION

Figure 1:
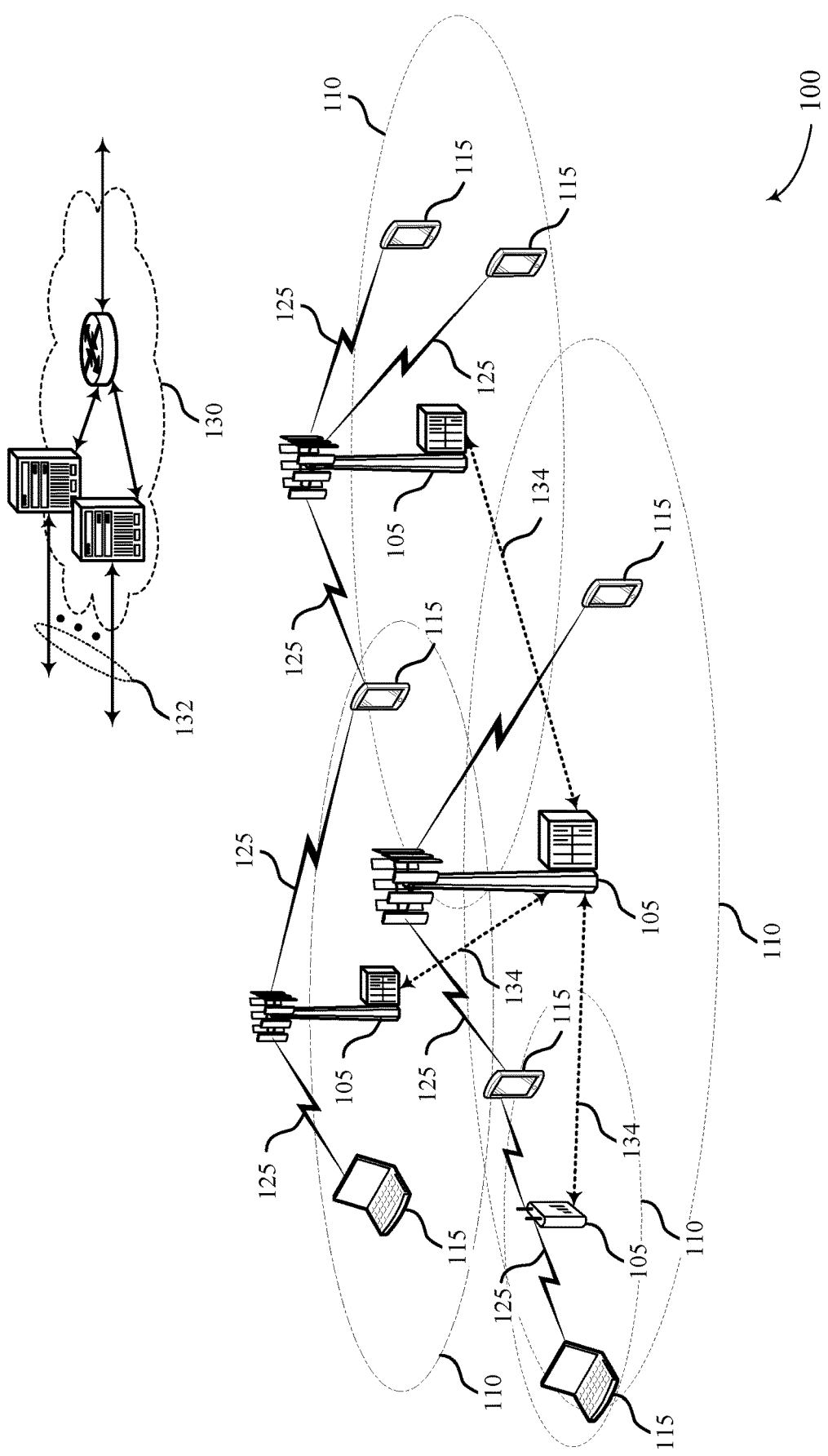
FIG. 1 illustrates an example of a system for wireless communications that supports signaling of transmission parameters in accordance with aspects of the present disclosure.

In some wireless communications systems, different types of messages may be transmitted between a user equipment (UE) and a base station. Transmissions from the base station to the UE may be referred to as downlink messages, and transmissions from the UE to the base station may be referred to as uplink messages. Additionally, the uplink messages may include multiple uplink transmission types. For example, the different uplink transmission types may include dynamic messages (e.g., scheduled by a downlink control information (DCI) message received from the base station), uplink messages triggered by configured grants (e.g., activated by radio resource control (RRC) signaling or DCI to activate/deactivate uplink transmissions), messages for a random access channel (RACH) procedure, semi-persistent uplink transmissions, uplink reference signals (e.g., sounding reference signals (SRSs)), etc. The base station may indicate transmission parameters to the UE for the corresponding uplink transmission type through additional signaling prior to the uplink transmissions (e.g., through DCI messages for scheduling or activation, RRC signaling, etc.).

Conventionally, the base station may explicitly indicate all of the transmission parameters that the UE is to use for any subsequent uplink transmissions to the base station. However, indicating all of the transmission parameters may be inefficient. For example, the UE may have difficulty detecting one or more of the transmission parameters, the base station may waste resources at the UE by signaling all of the transmission parameters at once, any change to the transmission parameters may lead to all of the transmission parameters being transmitted again (e.g., including the changed transmission parameter), only one set of transmission parameters may be used for a given bandwidth part (BWP), etc. Accordingly, efficient techniques are desired for indicating transmission parameters for a UE to use for subsequent communications with a base station.

As described herein, a base station may initially signal a reference uplink grant configuration to a UE, where the reference uplink grant configuration includes a set of transmission parameters for the UE to use for subsequent communications with the base station. However, the base station may then indicate one or more transmission parameters to the UE that are different than corresponding transmission parameters in the reference uplink grant configuration, eliminating the need for the base station to indicate a whole new set of transmission parameters to the UE. The UE may then determine to use these one or more different transmission parameters (e.g., based on a frequency allocation, demodulation reference signal (DMRS) parameters, or additional indication that corresponds to the one or more different transmission parameters) and communicate with the base station according to the different transmission parameters.

The base station may signal the reference uplink grant configuration based on a specific configuration index when indicating the one or more different transmission parameters, via a field that indicates the reference uplink grant configuration is a reference configuration for any different transmission parameters that are indicated to the UE, via a dedicated reference configuration, or via a configured uplink grant with the one or more different transmission parameters being indicated through dependent uplink configurations. Additionally, the base station may signal modifications, deactivations, or perform similar actions that reconfigure or deactivate the reference uplink grant configuration at the UE. In some cases, the base station may indicate a set of uplink grant configurations to the UE in addition to or in lieu of the reference uplink grant configuration, and the UE may select one uplink grant configuration from the set of uplink grant configurations based on the one or more different transmission parameters indicated by the base station.

Additionally or alternatively, the base station may transmit one or more transmission parameter sets that the UE may use for a RACH procedure. The UE may then select one of the transmission parameter sets and transmit a RACH message using the selected transmission parameter set. In some cases, the UE may select the transmission parameter set based on a purpose for the RACH procedure (e.g., initial access, RRC resume, timing advance refresh, etc.), whether the RACH procedure is contention-based or contention-free, whether uplink control information (UCI) is to be included with the RACH message, or a combination thereof. Additionally, the UE may receive a dual connectivity (DC) configuration, select the transmission parameter set based on communicating with a primary cell (PCell) or secondary cell (SCell) of the DC configuration, and transmit the RACH message to the appropriate cell using the selected transmission parameter set. In some cases, the UE may also receive a timing advance parameter and an alignment timer from the base station, where the UE transmits the RACH message based on when the alignment timer expires.

Aspects of the disclosure are initially described in the context of a wireless communications system. Additionally, aspects of the disclosure are illustrated through examples of additional wireless communications systems (e.g., including a DC configuration), resource allocation configurations, a timing alignment, and examples of process flows. Aspects of the disclosure are further illustrated by and described with reference to apparatus diagrams, system diagrams, and flowcharts that relate to signaling of transmission parameters.

FIG. 1 illustrates an example of a wireless communications system 100 that supports signaling of transmission parameters in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. In some cases, a base station 105 may transmit synchronization signals (e.g., PSS SSS, and the like) using multiple beams in a beam-sweeping manner through a cell coverage area. In some cases, PSS, SSS, and/or broadcast information (e.g., a physical broadcast channel (PBCH)) may be transmitted within different synchronization signal (SS) blocks on respective directional beams, where one or more SS blocks may be included within an SS burst.

After receiving the PSS and SSS, the UE 115 may receive a master information block (MIB), which may be transmitted in the PBCH. The MIB may contain system bandwidth information, an SFN, and a physical HARQ indicator channel (PHICH) configuration. After decoding the MIB, the UE 115 may receive one or more SIBs. For example, SIB1 may contain cell access parameters and scheduling information for other SIBs. Decoding SIB1 may enable the UE 115 to receive SIB2. SIB2 may contain RRC configuration information related to RACH procedures, paging, physical uplink control channel (PUCCH), physical uplink shared channel (PUSCH), power control, sounding reference signal (SRS), and cell barring.

After completing initial cell synchronization, a UE 115 may decode the MIB, SIB1 and SIB2 prior to accessing the network. The MIB may be transmitted on PBCH and may utilize the first 4 OFDMA symbols of the second slot of the first subframe of each radio frame. It may use the middle 6 RBs (72 subcarriers) in the frequency domain. The MIB carries a few important pieces of information for UE initial access, including downlink channel bandwidth in term of RBs, PHICH configuration (duration and resource assignment), and SFN. A new MIB may be broadcast every fourth radio frame (SFN mod 4=0) at and rebroadcast every frame (10 ms). Each repetition is scrambled with a different scrambling code.

After reading a MIB (e.g., either a new version or a copy), the UE 115 may can try different phases of a scrambling code until it gets a successful CRC check. The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase. After receiving the MIB, a UE may receive one or more SIBs. Different SIBs may be defined according to the type of system information conveyed. A new SIB1 may be transmitted in the fifth subframe of every eighth frame (SFN mod 8=0) and rebroadcast every other frame (20 ms). SIB1 includes access information, including cell identity information, and it may indicate whether a UE is allowed to camp on a cell. SIB1 also includes cell selection information (or cell selection parameters). Additionally, SIB1 includes scheduling information for other SIB2 may be scheduled dynamically according to information in SIB1, and includes access information and parameters related to common and shared channels. The periodicity of SIB2 can be set to 8, 16, 32, 64, 128, 256 or 512 radio frames.

After synchronizing (e.g., the connecting device decodes SIB2), the connecting device may perform a random access channel (RACH) procedure to further establish the connection to the wireless access network through the serving device. The RACH procedure may involve the connecting device transmitting a message including a RACH preamble (e.g., a message 1 (Msg1)) on a set of selected resources to inform the serving device about its presence. For example, the RACH preamble may be randomly selected from a set of 64 predetermined sequences. This may enable the serving device to distinguish between multiple connecting devices trying to access the system simultaneously. Additionally, the connecting device may receive uplink synchronization and may request resources for further communications in Msg1. After receiving Msg1 and in response to Msg1, the serving device may transmit a random access response (RAR) (e.g., a message 2 (Msg2)) to the connecting device, where the serving device identifies the connecting device based on the RACH preamble transmitted. Msg2 may provide an uplink resource grant, a timing advance, and a temporary cell radio network temporary identity (C-RNTI).

The connecting device may then transmit an RRC connection request, or RACH message 3 (Msg3), along with a temporary mobile subscriber identity (TMSI) (e.g., if the connecting device has previously been connected to the same wireless network) or a random identifier, after receiving the RAR. The RRC connection request may also indicate the reason the connecting device is connecting to the network (e.g., emergency, signaling, data exchange). The serving device may respond to the connection request with a contention resolution message, or RACH message 4 (Msg4), addressed to the connecting device, which may provide a new C-RNTI. If the connecting device receives a contention resolution message with the correct identification, it may proceed with RRC setup. If the connecting device does not receive a contention resolution message (e.g., if there is a conflict with another connecting device), it may repeat the RACH process by transmitting a message with a new RACH preamble. Such exchange of messages between the UE 115 and base station 105 for random access may be referred to as a four-step RACH procedure.

Additionally or alternatively, a UE 115 and a base station 105 may perform a two-step RACH procedure. This two-step RACH procedure may include a first RACH message (MsgA) that the UE 115 transmits to the base station 105. This first RACH message for the two-step RACH procedure may be comparable to the combination of the Msg1 and Msg3 of the four-step RACH procedure as described above. Additionally, this first RACH message of the two-step RACH procedure may also be able to carry a small amount of uplink data with the associated RACH information (e.g., RACH preamble and RRC connection request). The two-step RACH procedure may also include a second RACH message (MsgB) that the base station 105 transmits to the UE 115, where this second RACH message may be comparable to the combination of the Msg2 and Msg4 of the four-step RACH procedure. For example, the second RACH message may include a RAR and a contention resolution message. Accordingly, based on the two-step RACH procedure, the UE 115 may proceed with an RRC setup to communicate further with the base station 105.

The RACH uplink messages as described above (e.g., Msg1 and Msg3 of the four-step RACH procedure or MsgA of the two-step RACH procedure) may be examples of the different uplink transmission types that a UE 115 can transmit to a base station 105. Additional examples of the different uplink transmission types may include uplink messages that are dynamically scheduled by the base station 105 (e.g., via DCI messages), uplink messages scheduled by a type 1 configured grant (e.g., activated via RRC signaling), uplink messages scheduled by a type 2 configured grant (e.g., via DCI messages to activate/deactivate uplink transmissions), semi-periodic uplink messages, uplink reference signals (e.g., SRS), or similar uplink messages. The base station 105 may indicate transmission parameters to the UE 115 for a corresponding uplink transmission type through additional signaling prior to the uplink transmissions (e.g., through DCI messages for scheduling or activation, RRC signaling, etc.).

As indicated above, a base station 105 may indicate for a UE 115 to transmit an uplink message based on a type 1 configured grant that is activated by RRC signaling (e.g., higher-layer signaling). Accordingly, when the UE 115 is configured with an uplink grant through the RRC signaling (e.g., the type 1 configured grant through an rrc-ConfiguredUplinkGrant message), it may transmit one or more uplink messages without receiving additional uplink grants according to a configuration associated with the uplink grant. In some cases, the uplink grant configuration received via the RRC signaling may be part of a general grant configuration family of configured messages (e.g., ConfiguredGrantConfig messages). Additionally, the base station 105 may indicate transmission parameters with the uplink grant configuration (e.g., the rrc-ConfiguredUplinkGrant message, the ConfiguredGrantConfig message, etc.) that the UE 115 is to use for transmitting the corresponding uplink messages. In some cases, the UE 115 may read some of the transmission parameters from a configuration for a physical uplink channel (e.g., via a PUSCH-Config message). The transmission parameters may include a modulation and coding scheme (MCS) for the uplink messages, frequency and time resource allocation for the uplink messages, power control parameters for the UE 115 to transmit the uplink messages, a spreading factor (e.g., for non-orthogonal multiple access (NOMA)), transport block size (TBS), and any other parameters for the uplink messages.

For communications between the UE 115 and a base station 105, an available bandwidth of frequencies for the communications may be split into BWPs that are subsets of the available bandwidth of frequencies. A BWP may be a bandwidth where the UE 115 can transmit and/or receive information. In conventional systems, a maximum number of four (4) BWPs may be configured to the UE 115. Additionally, the UE 115 may be required to monitor a single, active BWP at a time and transmit in the single, active BWP at a time (e.g., there is one active BWP at a time). In some cases, a UE 115 may be configured with one uplink grant configuration (e.g., ConfiguredGrantConfig) per BWP that can include the RRC signaling to indicate the configurations for the uplink messages (e.g., rrc-ConfiguredUplinkGrant). Accordingly, one set of transmission parameters (e.g., TBS, MCS, power control, spreading factor, etc.) may be used for the uplink messages in each BWP. In some cases, the uplink messages may be associated with HARQ processes (e.g., acknowledgement feedback) based on corresponding configured grants. For example, there may be multiple type 1 HARQ processes (e.g., activated by type 1 configured grants) and one type 2 HARQ process (e.g., activated by type 2 configured grants) to indicate the uplink messages that the UE 115 can transmit within each BWP.

In some cases, the UE 115 may transmit the different types of uplink messages (e.g., RACH messages, configured grant transmissions, HARQ processes, etc.) more efficiently with different, respective sets of transmission parameters. However, based on its active BWP, the same set of transmission parameters may be used for each uplink message. Additionally, some of the transmission parameters may be more difficult for the UE 115 to detect (e.g., TBS, MCS, etc.) in comparison to other more easily detectable transmission parameters (e.g., DMRS parameters, time and frequency resource allocations, etc.). For example, a TBS for uplink messages may be calculated based on the MCS and resource allocation for the uplink message, necessitating the UE 115 to perform an additional step to determine the TBS. Techniques are desired to provide the UE 115 with flexibility in terms of transmission parameters for uplink messages (e.g., for RACH procedures, activated by configured grants, etc.).

Wireless communications system 100 may support efficient techniques for a UE 115 to use more easily detectable transmission parameters to infer difficult-to-detect parameters for communications with a base station 105. For example, the base station 105 may provide the UE 115 with multiple sets of transmission parameters (e.g., including both the easily detectable and difficult-to-detect transmission parameters), and the UE 115 may choose from among these sets of transmission parameters for transmitting an uplink message. In some cases, the more easily detectable transmission parameters that the UE 115 can use to infer the difficult-to-detect transmission parameters may include DMRS parameters, resources used for the uplink message transmission, or other more readily available transmission parameters for the UE 115 to detect. For example, each transmission parameter set may include a distinct time resource allocation, frequency resource allocation, or a combination thereof, where the UE 115 selects the transmission parameter set based on the resources to be used for the uplink message. The base station 105 may provide the transmission parameter sets to the UE via RRC signaling or a system information block (SIB), or the transmission parameter sets may be specified configurations for the UE 115. Additionally or alternatively, the UE 115 may determine the difficult-to-detect transmission parameters in reference to a provided transmission parameter rather than being explicitly defined.

In some cases, the multiple sets of transmission parameters may be specified for a certain uplink message (e.g., RACH message transmissions), where the UE 115 selects the transmission parameter set based on one or more characteristics of the uplink message. Additionally or alternatively, the UE 115 may be configured with a reference set of transmission parameters via a reference uplink grant configuration (e.g., parent uplink grant configuration, original uplink grant configuration, etc.). Accordingly, rather than transmitting multiple sets of transmission parameters that the UE 115 can select from, the base station 105 may transmit one or more transmission parameters that are different relative to the reference set of transmission parameters. For example, when configuring the UE 115 with an additional grant for one or more uplink messages, instead of sending a complete uplink grant configuration (e.g., ConfiguredGrantConfig, rrc-ConfiguredUplinkGrant, or a combination thereof) for the one or more uplink messages, the base station 105 may transmit at least one transmission parameter that is different than a corresponding transmission parameter in the reference uplink grant configuration for the UE 115 to use when transmitting the one or more uplink messages. Additionally or alternatively, the UE 115 may transmit the entire uplink grant configuration for the one or more uplink messages. However, by transmitting the differing transmission parameters rather than the entire uplink grant configuration may reduce RRC signaling overhead at the base station 105 and the UE 115.

Figure 2:
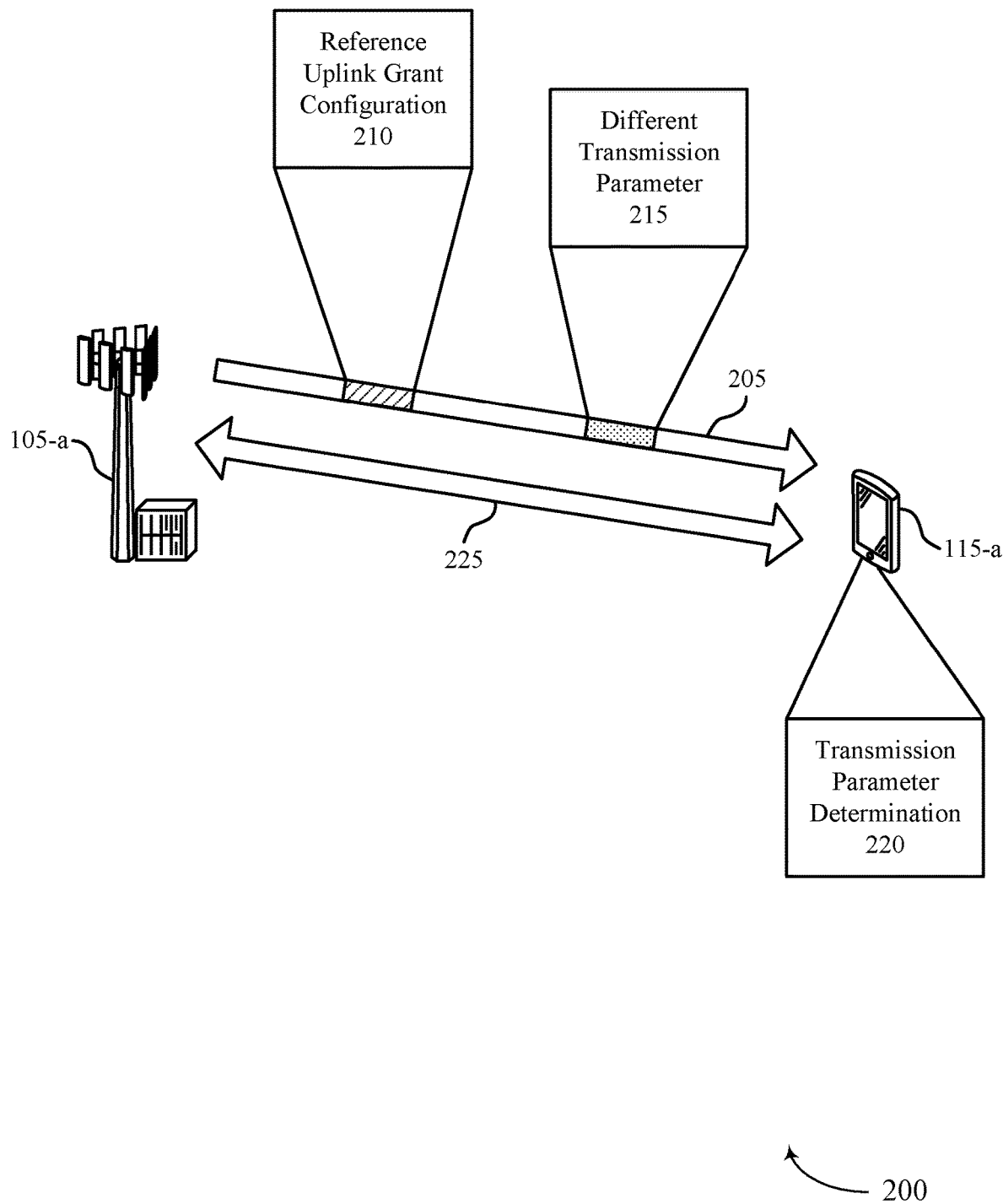
FIG. 2 illustrates an example of a wireless communications system that supports signaling of transmission parameters in accordance with aspects of the present disclosure.

FIG. 2 illustrates an example of a wireless communications system 200 that supports signaling of transmission parameters in accordance with aspects of the present disclosure. In some examples, wireless communications system 200 may implement aspects of wireless communications system 100. Wireless communications system 200 may include a base station 105-a and a UE 115-a, which may be examples of corresponding base stations 105 and UEs 115, respectively, as described above with reference to FIG. 1. UE 115-a may receive one or more downlink transmissions on a carrier 205 from base station 105-a that indicate a configuration of transmission parameters for UE 115-a to communicate with base station 105-a (e.g., transmit one or more uplink messages) on a carrier 225 within a single, active BWP. In some cases, carriers 205 and 225 may be a same carrier or may be different carriers for the respective communication directions (e.g., a carrier for downlink transmissions, a carrier for uplink transmissions, or a carrier for both downlink and uplink transmissions).

Initially, UE 115-a may identify a reference uplink grant configuration 210 that includes a reference set of transmission parameters for the active BWP based on signaling from base station 105-a on resources of carrier 205. In some cases, base station 105-a may transmit one or more reference uplink grant configurations 210 that UE 115-a can use for transmitting uplink messages back to base station 105-a, where each reference uplink grant configuration may include a reference configuration index specific to it. Additionally or alternatively, base station 105-a may transmit one reference uplink grant configuration 210 to UE 115-a that includes a field to indicate that the one reference uplink grant configuration 210 may be used as a reference for any subsequent uplink grant configurations received at UE 115-a. In other cases, a dedicated reference uplink grant configuration may be indicated to UE 115-a, where this dedicated reference uplink grant configuration may not directly activate any configurations for uplink message transmissions from UE 115-a. Additionally or alternatively, the reference uplink grant configuration 210 may be an uplink grant configuration (e.g., ConfiguredGrantConfig), and any subsequent grant configurations may be dependent grant configurations from the reference uplink grant configuration 210.

As described herein, base station 105-a may further transmit at least one different transmission parameter 215 to UE 115-a on resources of carrier 205, where the different transmission parameter 215 is different than a corresponding transmission parameter of the reference set of transmission parameters in the reference uplink grant configuration 210, thereby reducing RRC signaling overhead. Accordingly, base station 105-a may transmit this different transmission parameter 215 rather than sending entire new uplink grant configurations for different uplink messages. Both the reference uplink grant configuration 210 and configurations with the different transmission parameter 215 may be transmitted to UE 115-a via RRC signaling, a SIB, according to configurations specified to UE 115-a, or a combination thereof.

Additionally, each indication of a different transmission parameter 215 may further include an easy-to-detect transmission parameter that indicates where in the active BWP that UE 115-*a* can apply the different transmission parameter in lieu of the corresponding transmission parameter of the reference uplink grant configuration 210. For example, the different transmission parameter 215 may include a frequency allocation (e.g., the easy-to-detect transmission parameter) within the active BWP where the different transmission parameter (e.g., an MCS, a TBS, power control, spreading factor, etc.) is applied instead of the transmission parameters of the reference uplink grant configuration 210. Additionally or alternatively, the easy-to-detect transmission parameter may include a DMRS parameter, a traffic-to-pilot ratio (e.g., for indicating a quality of service (QoS)), or a similar parameter that is more explicitly indicated and identified by UE 115-*a*.

When multiple reference uplink grant configurations are transmitted to UE 115-*a* as described above, the different transmission parameter 215 may include a corresponding reference configuration index for the reference uplink grant configuration 210 with which its transmission parameter is different in relation to. For example, each reference uplink grant configuration 210 may include all transmission parameters needed for UE 115-*a* to transmit a subsequent uplink message to base station 105-*a*, where each reference uplink grant configuration 210 may also differ by at least one transmission parameter (e.g., no two reference uplink grant configurations 210 are the same).

Accordingly, base station 105-*a* may indicate one of the reference uplink grant configurations 210 for UE 115-*a* to use (e.g., through its corresponding reference configuration index), but with a change that is indicated by the at least one different transmission parameter 215. For example, base station 105-*a* may determine to have UE 115-*a* use a first reference uplink grant configuration 210 with a first reference configuration index (e.g., a reference configuration index of zero (0)), but with a different MCS (or other new transmission parameters) than the one included in the first reference uplink grant configuration. As such, when base station 105-*a* transmits the different transmission parameter 215, it may first indicate at least a configuration index specific to the different transmission parameter 215 (e.g., a configuration index of one (1)), the reference configuration index for the reference uplink grant configuration 210, and the new MCS value (or other new transmission parameters). The configuration indexes specific to the different transmission parameters 215 may enable multiple dependent configurations (e.g., multiple different transmission parameters to be indicated) for a single reference uplink grant configuration 210 to exist. In some cases, if the configuration index specific to the different transmission parameter 215 is not included, a default value may be assigned to the configuration based on the different transmission parameter 215.

Additionally or alternatively, when the reference uplink grant configuration 210 includes a field indicating that it may be used as a reference for any subsequent uplink grant configurations received at UE 115-*a*, the different transmission parameter 215 may not include a reference configuration index (e.g., since there is one reference uplink grant configuration 210). The different transmission parameter 215 may still include a configuration index specific to itself (e.g., for identification purposes).

When the reference uplink grant configuration is a dedicated reference uplink grant configuration, this dedicated reference uplink grant configuration may not directly activate any configurations for uplink message transmissions from UE 115-*a*, unlike the reference uplink grant configurations 210 described above. For example, this dedicated reference uplink grant configuration may not activate a type 1 configured grant (e.g., activated by RRC signaling) or be directly used to by an activation DCI for a type 2 configured grant. UE 115-*a* may be configured with either a type 1 or type 2 configured grant (e.g., based on whether an uplink grant configuration contains RRC signaling or not) at any given time, but not both types of configured grants. As such, different options for providing a single reference uplink grant configuration 210 that can be used by both type 1 and type 2 configured grants may be defined.

A first option may include the single reference uplink grant configuration 210 with RRC signaling for indicating the uplink grant configuration (e.g., an rrc-ConfiguredUplinkGrant message). To use the single reference uplink grant configuration 210 for a type 2 configured grant, the RRC signaling that is included in the grant configuration indicating the different transmission parameter 215 may be explicitly empty. Otherwise, the single reference uplink grant configuration 210 may be used as a type 1 configured grant. Additionally or alternatively, a second option may include the single reference uplink grant configuration 210 without any RRC signaling indicating the uplink grant configuration. Accordingly, to use the single reference uplink grant configuration 210 for a type 1 configured grant, the RRC signaling may be included in the grant configuration indicating the different transmission parameter 215. Otherwise, the single reference uplink grant configuration 210 may be used as a type 2 configured grant.

Additionally or alternatively, when the reference uplink grant configuration 210 may be an uplink grant configuration (e.g., ConfiguredGrantConfig), base station 105-*a* may indicate the different transmission parameter 215 (e.g., a subsequent uplink grant configuration) through a dependent grant configuration based on the reference uplink grant configuration 210. As such, the reference uplink grant configuration 210 may include an implicit indication that it is the reference configuration based on how its defined and the type of messaging used to indicate it to UE 115-*a* (e.g., through the ConfiguredGrantConfig message). The different transmission parameter 215, however, may be indicated through a grant configuration with a different parameter name that indicates its dependence on the reference uplink grant configuration 210. For example, the different parameter name may be under an RRC subset of messages that base station 105-*a* can transmit to UE 115-*a*.

In some cases, base station 105-*a* may modify the reference uplink grant configuration 210 (e.g., or one or more of the reference uplink grant configurations 210 if multiple are configured with respective reference configuration indexes) and indicate the modification to UE 115-*a*. Accordingly, the modifications may affect one or more dependent uplink configurations at UE 115-*a* (e.g., the uplink configurations as indicated through the different transmission parameters 215). For example, UE 115-*a* may assume that all modifications made to the reference uplink grant configuration 210 by base station 105-*a* propagate to any dependent grants from the reference uplink grant configuration 210. Additionally or alternatively, UE 115-*a* may assume the modifications to the reference uplink grant configuration 210 do not propagate to any dependent grants and may use (e.g., "copy") the original version of the reference uplink grant configuration 210 for the dependent uplink configurations. In some cases, UE 115-*a* may assume that any dependent uplink configurations for the modified reference uplink grant configuration are now unconfigured (e.g., and any grants for the dependent uplink configurations are deactivated or invalidated) based on receiving an indication of the modification. Additionally or alternatively, base station 105-*a* may reconfigure (e.g., update) each dependent grant configuration if the reference uplink grant configuration 210 is modified, may reconfigure the dependent grant configurations that are affected by the modification, or a combination thereof.

Base station 105-a may also deactivate the reference uplink grant configuration in some cases and transmit an indication of the deactivation to UE 115-a. For type 1 configured grants, the grant is deactivated by base station 105-a unconfiguring an associated RRC configuration (e.g., rrc-ConfiguredUplinkGrant). In some cases, if the reference uplink grant configuration 210 is a dedicated reference uplink grant configuration as described above, base station 105-a may not need to deactivate any grants (e.g., based on the dedicated reference uplink grant configuration not directly activating any grants for uplink messages). When base station 105-a unconfigures the reference uplink grant configuration 210, UE 115-a may assume that any dependent grant configurations are also unconfigured (and any grants for the dependent uplink configurations are deactivated or invalidated). Additionally or alternatively, when base station 105-a unconfigures the reference uplink grant configuration 210, UE 115-a may transfer (e.g., "copy") the transmission parameters from the original version of the reference uplink grant configuration 210 to the dependent uplink configurations (e.g., configurations that indicate the at least one different transmission parameter 215), and the dependent uplink configurations may become independent grants.

Based on the different signals received (e.g., the reference uplink grant configuration 210, a configuration or message that includes the different transmission parameter 215, modification indications, deactivation indications, etc.), UE 115-a may perform a transmission parameter determination 220 for determining a set of transmission parameters to use for communicating with base station 105-a on resources of carrier 225. For example, as described above, the configuration or message for the different transmission parameter 215 may include an easy-to-detect transmission parameter (e.g., resource allocation, DMRS parameter, etc.) that UE 115-a uses to determine whether to use the different transmission parameter 215 instead of the corresponding transmission parameter from the reference uplink grant configuration 210. UE 115-a may initially default to using the reference set of transmission parameters as indicated by the reference uplink grant configuration 210 (e.g., if the reference uplink grant configuration 210 is capable of directly activating an uplink grant as described above). However, if a condition is met for the different transmission parameter 215 (e.g., UE 115-a uses a corresponding resource allocation or DMRS parameter as indicated with the different transmission parameter 215), UE 115-a may use the different transmission parameter 215 in place of the corresponding transmission parameter of the reference set of transmission parameters for communicating with base station 105-a, while still using the rest of the reference set of transmission parameters.

In some cases, rather than base station 105-a explicitly indicating the different transmission parameter 215 to UE 115-a in an additional configuration message (e.g., additional explicit sets of parameters), UE 115-a may perform the transmission parameter determination 220 and determine the different transmission parameter 215 (e.g., or additional sets of transmission parameters) based on differential relationships with respect to the transmission parameters included in the reference uplink grant configuration 210. For example, base station 105-a may indicate UE 115-a to transmit an uplink message via the reference uplink grant configuration 210 using a first MCS (e.g., an MCS3) and by scrambling a DMRS for the uplink message according to a scrambling seed identification (ID) of zero (0), where scrambling the DMRS according to the scrambling seed ID of zero signals UE 115-a to use the corresponding MCS (e.g., the MCS3). Accordingly, if UE 115-a identifies a scrambling seed ID to use for its uplink message that is different than the one indicated in the reference uplink grant configuration 210 (e.g., a scrambling seed ID of one (1) rather than the scrambling seed ID of zero (0)), this different scrambling seed ID may signal UE 115-a to use a second, lower MCS for the uplink message transmission (e.g., an MCS2).

Additionally or alternatively, to the techniques described above, base station 105-a may configure UE 115-a with multiple uplink grant configurations (e.g., ConfiguredGrantConfigs) per BWP, multiple RRC configurations for uplink grants (e.g., rrc-ConfiguredUplinkGrant), or a combination thereof. In some cases, one uplink grant configuration may include one or more RRC configurations, and base station 105-a may configure UE 115-a with one or more uplink grant configuration per BWP. Each of the uplink grant configurations may differ (e.g., be unique) by at least one transmission parameter (e.g., the different transmission parameter 215). For example, the at least one transmission parameter may include a resource allocation in the time and/or frequency domains, a DMRS port, a DMRS scrambling seed, a DMRS scrambling seed ID, a DMRS-PUSCH rate matching parameter, a traffic-to-pilot ratio, or a combination thereof. Accordingly, UE 115-a may select which uplink grant configuration to use for communicating with base station 105-a based on identifying the at least one transmission parameter it is using for the communications.

Similar to the discussion above for receiving multiple reference uplink grant configurations 210 with corresponding reference configuration indexes, UE 115-a may receive the multiple reference uplink grant configurations 210 through the multiple uplink grant configurations per BWP. As such, rather than receiving the different transmission parameter 215 in a separate configuration message, UE 115-a may select a reference uplink grant configuration 210 based on an identified transmission parameter that may be different between the multiple reference uplink grant configurations 210 and use the selected reference uplink grant configuration 210 for the subsequent communications with base station 105-a.

Figure 3A:
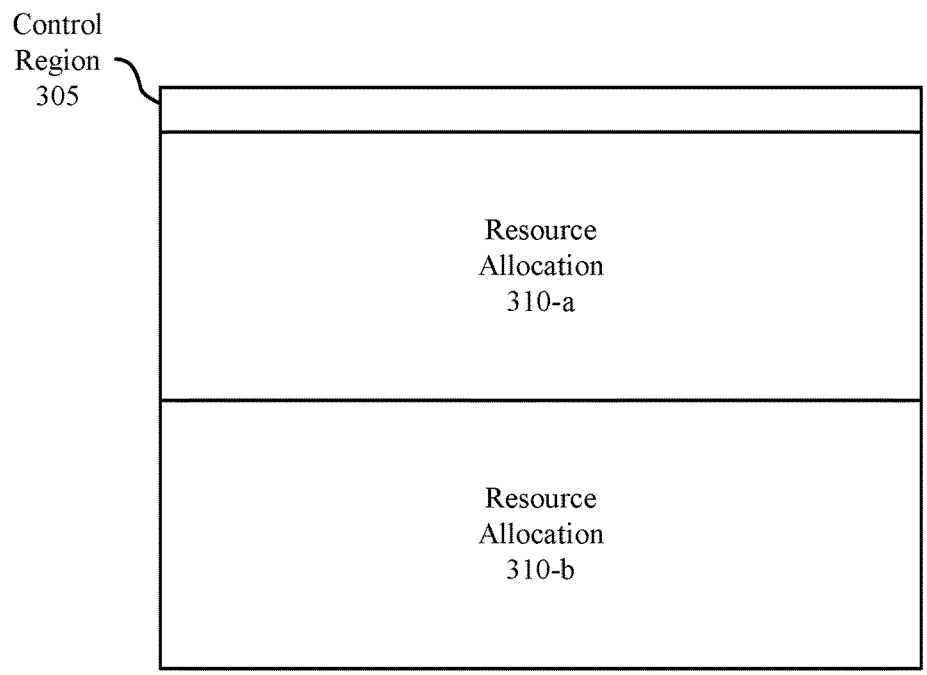
FIGS. 3A and 3B illustrate examples of resource allocation configurations that support signaling of transmission parameters in accordance with aspects of the present disclosure.
Figure 3B:
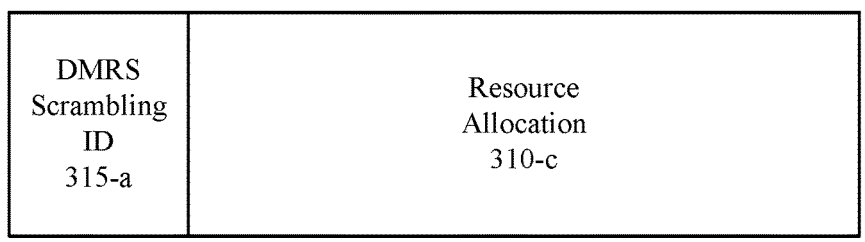

FIGS. 3A and 3B illustrate examples of resource allocation configurations 300 and 301, respectively, that support signaling of transmission parameters in accordance with aspects of the present disclosure. In some examples, resource allocation configurations 300 and 301 may implement aspects of wireless communications systems 100 and/or 200. Resource allocation configurations 300 and 301 may illustrate examples of different resource allocations 310 that a UE 115 may use to communicate with a base station 105. In some cases, as described herein, the UE 115 may determine a set of transmission parameters for communicating with the base station 105 based on easy-to-detect transmission parameters (e.g., resource allocations, DMRS parameters, etc.).

Resource allocation configuration 300 may include a control region 305, a first resource allocation 310-a, and a second resource allocation 310-b. The control region 305 may include resources reserved for transmitting and receiving control information for the UE 115. In some cases, resource allocations 310-a and 310-b may be used for uplink messages transmitted from the UE 115 to the base station 105. Accordingly, the UE 115 may determine one or more transmission parameters for the uplink messages based on the resource allocation 310 used for the uplink message transmissions. As described above with reference to FIG. 2, the UE 115 may receive one or more reference uplink grant configurations that each include a reference set of transmission parameters. However, the UE 115 may then receive an indication (e.g., a subsequent configuration) of at least one transmission parameter (e.g., a difficult-to-detect transmission parameter) that is different than a corresponding transmission parameter in the reference set of transmission parameters of a reference uplink grant configuration. As such, the UE 115 may determine to use this at least one different transmission parameter for the uplink message transmissions based on information (e.g., easy-to-detect transmission parameters) included with the indication for the at least one different transmission parameter.

For example, the UE 115 may receive an indication of a first MCS value (e.g., MCS=4) different than a reference MCS value from the reference uplink grant configuration that can be used for transmitting uplink messages to the base station 105. With this indication, the first MCS value may be associated with resource allocation 310-a. As such, if the UE 115 determines to transmit the uplink message within resource allocation 310-a, the UE 115 may use the first MCS value for the uplink message transmission. Additionally, the UE 115 may receive an indication of a second MCS value (e.g., MCS=2) that is also different than the reference MCS value from the reference uplink grant configuration that can be used for transmitting the uplink messages to the base station. However, with this indication, the second MCS value may be associated with resource allocation 310-b. Accordingly, the UE 115 may determine to transmit the uplink messages using the second MCS value if it chooses to use resources in resource allocation 310-b.

Additionally or alternatively, the UE 115 may receive multiple uplink grant configurations as described above with reference to FIG. 1. In such cases, the UE 115 may select one of the uplink grant configurations that includes the at least one different transmission parameter based on the easy-to-detect transmission parameters. For example, the UE 115 may use a first uplink grant configuration for transmitting uplink messages within resource allocation 310-a, where the first uplink grant configuration includes an indication of resource allocation 310-a in addition to the rest of the transmission parameters (e.g., including a specific MCS value, TBS value, spreading factor, etc.). Additionally or alternatively, the UE 115 may use a second uplink grant configuration for transmitting uplink messages within resource allocation 310-b, where the first uplink grant configuration includes an indication of resource allocation 310-b in addition to the rest of the transmission parameters specific to it.

Resource allocation configuration 301 may represent a separate example of a UE 115 selecting an at least one different transmission parameter and/or an uplink grant configuration for an uplink message transmission to a base station 105 based on an easy-to-detect transmission parameter other than a resource allocation. For example, the easy-to-detect transmission parameter may be a DMRS scrambling ID 315 that the UE 115 uses to determine whether to use a reference uplink grant configuration, the at least one different transmission parameter, and/or a specific uplink grant configuration. As shown, a first DMRS scrambling ID 315-a, which may further correspond to a first resource allocation 310-c, may be included with an indication of a first MCS value that is different than a reference MCS value of the reference uplink configuration. Accordingly, the UE 115 may determine to use this first MCS value based on identifying the DMRS scrambling ID 315-a (e.g., through using resource allocation 310-c) that it will use for its uplink message transmission. Additionally or alternatively, the UE 115 may determine to use a second MCS value based on identifying a DMRS scrambling ID 315-b (e.g., through using a resource allocation 310-d) that it will use for its uplink message transmission. Similarly, the UE 115 may determine which uplink grant configuration to use based on identifying a DMRS scrambling ID 315 in a corresponding uplink grant configuration.

Figure 3B:
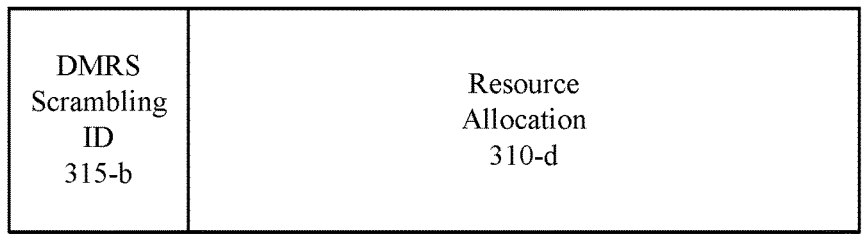
Figure 4:
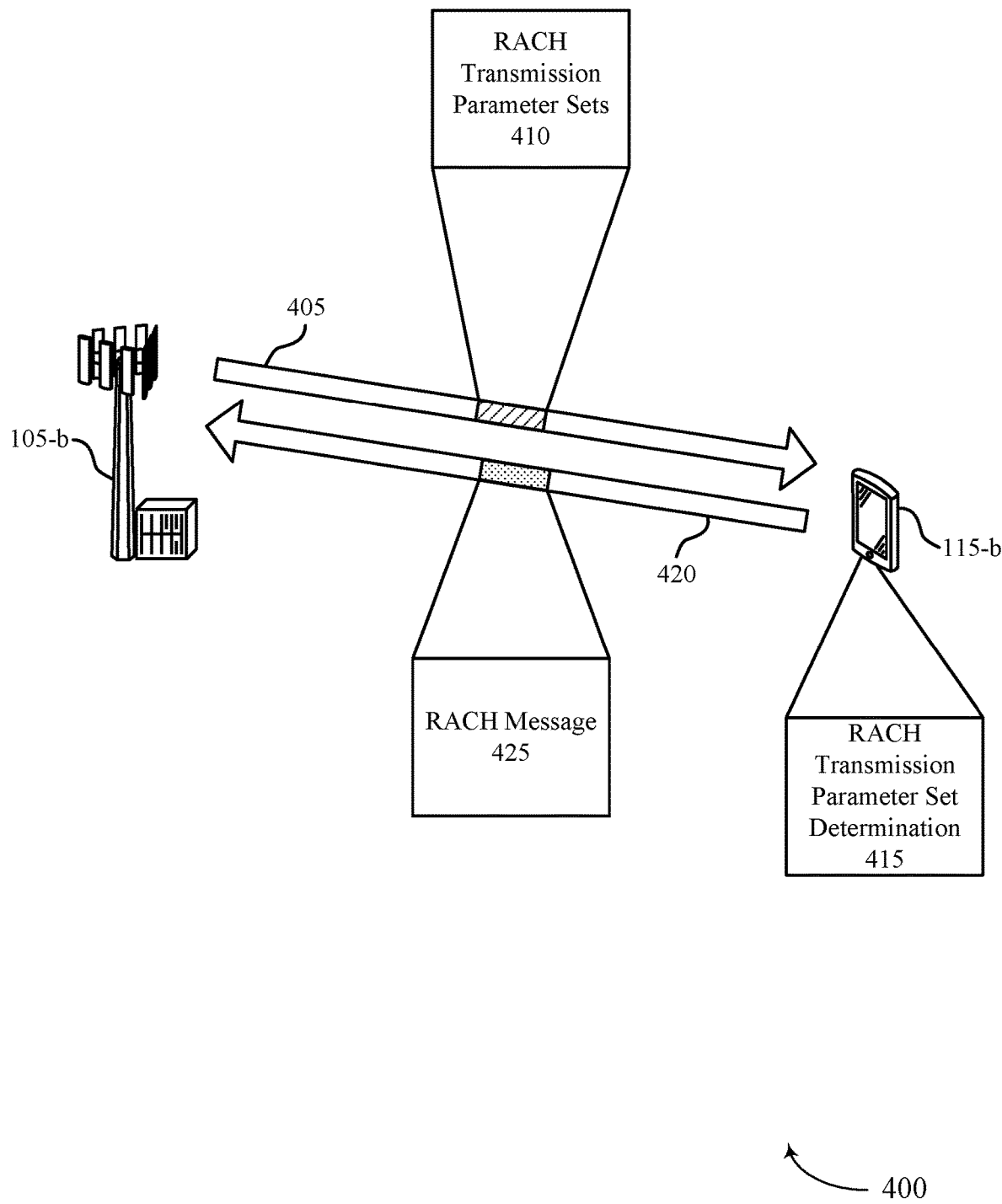
FIGS. 4 and 5 illustrate examples of wireless communications systems that support signaling of transmission parameters in accordance with aspects of the present disclosure.

FIG. 4 illustrates an example of a wireless communications system 400 that supports signaling of transmission parameters in accordance with aspects of the present disclosure. In some examples, wireless communications system 400 may implement aspects of wireless communications systems 100 and/or 200. Wireless communications system 400 may include a base station 105-b and a UE 115-b, which may be examples of corresponding base stations 105 and UEs 115, respectively, as described above with reference to FIGS. 1-3. As shown, base station 105-a and UE 115-a may perform a two-step RACH procedure as described above with reference to FIG. 1. Accordingly, as described herein, UE 115-a may determine a set of transmission parameters for performing the RACH procedure with base station 105-a on resources of a carrier 420 based on information received from base station 105-a on resources of a carrier 405 and based on various characteristics of the RACH procedure. Carriers 405 and 420 may be a same carrier or may be different carriers for the respective communication directions (e.g., a carrier for downlink transmissions, a carrier for uplink transmissions, or a carrier for both downlink and uplink transmissions).

Base station 105-a may transmit configuration information to UE 115-b on resources of carrier 405 prior to the RACH procedure starting. For example, base station 105-a may transmit one or more RACH transmission parameter sets 410 to UE 115-b. Accordingly, UE 115-b may use one of these RACH transmission parameter sets 410 for the subsequent two-step RACH procedure. In some cases, base station 105-a may signal the RACH transmission parameter sets to UE 115-b via a SIB. Additionally or alternatively, one or more of the RACH transmission parameter sets may be specified configurations defined for UE 115-b, where an enable signal may be included in the SIB for activating them. In some cases, base station 105-b may transmit the RACH transmission parameter sets 410 to UE 115-b via an RRC configuration message (e.g., when UE 115-b is in a connected mode with base station 105-b) or via an RRC release message (e.g., the RACH transmission parameter sets 410 may be used for a future RRC resume message).

Each of the RACH transmission parameter sets 410 may differ by at least one transmission parameter. For example, the at least one differing transmission parameter may include different RACH preambles, different RACH resources (e.g., time and/or frequency resources), different DMRS parameters (e.g., if a first message of the two-step RACH procedure contains a preamble and DMRSs), other RACH parameters, or a combination thereof. Accordingly, each of the differing transmission parameters may be associated with a different RACH transmission parameter set 410. For example, a subset of RACH preambles may be associated with a RACH transmission parameter set 410, each RACH transmission parameter set 410 may correspond to a different set of RACH resources, each RACH transmission parameter set 410 may correspond to different DMRS parameters (e.g., different ports or sequences for the DMRS), or a combination thereof. Additionally or alternatively, a first message of the two-step RACH procedure (e.g., MsgA) may include a header portion with parameters for a data transmission, where one or more of the different RACH transmission parameter sets 410 may be more efficient to carry the data transmission or may better accommodate the data transmission.

Based on the different RACH transmission parameter sets 410, UE 115-*b* may perform a RACH transmission parameter set determination 415 to determine which RACH transmission parameter set 410 to use for the subsequent RACH procedure. For example, the RACH procedure may be performed for different purposes (e.g., RRC resume, a timing advance refresh, initial access, etc.), where UE 115-*a* uses different RACH transmission parameter sets 410 based on the reason the RACH procedure is being performed (e.g., a first RACH transmission parameter set 410 is used for RRC resume, a second RACH transmission parameter set 410 is used for the timing advance refresh, etc.).

Additionally or alternatively, the RACH procedure may be a contention-based random access (CBRA) procedure or a contention-free random access (CFRA) procedure, where UE 115-*b* may or may not contend for the RACH resources based on receiving a grant from base station 105-*b* for the RACH resources or not. Accordingly, UE 115-*b* may determine which RACH transmission parameter set 410 to use based on whether it is a CBRA or a CFRA procedure. For example, UE 115-*b* may use different RACH resources or a specific MCS if the RACH procedure is a CFRA procedure.

As noted above, the first message of the two-step RACH procedure may be extended to carry UCI as well as data (e.g., RACH data). This UCI may be carried on a PUSCH or a PUCCH within the first message, and the PUCCH may include different formats for carrying the UCI. Accordingly, UE 115-*a* may associate physical RACH (PRACH) parameters (e.g., RACH preamble, RACH resources, DMRS parameters, etc.) for the RACH transmission based on characteristics of the UCI and the first RACH message to determine which RACH transmission parameter set 410 to use. For example, UE 115-*b* may determine a RACH transmission parameter set 410 to use for transmitting the first RACH message based on whether the first RACH message carries UCI or data, whether the UCI is carried on a PUCCH or a PUSCH in the first RACH message, a PUCCH format used to carry the UCI (e.g., when applicable), a UCI modulation order (e.g., when applicable), a UCI size (e.g., when applicable), or a combination thereof. In some cases, the UCI modulation order and the UCI size may be provided as a separate set of transmission parameters by base station 105-*b* in a SIB, via RRC signaling, or a combination thereof.

After determining which RACH transmission parameter set to use for the RACH procedure (e.g., two-step RACH procedure) through the RACH transmission parameter set determination 415, UE 115-*b* may then transmit a RACH message 425 (e.g., the first RACH message of the two-step RACH procedure) to base station 105-*b* on resources of a carrier 420 using the determined RACH transmission parameters to initiate the RACH procedure. For example, the UE 115-*b* may transmit a random access preamble selected from a subset of random access preambles associated with a RACH transmission parameter set 410, and transmit an associated information message (e.g., UCI or data) according to the RACH transmission parameter set 410. Additionally or alternatively, the UE 115-*b* may transmit a random access preamble on RACH resources (e.g., RACH occasions) associated with a RACH transmission parameter set 410, and transmit an associated information message (e.g., UCI or data) according to the RACH transmission parameter set 410. Additionally or alternatively, the UE 115-*b* may transmit a random access preamble with a DMRS parameter (e.g., ports, sequences) associated with a RACH transmission parameter set 410, and transmit an associated information message (e.g., UCI or data) according to the RACH transmission parameter set 410.

While a two-step RACH procedure and the first message of the two-step RACH procedure are described with respect to wireless communications system 500, it is to be understood that the techniques for selecting a RACH transmission parameter set may be extended to one or more of the uplink messages (e.g., a Msg1 or Msg3) that UE 115-*c* may transmit as part of a four-step RACH procedure as described above.

Figure 5:
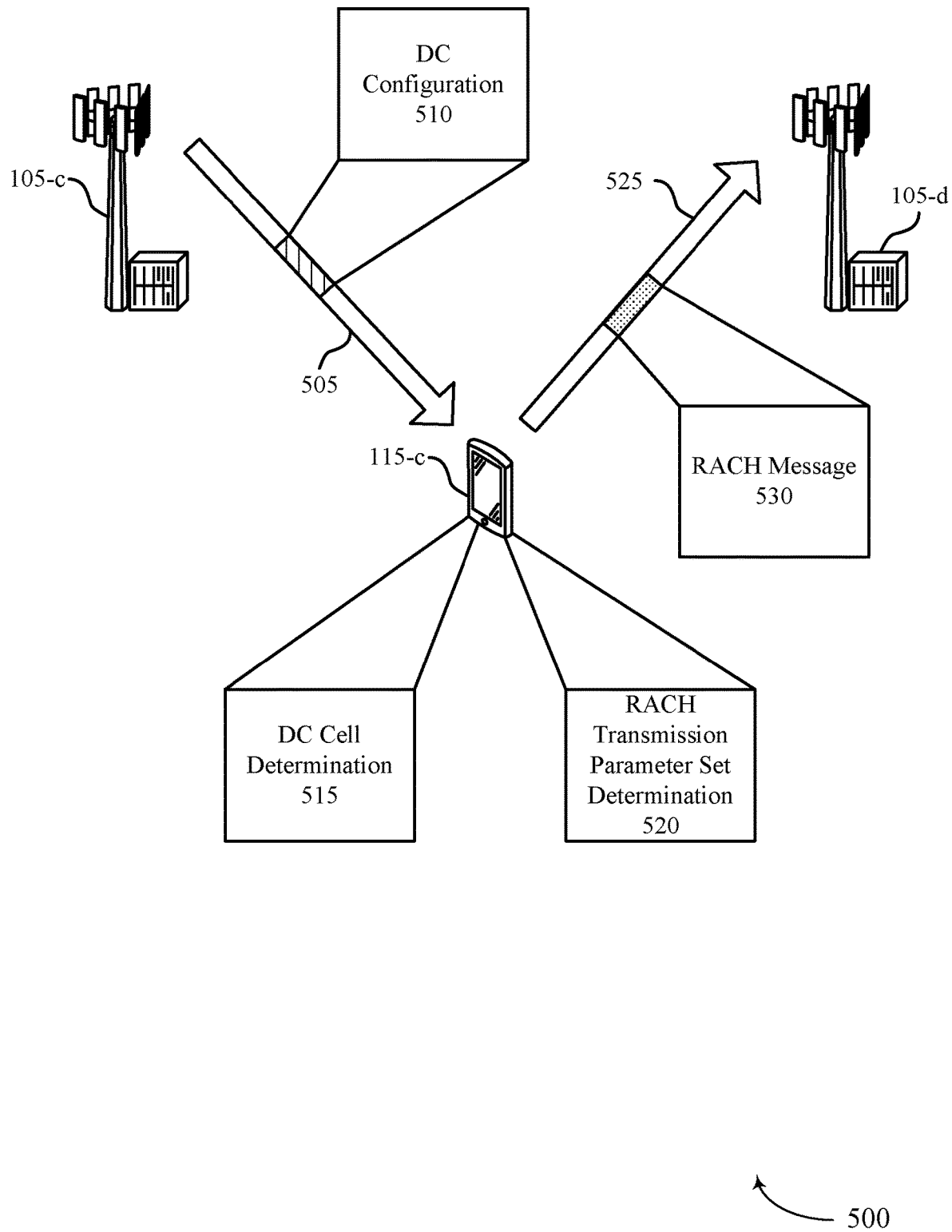

FIG. 5 illustrates an example of a wireless communications system 500 that supports signaling of transmission parameters in accordance with aspects of the present disclosure. In some examples, wireless communications system 500 may implement aspects of wireless communications systems 100, 200, and/or 400. Wireless communications system 500 may include a master base station 105-*c*, a secondary base station 105-*d*, and a UE 115-*c*, which may be examples of corresponding base stations 105 and UEs 115 as described above with reference to FIGS. 1-4. In some cases, master base station 105-*c*, secondary base station 105-*d*, and UE 115-*c* may communicate according to a DC configuration 510, where UE 115-*c* can communicate with both base stations 105 at the same time. Master base station 105-*c* may be referred to as a master cell, master cell group (MCG), PCell, serving cell, etc., and secondary base station 105-*d* may be referred to as an SCell, secondary cell group (SCG), etc. As described herein, UE 115-*c* may determine a set of transmission parameters to use for transmitting a first message of a two-step RACH procedure based on selecting either master base station 105-*c* or secondary base station 105-*d* to communicate with.

Master base station 105-*c* may transmit the DC configuration 510 on resources of a carrier 505 to UE 115-*c*. The DC configuration 510 may include setup information for the DC communications. For example, the DC configuration 510 may indicate that master base station 105-*c* can operate in a licensed radio frequency (RF) spectrum and that secondary base station 105-*d* can operate in an unlicensed RF spectrum. Additionally or alternatively, the DC configuration 510 may indicate that master base station 105-*c* can operate on a lower spectrum (e.g., a frequency range 1 (FR1)) that may enhance coverage for it, while secondary base station 105-*d* can operate on a higher spectrum (e.g., a frequency range 2 (FR2)). In some cases, the DC configuration 510 may also indicate that master base station 105-*c* is equipped with an advanced receiver, while secondary base station 105-*d* is not equipped with one.

Accordingly, UE 115-*c* may then perform a DC cell determination 515 to determine which of the master base station 105-*c* (e.g., master cell or PCell) or secondary base station 105-*d* (e.g., secondary cell or SCell) to transmit a first RACH message to for the two-step RACH procedure based in part on the information for each base station 105 in the DC configuration 510. For example, based on a QoS needed, a listen-before-talk (LBT) outcome (e.g., to determine if an RF spectrum is available for UE 115-*c* prior to transmitting the first RACH message), an interference measurement for one or both of the base stations 105, coverage requirements for UE 115-*c*, or a combination thereof, master base station 105-*c* may indicate to UE 115-*c* to perform the two-step RACH with master base station 105-*c* (e.g., PCell), secondary base station 105-*d* (e.g., SCell), or both. UE 115-*c* may then perform a RACH transmission parameter set determination 520 to determine which transmission parameters to use for transmitting the first RACH message based on the determined DC cell. For example, the transmission parameters (e.g., MCS, DMRS parameters, etc.) may be different depending on whether UE 115-*c* is performing the RACH procedure with master base station 105-*c* or with secondary base station 105-*d*. In some cases, UE 115-*c* may receive one or more RACH transmission parameter sets as discussed above with reference to FIG. 4, and then UE 115-*c* may select one of the RACH transmission parameter sets for transmitting the first RACH message based on the selected base station 105 for the RACH procedure.

Additionally or alternatively, UE 115-*c* may select which of the PCell (e.g., master base station 105-*c*) or SCell (e.g., secondary base station 105-*d*) to perform the two-step RACH procedure with based on the QoS needed, the LBT outcome, the interference measurement for one or both of the base stations 105, the coverage requirements for UE 115-*c*, or a combination thereof. UE 115-*c* may then indicate the selected cell (e.g., target cell or target cell group) using a RACH preamble in the first RACH message or based on which transmission parameters are used for the first RACH message transmission (e.g., the DMRS parameters used for the first RACH message, the RACH resources that the first RACH message is transmitted on, etc.). Similarly, other transmission parameters for the first RACH message (e.g., MCS, TBS, power control, spreading factor, etc.) may be indicated based on which RACH preamble is used, the resources used for the first RACH message, the DMRS parameters used for the first RACH message, or a combination thereof.

As shown in wireless communications system 500, UE 115-*c* may determine to perform the RACH procedure (e.g., two-step RACH procedure) with secondary base station 105-*d* through the DC cell determination 515 (e.g., via an indication from master base station 105-*c* or selected at UE 115-*c*). Subsequently, UE 115-*c* may determine which RACH transmission parameters to use based on communicating with secondary base station 105-*d* during the RACH transmission parameter set determination 520. Accordingly, UE 115-*c* may then transmit a RACH message 530 (e.g., the first RACH message of the two-step RACH procedure) to secondary base station 105-*d* on resources of a carrier 525 using the determined RACH transmission parameters. Although not shown, UE 115-*c* may determine to perform the RACH procedure with master base station 105-*c* in addition to or instead of with secondary base station 105-*d*. As such, UE 115-*c* may determine a second RACH transmission parameter set for communicating with master base station 105-*c*. In some cases, the second RACH transmission parameter set for communicating with master base station 105-*c* may be different than the RACH transmission parameter set for communicating with secondary base station 105-*d* (e.g., based on each base station 105 having different characteristics) or the two RACH transmission parameter sets may be the same (e.g., based on both base stations 105 having similar characteristics).

While a two-step RACH procedure and the first message of the two-step RACH procedure are described with respect to wireless communications system 500, it is to be understood that the techniques for selecting a RACH transmission parameter set may be extended to one or more of the uplink messages (e.g., a Msg1 or Msg3) that UE 115-*c* may transmit as part of a four-step RACH procedure as described above. Additionally, similar to the two-step RACH procedure, UE 115-*c* may perform the four-step RACH procedure with master base station 105-*c*, secondary base station 105-*d*, or both, where the RACH transmission parameter set used for transmitting the corresponding RACH messages may depend on which base station 105 is selected for the four-step RACH procedure.

Figure 6:
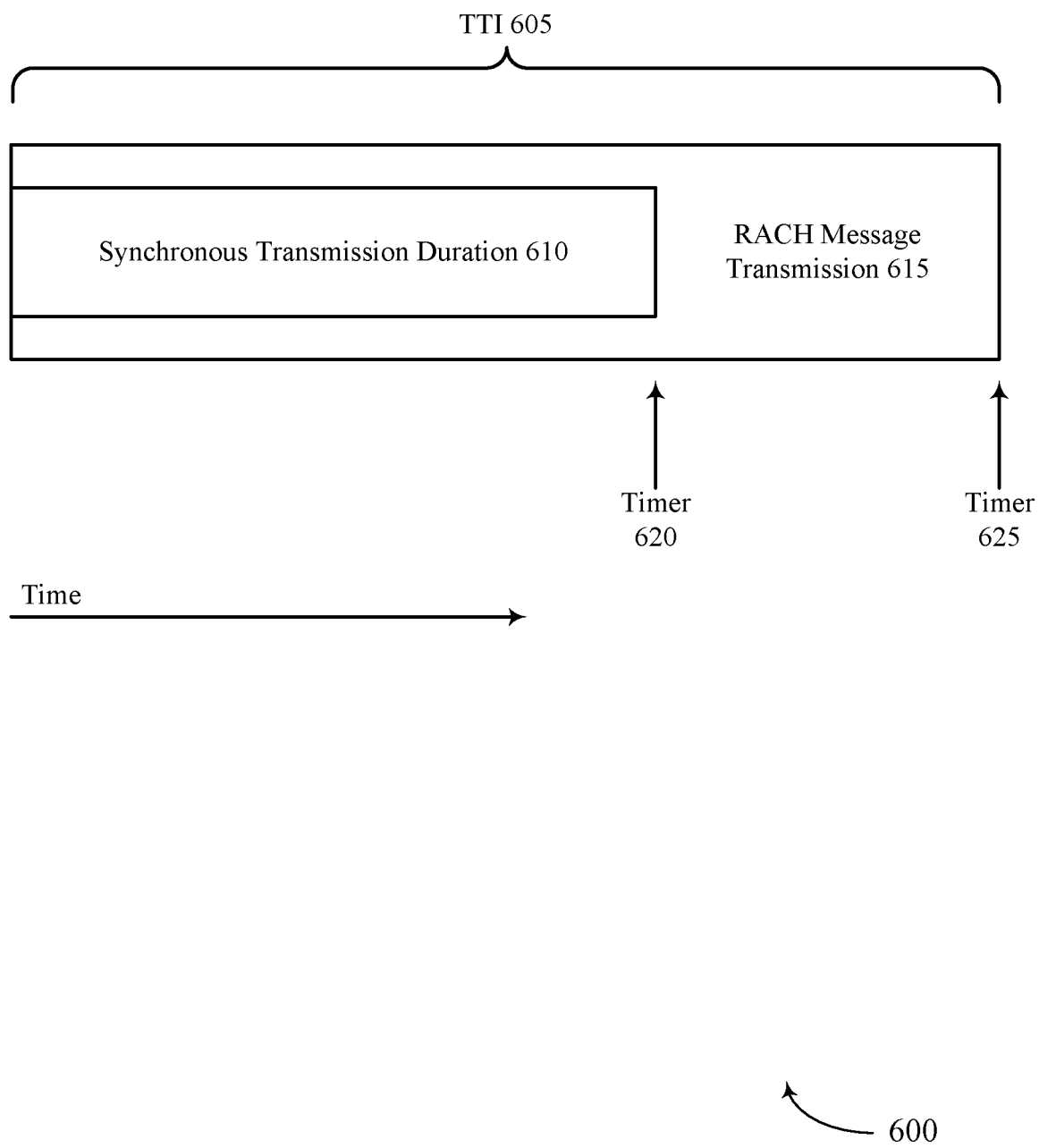
FIG. 6 illustrates an example of a timing alignment that supports signaling of transmission parameters in accordance with aspects of the present disclosure.

FIG. 6 illustrates an example of a timing alignment 600 that supports signaling of transmission parameters in accordance with aspects of the present disclosure. In some examples, timing alignment 600 may implement aspects of wireless communications systems 100, 200, and/or 400. Timing alignment 600 may be implemented for communications between a UE 115 and a base station 105, which may be examples of corresponding wireless devices as described above with reference to FIGS. 1-5. In some cases, timing alignment 600 may be applied to any communications that occur between the UE 115 and the base station 105 during a TTI 605, which may span a configured amount of time (e.g., one subframe, multiple subframes, a slot, multiple slots, etc.)

In some wireless communications systems (e.g., NR, LTE, etc.), a base station 105 may configure a UE 115 with a timing advance parameter and an associated time (e.g., a timeAlignmentTimer). Based on these timing characteristics, the UE 115 may clear any configured downlink assignments and any configured uplink grants after the configured time associated with the timing advance parameter expires. That is, UE 115 may cancel any ensuing transmissions scheduled by downlink assignments or uplink grants once the configured timer expires. As shown, the UE 115 may synchronously transmit any messages configured or scheduled by corresponding downlink assignments and uplink grants within a synchronous transmission duration 610 of the TTI 605. Accordingly, the synchronous transmission duration 610 may end according to a timer 620, which may represent the configured time associated with the timing advance parameter. Conventionally, after the timer 620 expires, the UE 115 would cancel any transmissions that would occur between the timer 620 expiring and the end of the TTI 605. However, this conventional approach may result in an inefficient usage of resources with the TTI 605.

To more efficiently use more resources of the TTI 605, the UE 115 may be allowed to transmit uplink data even after the timer 620 (e.g., timeAlignmentTimer) has expired. For example, the UE 115 may transmit the uplink data using a RACH message transmission 615, where the RACH message transmission 615 may include a first message of a two-step RACH procedure (e.g., a MsgA) or a third message of a four-step RACH procedure (e.g., Msg3). Additionally, the UE 115 may be configured with a second timer 625 to allow transmission of the uplink data with the RACH message transmission 615 within a certain time window that spans a duration between the end of the timer 620 to the end of the second timer 625. Outside of this window, the UE 115 may not transmit any uplink data or information until synchronization has been reestablished with the base station 105. For example, the RACH message transmission 615 may be used to carry uplink data at any time until the second timer 625 expires. Additionally, as described herein, the UE 115 may determine a RACH transmission parameter set as described above with reference to FIGS. 4 and 5 for sending the RACH message transmission 615.

Figure 7:
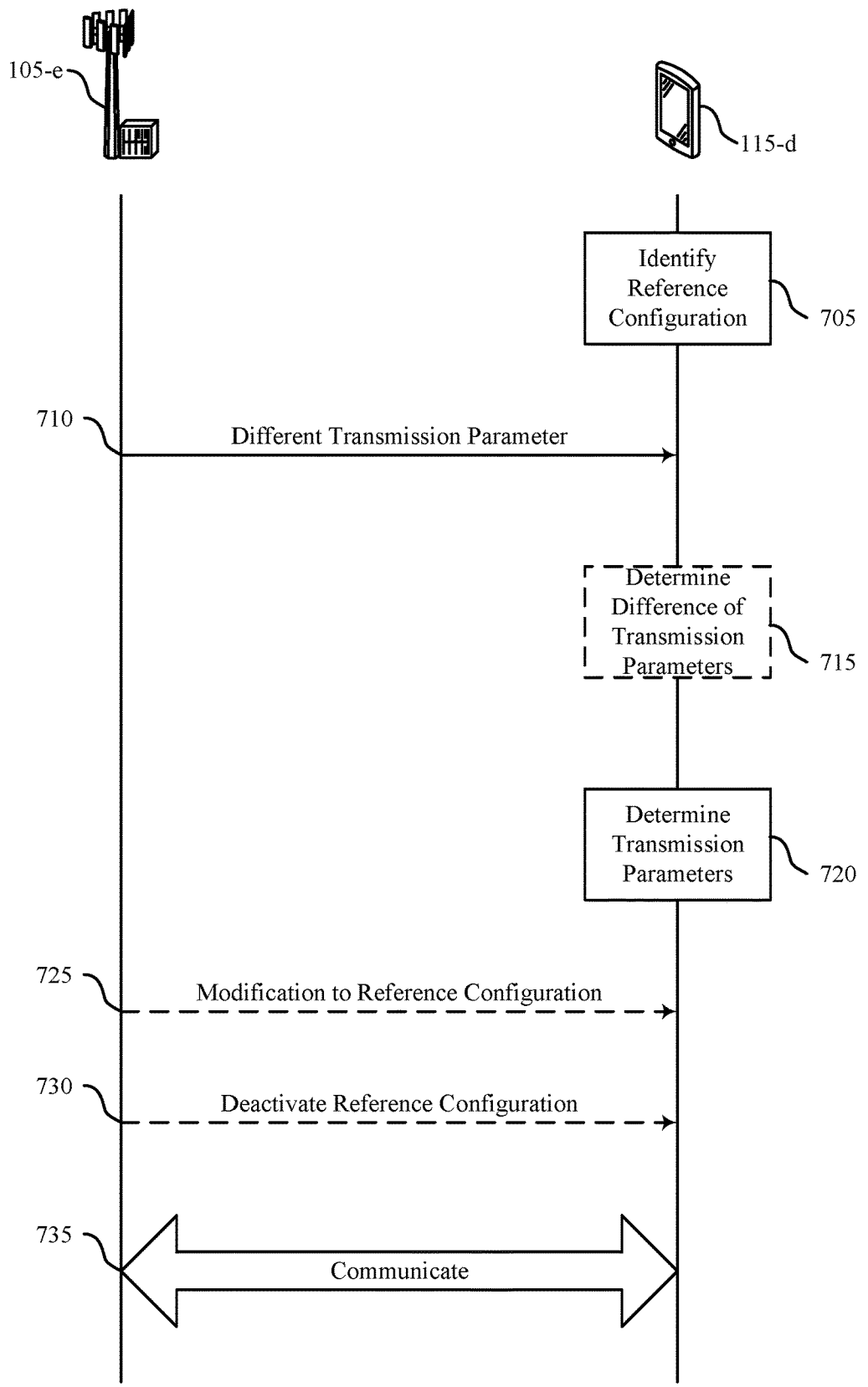
FIGS. 7 and 8 illustrate examples of process flows that support signaling of transmission parameters in accordance with aspects of the present disclosure.

FIG. 7 illustrates an example of a process flow 700 that supports signaling of transmission parameters in accordance with aspects of the present disclosure. In some examples, process flow 700 may implement aspects of wireless communications systems 100, 200, and/or 400. Process flow 700 may include a base station 105-*e* and a UE 115-*d*, which may be examples of corresponding base stations 105 and UEs 115, respectively, as described above with reference to FIGS. 1-6.

At 705, UE 115-*d* may identify a reference uplink grant configuration including a set of reference transmission parameters for subsequent communications within a single BWP. In some cases, the reference uplink grant configuration may include at least one of a MCS, a TBS, power control parameters, spreading factor for NOMA, or a combination thereof. Additionally, the reference uplink grant configuration may be identified via RRC signaling, SIB transmissions, or specified configurations for UE 115-*d*.

In some cases, UE 115-*d* may identify the reference uplink grant configuration based on receiving, from base station 105-*e*, one or more reference uplink grant configurations with a reference configuration index for each reference uplink grant configuration, where at least one transmission parameter indicates one reference configuration index for determining to use the at least one transmission parameter instead of the corresponding transmission parameter of the set of reference transmission parameters. Additionally or alternatively, UE 115-*d* may identify the reference uplink grant configuration based on receiving, from base station 105-*e*, the reference uplink grant configuration with a field that indicates the reference uplink grant configuration is used for determining to use the at least one transmission parameter instead of a corresponding transmission parameter of the set of reference transmission parameters after the reference uplink grant configuration is received.

In some cases, UE 115-*d* may identify the reference uplink grant configuration based on receiving, from base station 105-*e*, a dedicated reference uplink configuration, where the at least one transmission parameter is determined to be used instead of a corresponding transmission parameter based on the dedicated uplink configuration, and activating a type one or a type two configured grant based on a higher-layer configured uplink grant (e.g., RRC grant) in the dedicated reference uplink configuration. For example, UE 115-*d* may receive an uplink grant configuration for the subsequent communications, where the uplink grant configuration includes the higher-layer configured uplink grant with no transmission parameters, and activate the type two configured grant based on receiving the higher-layer configured uplink grant with no transmission parameters. Additionally or alternatively, UE 115-*d* may receive an uplink grant configuration for the subsequent communications, where the uplink grant configuration includes the higher-layer configured uplink grant, and activate the type one configured grant based on receiving the higher-layer configured uplink grant.

Additionally or alternatively, UE 115-*d* may identify the reference uplink grant configuration based on receiving, from base station 105-*e*, a configured uplink grant including the reference uplink grant configuration and receiving, in a dependent uplink configuration, the at least one transmission parameter that is different from the corresponding transmission parameter of the set of reference transmission parameters in the reference uplink grant configuration.

In some cases, UE 115-*d* may identify the reference uplink grant configuration based on receiving an uplink grant configuration, where the uplink grant configuration includes a set of configured uplink grants and selecting one of the set of configured uplink grants from the uplink grant configuration based on an indication received with the at least one transmission parameter. Additionally or alternatively, UE 115-*d* may receive a set of uplink grant configurations, where each of the plurality of uplink grant configurations includes one of a plurality of configured uplink grants and may select one of the set of configured uplink grants from the plurality of uplink grant configurations based on an indication received with on the at least one transmission parameter.

At 710, UE 115-*d* may receive, from base station 105-*e*, the at least one transmission parameter that is different from a corresponding transmission parameter of the set of reference transmission parameters in the reference uplink grant configuration. In some cases, the at least one transmission parameter that is different than the corresponding transmission parameter of the set of reference signals may include a time resource allocation, a frequency resource allocation, a DMRS port, a DMRS scrambling seed, a DMRS seed ID, a DMRS-PUSCH rate matching parameter, a traffic to pilot ratio, or a combination thereof.

At 715, UE 115-*d* may determine a difference between the at least one transmission parameter and the set of reference transmission parameters after receiving the reference uplink grant configuration comprising the set of reference transmission parameters.

At 720, UE 115-*d* may determine to use the at least one transmission parameter instead of the corresponding transmission parameter of the set of reference transmission parameters for the subsequent communications within the single BWP. In some cases, UE 115-*d* may identify a frequency allocation parameter associated with the at least one transmission parameter, where the at least one transmission parameter is used instead of the corresponding transmission parameter of the set of reference transmission parameters for a portion of the single BWP based on the frequency allocation parameter. Additionally or alternatively, UE 115-*d* may identify a DMRS parameter with the at least one transmission parameter, where the at least one transmission parameter is used instead of the corresponding transmission parameter of the set of reference transmission parameters for a portion of the single bandwidth part based on the DMRS parameter. In some cases, if UE 115-*d* determines the difference for the at least one transmission parameter, UE 115-*d* may then identify an additional transmission parameter based on the determined difference.

At 725, UE 115-*d* may receive, from base station 105-*e*, a modification to the reference uplink grant configuration, determining whether to apply the modification to the at least one transmission parameter that is different from the corresponding transmission parameter of the set of reference transmission parameters in the reference uplink grant configuration, and modify the at least one transmission parameter based on the determination. In some cases, UE 115-*d* may deactivate the at least one transmission parameter, the reference uplink grant configuration, or a combination thereof based on receiving the modification. Additionally or alternatively, UE 115-*d* may reconfigure the at least one transmission parameter based on receiving the modification. In some cases, base station 105-*e* may reconfigure the at least one transmission parameter based on the modification an transmit, to UE 115-*d*, the at least one reconfigured transmission parameter.

At 730, UE 115-*d* may receive, from base station 105-*e*, an indication to deactivate the reference uplink grant configuration, determine whether to deactivate the at least one transmission parameter, and deactivate the at least one transmission parameter based on the determination. Additionally or alternatively, UE 115-*d* may combine the at least one transmission parameter and the reference set of transmission parameters based on receiving the indication to deactivate the reference uplink grant configuration.

At 735, UE 115-d and base station 105-e may communicate using the at least one transmission parameter. In some cases, UE 115-d and base station 105-e may further communicate using the combination of the at least one transmission parameter and the reference set of transmission parameters based on deactivating the at least one transmission parameter. Additionally or alternatively, UE 115-d and base station 105-e may communicate using the additional transmission parameter and the at least one transmission parameter when the difference between the at least one transmission parameter and the set of reference transmission parameters is determined.

Figure 8:
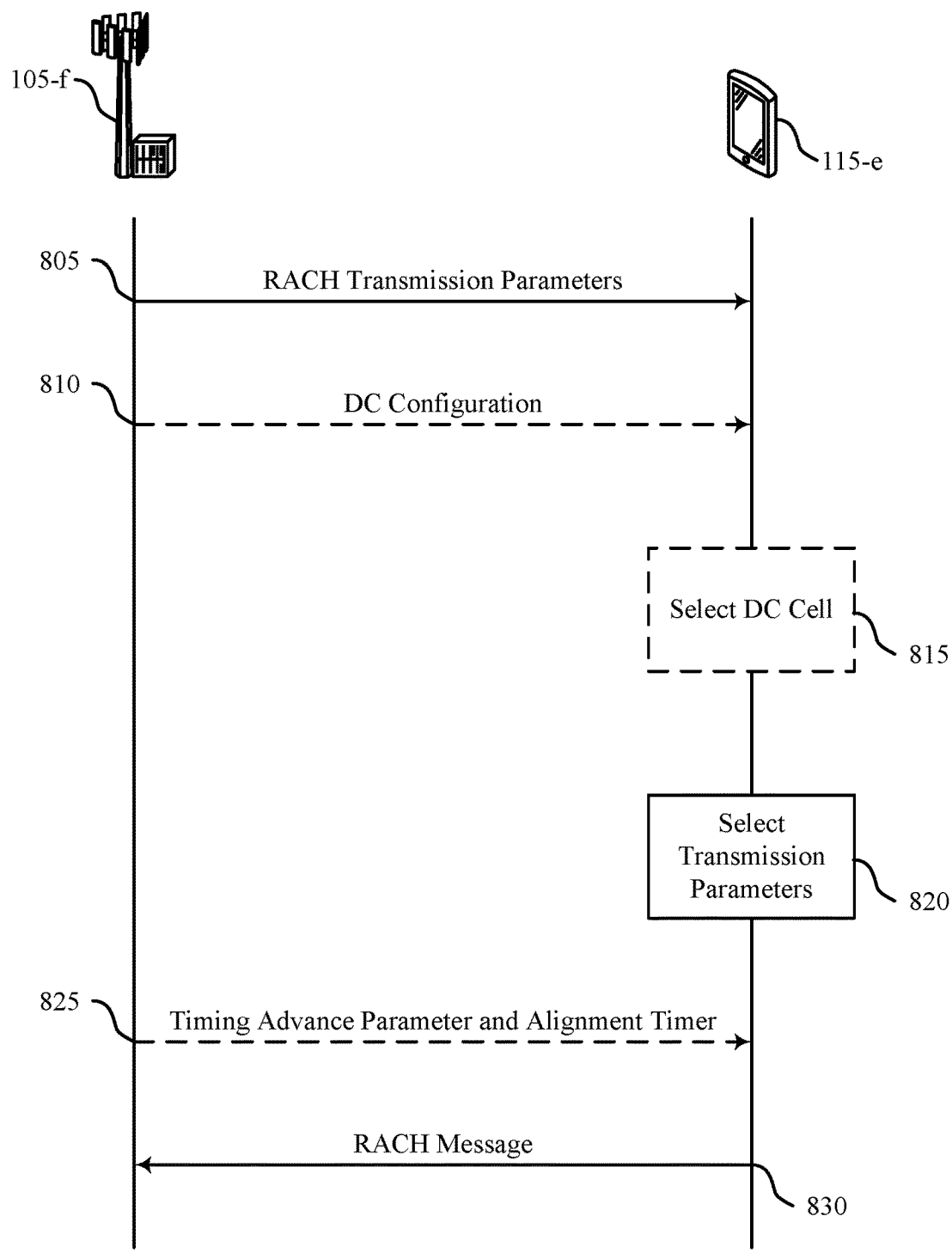

FIG. 8 illustrates an example of a process flow 800 that supports signaling of transmission parameters in accordance with aspects of the present disclosure. In some examples, process flow 800 may implement aspects of wireless communications systems 100, 200, 400, and/or 500. Process flow 800 may include a base station 105-f and a UE 115-e, which may be examples of corresponding base stations 105 and UEs 115, respectively, as described above with reference to FIGS. 1-7.

At 805, UE 115-e may receive, from base station 105-f, one or more transmission parameter sets for a RACH procedure, each of the one or more transmission parameter sets differing by at least one transmission parameter. In some cases, the RACH procedure may include a two-step RACH procedure. Additionally, the one or more transmission parameter sets for the RACH procedure are received via RRC signaling, SIB transmissions, or specified configurations for UE 115-e. In some cases, the at least one different transmission parameter may include a RACH preamble for a RACH message, time and frequency resources for the RACH message, DMRS parameters, or a combination thereof.

At 810, UE 115-e may receive, from base station 105-f, a configuration for DC communications with a PCell and an SCell. At 815, UE 115-e may select the PCell or the SCell for the RACH procedure. In some cases, the PCell or SCell is selected based on a QoS, an LBT outcome, an interference measurement, coverage requirements, or a combination thereof.

At 820, UE 115-e may select a set of transmission parameters from the one or more transmission parameter sets for transmitting a RACH message of the RACH procedure. In some cases, UE 115-e may identify a purpose of the RACH procedure and select the set of transmission parameters based on the identified purpose, where the purpose of the RACH procedure includes at least one of an initial access procedure, an RRC resume procedure, a timing advance refresh procedure, or a combination thereof. Additionally or alternatively, UE 115-e may identify if the RACH procedure is contention based or contention free and select the set of transmission parameters based on the identified contention based or contention free RACH procedure.

In some cases, UE 115-e may identify UCI to be transmitted in the RACH message and select the set of transmission parameters based on transmitting the UCI, whether the UCI is carried on a PUSCH or a PUCCH, a format of the PUCCH used to carry the UCI, a modulation order of the UCI, a size of the UCI, or a combination thereof. Additionally or alternatively, UE 115-e may select the set of transmission parameters for transmission of the RACH message based which of the PCell or the SCell is selected.

At 825, UE 115-e may receive a timing advance parameter and an alignment timer and cancel one or more transmissions based on the timing advance parameter and the alignment timer.

At 830, UE 115-e may transmit, to base station 105-f, the RACH message using the selected set of transmission parameters. In some cases, UE 115-e may transmit the RACH message to the selected PCell or SCell using the selected set of transmission parameters. Additionally or alternatively, UE 115-e may transmit uplink data with the RACH message after the alignment timer expires. In some cases, UE 115-e may receive a second timer that indicates a time window after the alignment timer expires, where the uplink data is transmitted with the RACH message within the time window.

Figure 9:
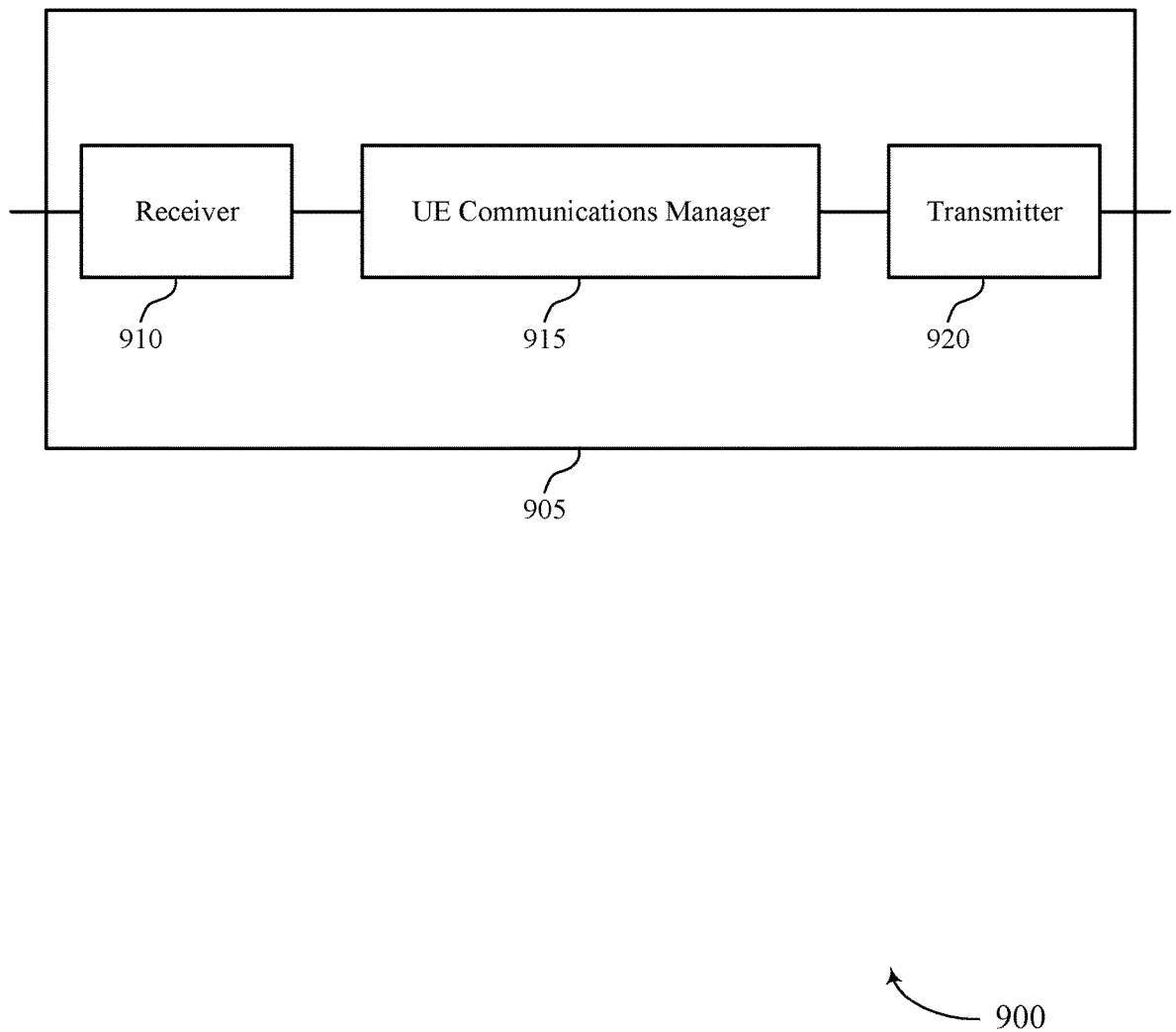
FIGS. 9 and 10 show block diagrams of devices that support signaling of transmission parameters in accordance with aspects of the present disclosure.

FIG. 9 shows a block diagram 900 of a device 905 that supports signaling of transmission parameters in accordance with aspects of the present disclosure. The device 905 may be an example of aspects of a UE 115 as described herein. The device 905 may include a receiver 910, a UE communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to signaling of transmission parameters, etc.). Information may be passed on to other components of the device 905. The receiver 910 may be an example of aspects of the transceiver 1220 described with reference to FIG. 12. The receiver 910 may utilize a single antenna or a set of antennas.

The UE communications manager 915 may identify, at the UE, a reference uplink grant configuration including a set of reference transmission parameters for subsequent communications within a single BWP. In some cases, the UE communications manager 915 may receive, at the UE, at least one transmission parameter that is different from a corresponding transmission parameter of the set of reference transmission parameters in the reference uplink grant configuration. Additionally, the UE communications manager 915 may determine to use the at least one transmission parameter instead of the corresponding transmission parameter of the set of reference transmission parameters for the subsequent communications within the single BWP. Accordingly, the UE communications manager 915 may communicate using the at least one transmission parameter.

Additionally or alternatively, the UE communications manager 915 may receive, at the UE, a set of transmission parameter sets for a RACH procedure, each of the set of transmission parameter sets differing by at least one transmission parameter. In some cases, the UE communications manager 915 may select, at the UE, a set of transmission parameters from the set of transmission parameter sets for transmitting a RACH message of the RACH procedure. Accordingly, the UE communications manager 915 may transmit, to a base station, the RACH message using the selected set of transmission parameters. The UE communications manager 915 may be an example of aspects of the UE communications manager 1210 described herein.

The UE communications manager 915, or its sub-components, may be implemented in hardware, code (e.g., software or firmware) executed by a processor, or any combination thereof. If implemented in code executed by a processor, the functions of the UE communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 915, or its sub-components, may be physically located at various positions, including being distributed such that portions of functions are implemented at different physical locations by one or more physical components. In some examples, the UE communications manager 915, or its sub-components, may be a separate and distinct component in accordance with various aspects of the present disclosure. In some examples, the UE communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
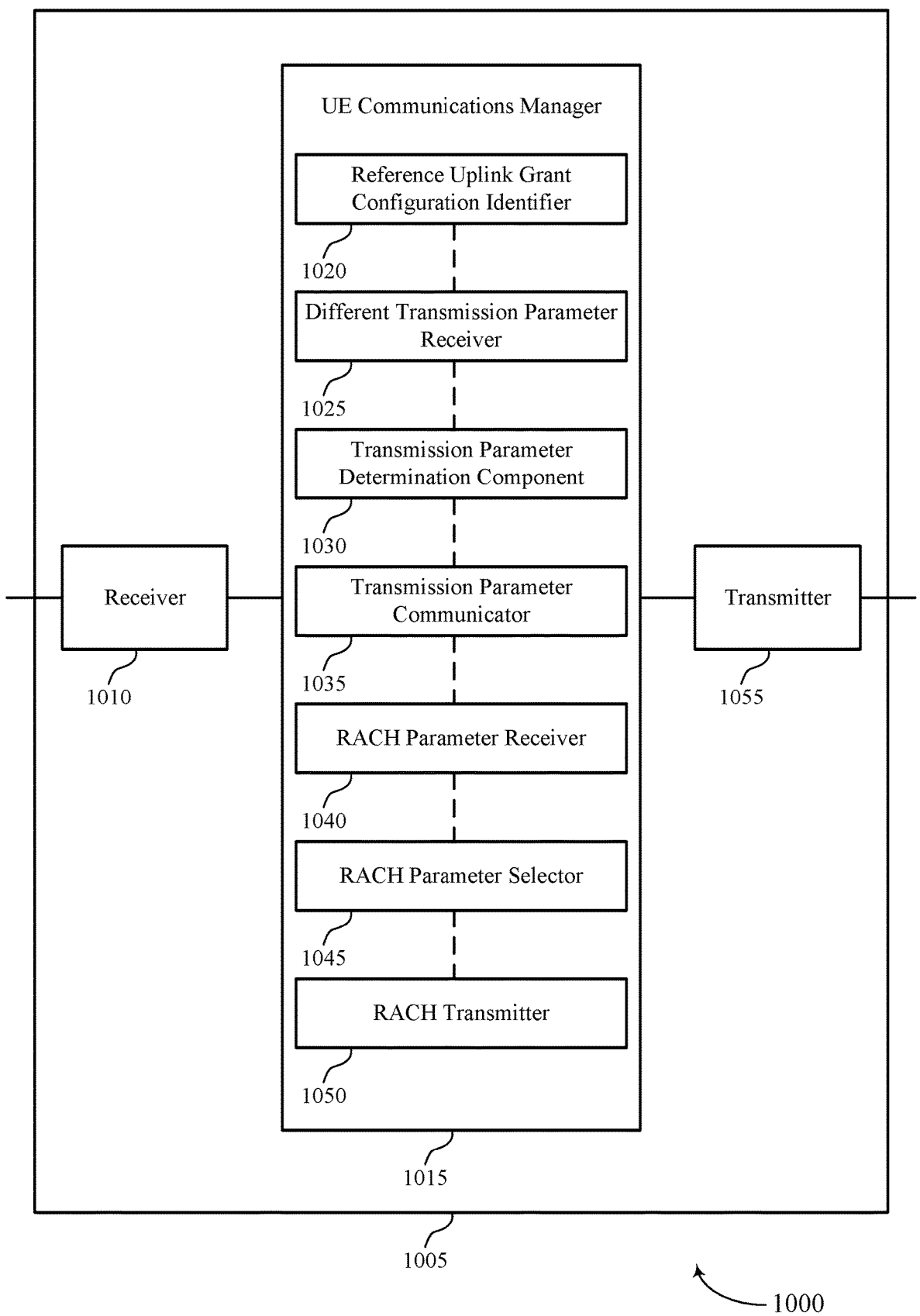

FIG. 10 shows a block diagram 1000 of a device 1005 that supports signaling of transmission parameters in accordance with aspects of the present disclosure. The device 1005 may be an example of aspects of a device 905, or a UE 115 as described herein. The device 1005 may include a receiver 1010, a UE communications manager 1015, and a transmitter 1055. The device 1005 may also include a processor. Each of these components may be in communication with one another (e.g., via one or more buses).

The receiver 1010 may receive information such as packets, user data, or control information associated with various information channels (e.g., control channels, data channels, and information related to signaling of transmission parameters, etc.). Information may be passed on to other components of the device 1005. The receiver 1010 may be an example of aspects of the transceiver 1220 described with reference to FIG. 12. The receiver 1010 may utilize a single antenna or a set of antennas.

The UE communications manager 1015 may be an example of aspects of the UE communications manager 915 as described herein. The UE communications manager 1015 may include a reference uplink grant configuration identifier 1020, a different transmission parameter receiver 1025, a transmission parameter determination component 1030, a transmission parameter communicator 1035, a RACH parameter receiver 1040, a RACH parameter selector 1045, and a RACH transmitter 1050. The UE communications manager 1015 may be an example of aspects of the UE communications manager 1210 described herein.

The actions performed by the UE communications manager 1015 as described herein may be implemented to realize one or more potential advantages. One implementation may allow a UE 115 to save power and increase battery life by avoiding having to process all of the transmission parameters that the UE 115 is to use for any subsequent uplink transmissions to the base station. Another implementation may provide improved quality and reliability of service at the UE 115, as latency and the number of separate resources allocated to the UE 115 may be reduced.

The reference uplink grant configuration identifier 1020 may identify, at the UE, a reference uplink grant configuration including a set of reference transmission parameters for subsequent communications within a single BWP.

The different transmission parameter receiver 1025 may receive, at the UE, at least one transmission parameter that is different from a corresponding transmission parameter of the set of reference transmission parameters in the reference uplink grant configuration.

The transmission parameter determination component 1030 may determine to use the at least one transmission parameter instead of the corresponding transmission parameter of the set of reference transmission parameters for the subsequent communications within the single BWP.

The transmission parameter communicator 1035 may communicate using the at least one transmission parameter.

The RACH parameter receiver 1040 may receive, at the UE, a set of transmission parameter sets for a RACH procedure, each of the set of transmission parameter sets differing by at least one transmission parameter.

The RACH parameter selector 1045 may select, at the UE, a set of transmission parameters from the set of transmission parameter sets for transmitting a RACH message of the RACH procedure.

The RACH transmitter 1050 may transmit, to a base station, the RACH message using the selected set of transmission parameters. In some examples, the RACH transmitter 1050 may transmit the random access preamble via a random access channel and transmit the information message via an information channel.

The transmitter 1055 may transmit signals generated by other components of the device 1005. In some examples, the transmitter 1055 may be collocated with a receiver 1010 in a transceiver module. For example, the transmitter 1055 may be an example of aspects of the transceiver 1220 described with reference to FIG. 12. The transmitter 1055 may utilize a single antenna or a set of antennas.

Figure 11:
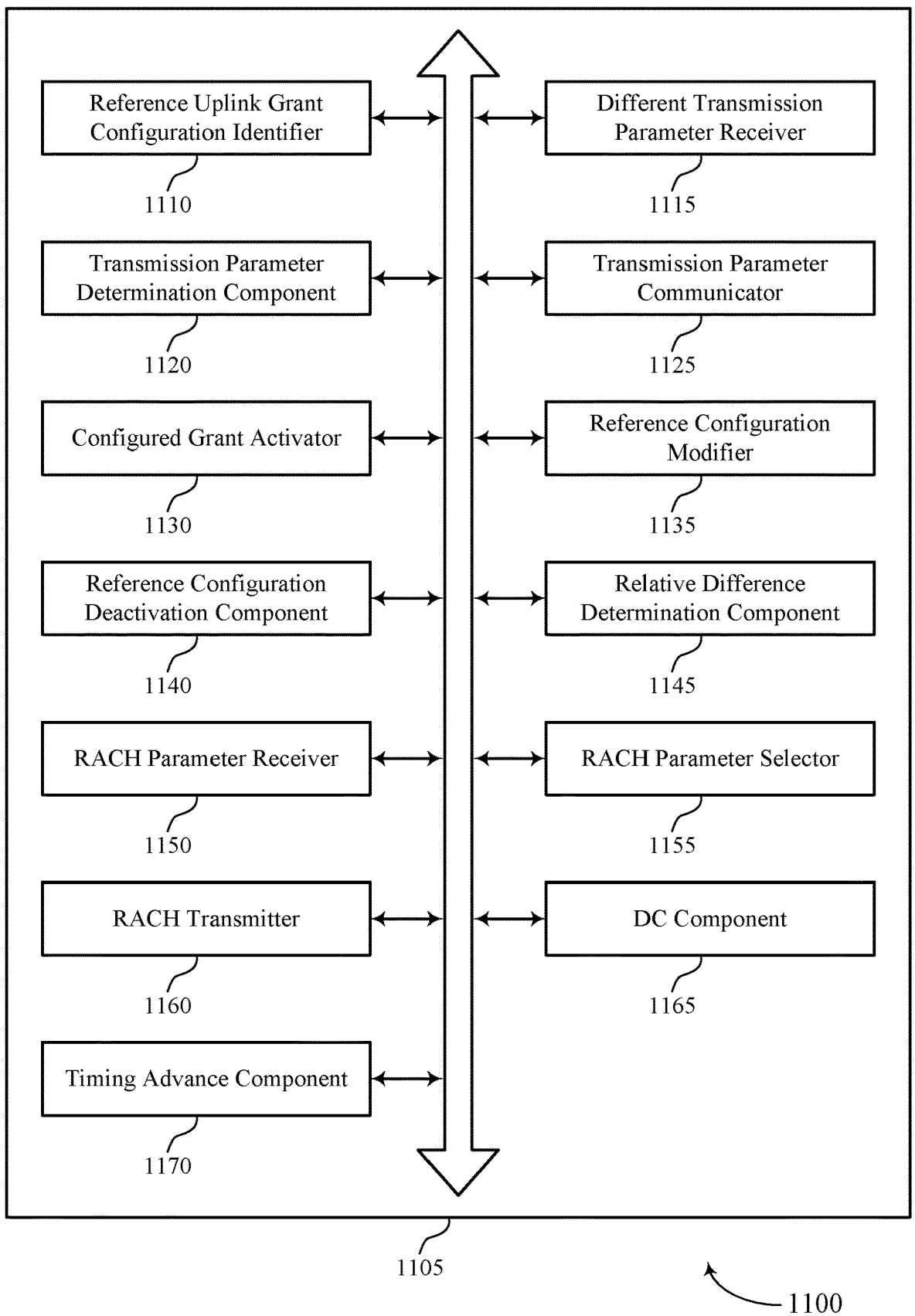
FIG. 11 shows a block diagram of a UE communications manager that supports signaling of transmission parameters in accordance with aspects of the present disclosure.

FIG. 11 shows a block diagram 1100 of a UE communications manager 1105 that supports signaling of transmission parameters in accordance with aspects of the present disclosure. The UE communications manager 1105 may be an example of aspects of a UE communications manager 915, a UE communications manager 1015, or a UE communications manager 1210 described herein. The UE communications manager 1105 may include a reference uplink grant configuration identifier 1110, a different transmission parameter receiver 1115, a transmission parameter determination component 1120, a transmission parameter communicator 1125, a configured grant activator 1130, a reference configuration modifier 1135, a reference configuration deactivation component 1140, a relative difference determination component 1145, a RACH parameter receiver 1150, a RACH parameter selector 1155, a RACH transmitter 1160, a DC component 1165, and a timing advance component 1170. Each of these modules may communicate, directly or indirectly, with one another (e.g., via one or more buses).

The reference uplink grant configuration identifier 1110 may identify, at the UE, a reference uplink grant configuration including a set of reference transmission parameters for subsequent communications within a single BWP. In some examples, the reference uplink grant configuration identifier 1110 may receive one or more reference uplink grant configurations with a reference configuration index for each reference uplink grant configuration, where the at least one transmission parameter indicates one reference configuration index for determining to use the at least one transmission parameter instead of the corresponding transmission parameter of the set of reference transmission parameters. Additionally or alternatively, the reference uplink grant configuration identifier 1110 may receive the reference uplink grant configuration with a field that indicates the reference uplink grant configuration is used for determining to use the at least one transmission parameter instead of the corresponding transmission parameter of the set of reference transmission parameters after the reference uplink grant configuration is received.

In some examples, the reference uplink grant configuration identifier 1110 may receive a configured uplink grant including the reference uplink grant configuration. Additionally, the reference uplink grant configuration identifier 1110 may receive, in a dependent uplink configuration, the at least one transmission parameter that is different from the corresponding transmission parameter of the set of reference transmission parameters in the reference uplink grant configuration.

In some examples, the reference uplink grant configuration identifier 1110 may receive an uplink grant configuration, where the uplink grant configuration includes a set of configured uplink grants and may select one of the set of configured uplink grants from the uplink grant configuration based on an indication received with the at least one transmission parameter.

Additionally or alternatively, the reference uplink grant configuration identifier 1110 may receive a set of uplink grant configurations, where each of the set of uplink grant configurations includes one of a set of configured uplink grants and select one of the set of configured uplink grants from the set of uplink grant configurations based on an indication received with on the at least one transmission parameter.

In some cases, the reference uplink grant configuration may include at least one of a modulation and coding scheme, a transport block size, power control parameters, spreading factor for non-orthogonal multiple access, or a combination thereof. Additionally or alternatively, the reference uplink grant configuration may be identified via RRC signaling, SIB transmissions, or specified configurations for the UE.

The different transmission parameter receiver 1115 may receive, at the UE, at least one transmission parameter that is different from a corresponding transmission parameter of the set of reference transmission parameters in the reference uplink grant configuration. In some cases, the at least one transmission parameter that is different than the corresponding transmission parameter of the set of reference signals may include a time resource allocation, a frequency resource allocation, a DMRS port, a DMRS scrambling seed, a DMRS seed identification, a DMRS physical uplink shared channel rate matching parameter, a traffic to pilot ratio, or a combination thereof.

The transmission parameter determination component 1120 may determine to use the at least one transmission parameter instead of the corresponding transmission parameter of the set of reference transmission parameters for the subsequent communications within the single BWP. In some examples, the transmission parameter determination component 1120 may identify a frequency allocation parameter associated with the at least one transmission parameter, where the at least one transmission parameter is used instead of the corresponding transmission parameter of the set of reference transmission parameters for a portion of the single BWP based on the frequency allocation parameter. Additionally or alternatively, the transmission parameter determination component 1120 may identify a DMRS parameter with the at least one transmission parameter, where the at least one transmission parameter is used instead of the corresponding transmission parameter of the set of reference transmission parameters for a portion of the single BWP based on the DMRS parameter.

The transmission parameter communicator 1125 may communicate using the at least one transmission parameter.

The configured grant activator 1130 may receive a dedicated reference uplink configuration, where the at least one transmission parameter is determined to be used instead of a corresponding transmission parameter based on the dedicated uplink configuration and activate a type one or a type two configured grant based on a higher-layer configured uplink grant in the dedicated reference uplink configuration.

In some examples, the configured grant activator 1130 may receive an uplink grant configuration for the subsequent communications, where the uplink grant configuration includes the higher-layer configured uplink grant with no transmission parameters and activate the type two configured grant based on receiving the higher-layer configured uplink grant with no transmission parameters.

Additionally or alternatively, the configured grant activator 1130 may receive an uplink grant configuration for the subsequent communications, where the uplink grant configuration includes the higher-layer configured uplink grant and activate the type one configured grant based on receiving the higher-layer configured uplink grant.

The reference configuration modifier 1135 may receive a modification to the reference uplink grant configuration. In some examples, the reference configuration modifier 1135 may determine whether to apply the modification to the at least one transmission parameter that is different from the corresponding transmission parameter of the set of reference transmission parameters in the reference uplink grant configuration and may modify the at least one transmission parameter based on the determination.

In some examples, the reference configuration modifier 1135 may deactivate the at least one transmission parameter, the reference uplink grant configuration, or a combination thereof based on receiving the modification. Additionally or alternatively, the reference configuration modifier 1135 may reconfigure the at least one transmission parameter based on receiving the modification.

The reference configuration deactivation component 1140 may receive an indication to deactivate the reference uplink grant configuration, determine whether to deactivate the at least one transmission parameter, and deactivate the at least one transmission parameter based on the determination. In some examples, the reference configuration deactivation component 1140 may combine the at least one transmission parameter and the reference set of transmission parameters based on receiving the indication to deactivate the reference uplink grant configuration and communicate using the combination of the at least one transmission parameter and the reference set of transmission parameters.

The relative difference determination component 1145 may receive the reference uplink grant configuration including the set of reference transmission parameters, determine a difference between the at least one transmission parameter and the set of reference transmission parameters, identify an additional transmission parameter based on the determined difference, and communicate using the additional transmission parameter and the at least one transmission parameter.

The RACH parameter receiver 1150 may receive, at the UE, a set of transmission parameter sets for a RACH procedure, each of the set of transmission parameter sets differing by at least one transmission parameter. In some cases, the RACH procedure may include a two-step RACH procedure. Additionally, the set of transmission parameter sets for the RACH procedure may be received via RRC signaling, SIB transmissions, or specified configurations for the UE. In some cases, the at least one transmission parameter may include a RACH preamble for the RACH message, time and frequency resources for the RACH message, DMRS parameters, or a combination thereof.

The RACH parameter selector 1155 may select, at the UE, a set of transmission parameters from the set of transmission parameter sets for transmitting a RACH message of the RACH procedure. In some examples, the RACH parameter selector 1155 may identify a purpose of the RACH procedure and select the set of transmission parameters based on the identified purpose. In some cases, the purpose of the RACH procedure includes at least one of an initial access procedure, a RRC resume procedure, a timing advance refresh procedure, or a combination thereof. Additionally or alternatively, the RACH parameter selector 1155 may identify if the RACH procedure is contention based or contention free and select the set of transmission parameters based on the identified contention based or contention free RACH procedure.

In some cases, the RACH parameter selector 1155 may identify UCI to be transmitted in the RACH message and select the set of transmission parameters based on transmitting the UCI, whether the UCI is carried on a physical uplink shared channel or a physical uplink control channel, a format of the physical uplink control channel used to carry the UCI, a modulation order of the UCI, a size of the UCI, or a combination thereof.

The RACH transmitter 1160 may transmit, to a base station, the RACH message using the selected set of transmission parameters.

The DC component 1165 may receive a configuration for dual connectivity communications with a primary cell and a secondary cell, select the primary cell or the secondary cell for the RACH procedure, select the set of transmission parameters for transmission of the RACH message based on which of the primary cell or the secondary cell is selected, and transmit the RACH message to the selected primary cell or secondary cell using the selected set of transmission parameters. In some examples, the DC component 1165 may indicate the selected primary cell or secondary cell using a preamble for the RACH message, a DMRS for the RACH message, RACH resources for the RACH message, or a combination thereof. In some cases, the primary cell or secondary cell may be selected based on a quality of service, a listen-before-transmit outcome, an interference measurement, coverage requirements, or a combination thereof.

The timing advance component 1170 may receive a timing advance parameter and an alignment timer. In some examples, the timing advance component 1170 may determine that the time window has expired. Additionally, the timing advance component 1170 may transmit a data message on the data channel subsequent to the expiration of the time window. In some examples, the timing advance component 1170 may receive a second timer specifying a second time window.

Figure 12:
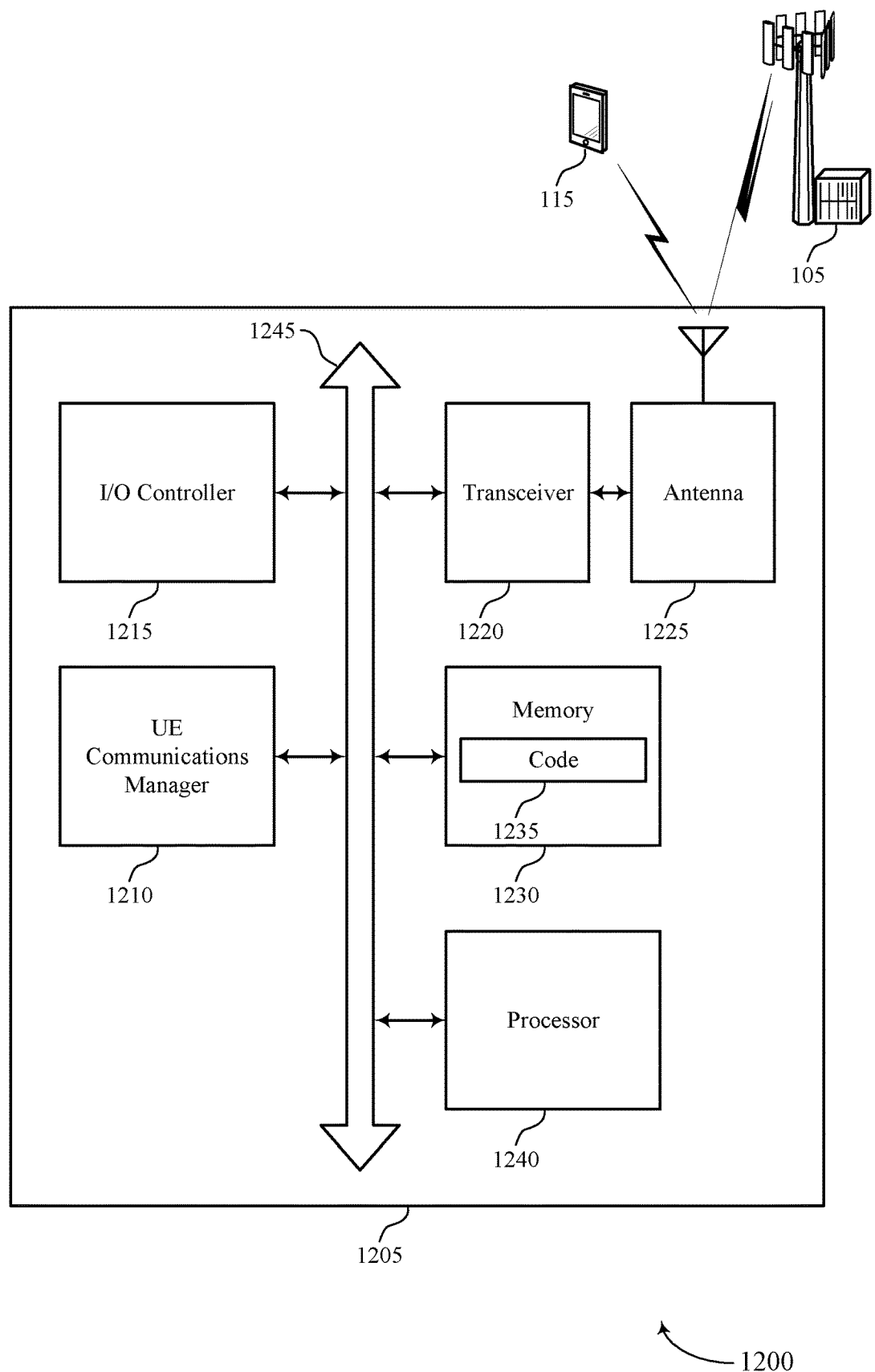
FIG. 12 shows a diagram of a system including a device that supports signaling of transmission parameters in accordance with aspects of the present disclosure.

FIG. 12 shows a diagram of a system 1200 including a device 1205 that supports signaling of transmission parameters in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a UE communications manager 1210, an I/O controller 1215, a transceiver 1220, an antenna 1225, memory 1230, and a processor 1240. These components may be in electronic communication via one or more buses (e.g., bus 1245).

The UE communications manager 1210 may identify, at the UE, a reference uplink grant configuration including a set of reference transmission parameters for subsequent communications within a single BWP. In some cases, the UE communications manager 1210 may receive, at the UE, at least one transmission parameter that is different from a corresponding transmission parameter of the set of reference transmission parameters in the reference uplink grant configuration. Additionally, the UE communications manager 1210 may determine to use the at least one transmission parameter instead of the corresponding transmission parameter of the set of reference transmission parameters for the subsequent communications within the single BWP. Accordingly, the UE communications manager 1210 may communicate using the at least one transmission parameter.

Additionally or alternatively, the UE communications manager 1210 may receive, at the UE, a set of transmission parameter sets for a RACH procedure, each of the set of transmission parameter sets differing by at least one transmission parameter. In some cases, the UE communications manager 1210 may select, at the UE, a set of transmission parameters from the set of transmission parameter sets for transmitting a RACH message of the RACH procedure. Accordingly, the UE communications manager 1210 may transmit, to a base station, the RACH message using the selected set of transmission parameters.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic I/O system (BIOS) which may control basic hardware or software operation such as the interaction with peripheral components or devices.

The processor 1240 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting signaling of transmission parameters).

Based on enhanced signaling of transmission parameters, a processor 1240 may efficiently determine transmission parameters for subsequent communications with a base station. As such, when the transmission parameters are received, the processor may be ready to respond more efficiently through the reduction of a ramp up in processing power.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
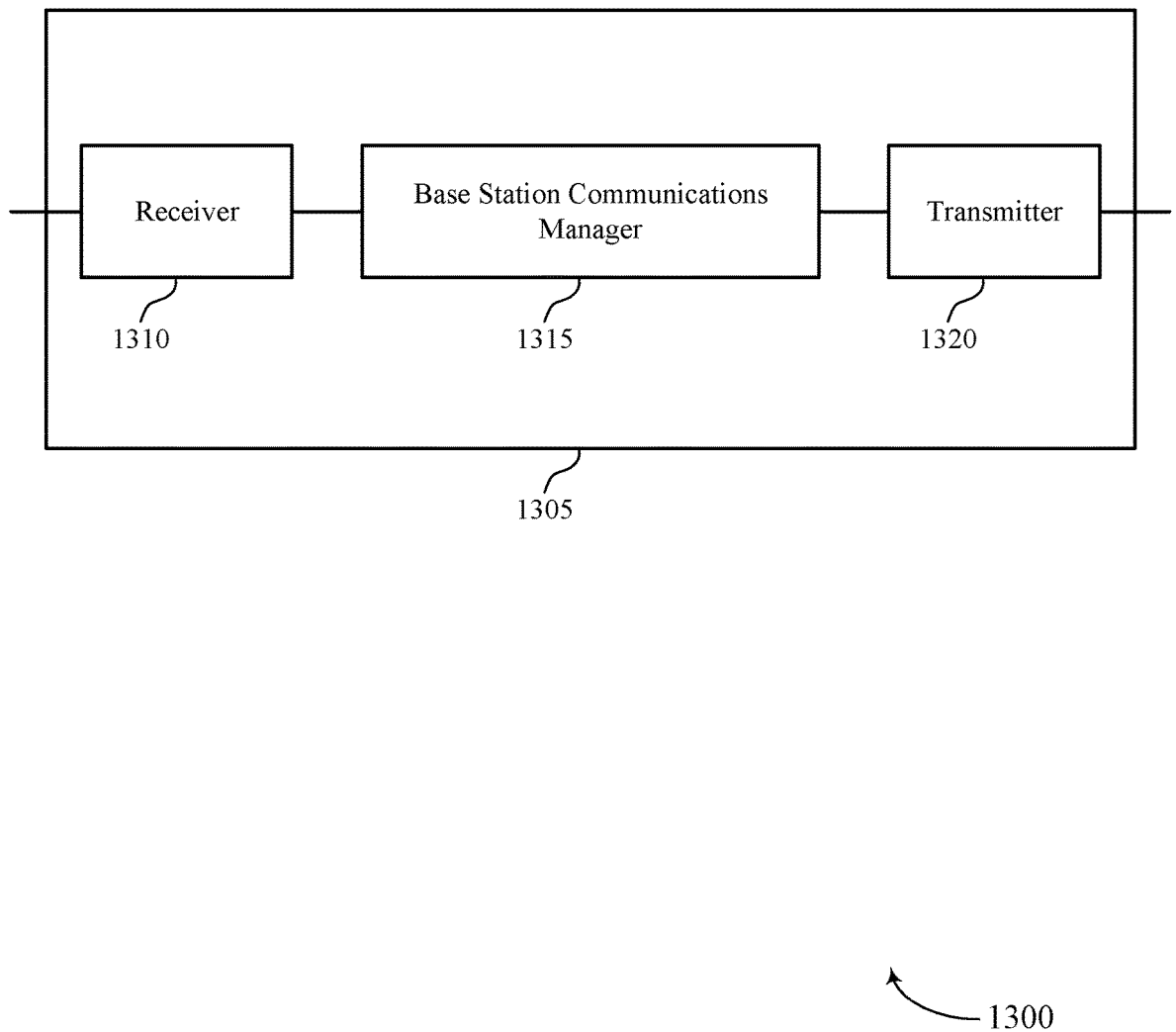
FIGS. 13 and 14 show block diagrams of devices that support signaling of transmission parameters in accordance with aspects of the present disclosure.

FIG. 13 shows a block diagram 1300 of a device 1305 that supports signaling of transmission parameters in accordance with aspects of the present disclosure. The device 1305 may be an example of aspects of a base station 105 as described herein. The device 1305 may include a receiver 1310, a base station communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to signaling of transmission parameters, etc.). Information may be passed on to other components of the device 1305. The receiver 1310 may be an example of aspects of the transceiver 1620 described with reference to FIG. 16. The receiver 1310 may utilize a single antenna or a set of antennas.

The base station communications manager 1315 may transmit, to a UE, a reference uplink grant configuration including a set of reference transmission parameters for subsequent communications within a single BWP. Additionally, the base station communications manager 1315 may transmit, to the UE, at least one transmission parameter that is different from a corresponding transmission parameter of the set of reference transmission parameters in the reference uplink grant configuration. In some cases, the base station communications manager 1315 may communicate, with the UE, using the at least one transmission parameter.

Additionally or alternatively, the base station communications manager 1315 may also transmit, to a UE, a set of transmission parameter sets for a RACH procedure, each of the set of transmission parameter sets differing by at least one transmission parameter. In some cases, the base station communications manager 1315 may receive, from the UE, a RACH message for the RACH procedure in accordance with one of the set of transmission parameter sets. The base station communications manager 1315 may be an example of aspects of the base station communications manager 1610 described herein.

The base station communications manager 1315, or its sub-components, may be implemented in hardware, code (e.g., software or firmware) executed by a processor, or any combination thereof. If implemented in code executed by a processor, the functions of the base station communications manager 1315, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 1315, or its sub-components, may be physically located at various positions, including being distributed such that portions of functions are implemented at different physical locations by one or more physical components. In some examples, the base station communications manager 1315, or its sub-components, may be a separate and distinct component in accordance with various aspects of the present disclosure. In some examples, the base station communications manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
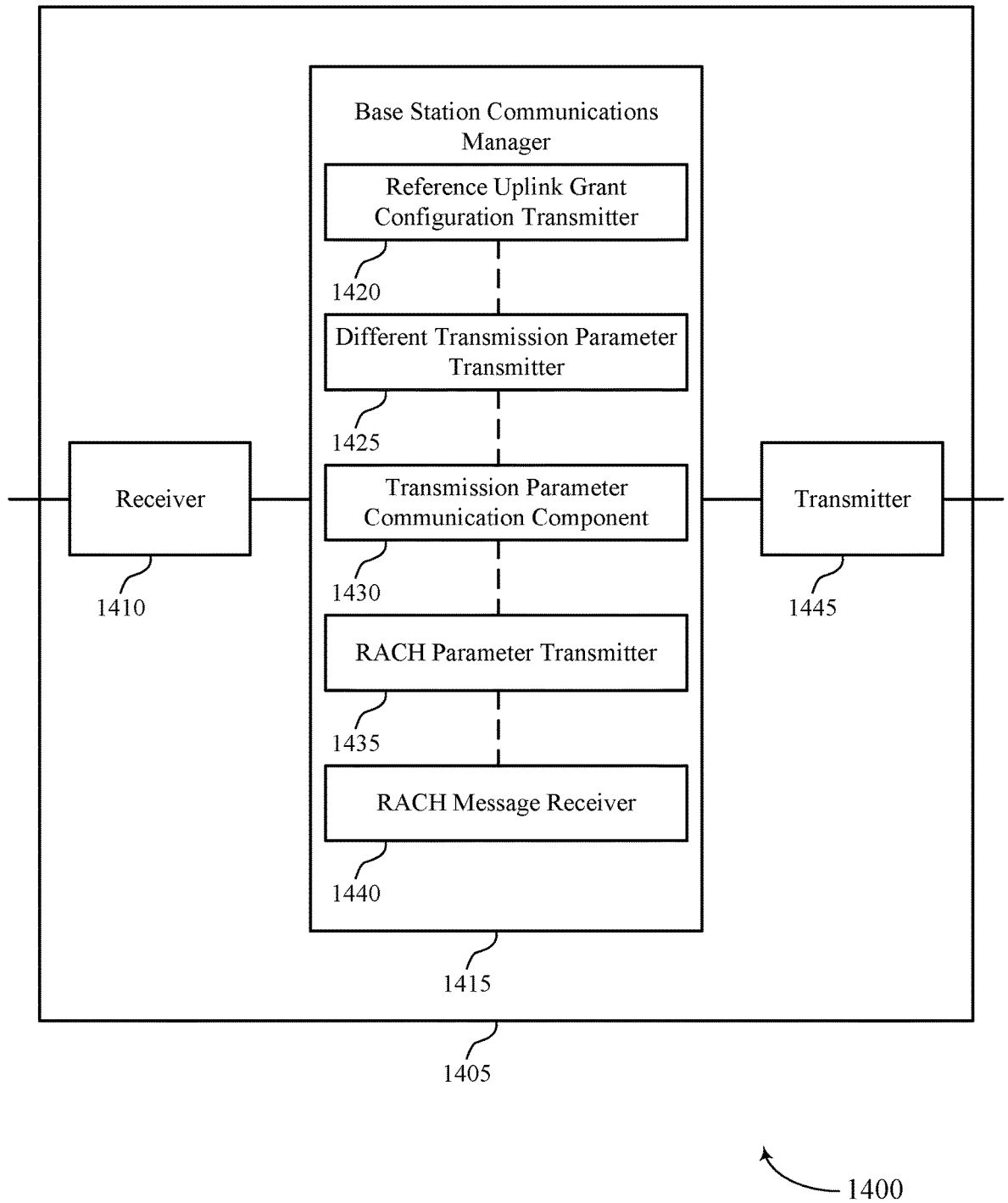

FIG. 14 shows a block diagram 1400 of a device 1405 that supports signaling of transmission parameters in accordance with aspects of the present disclosure. The device 1405 may be an example of aspects of a device 1305, or a base station 105 as described herein. The device 1405 may include a receiver 1410, a base station communications manager 1415, and a transmitter 1445. The device 1405 may also include a processor. Each of these components may be in communication with one another (e.g., via one or more buses).

The receiver 1410 may receive information such as packets, user data, or control information associated with various information channels (e.g., control channels, data channels, and information related to signaling of transmission parameters, etc.). Information may be passed on to other components of the device 1405. The receiver 1410 may be an example of aspects of the transceiver 1620 described with reference to FIG. 16. The receiver 1410 may utilize a single antenna or a set of antennas.

The base station communications manager 1415 may be an example of aspects of the base station communications manager 1315 as described herein. The base station communications manager 1415 may include a reference uplink grant configuration transmitter 1420, a different transmission parameter transmitter 1425, a transmission parameter communication component 1430, a RACH parameter transmitter 1435, and a RACH message receiver 1440. The base station communications manager 1415 may be an example of aspects of the base station communications manager 1610 described herein.

The actions performed by the base station communications manager 1415 as described herein may be implemented to realize one or more potential advantages. One implementation may allow a base station 105 to more efficiently use resources as it does not have to signal all the transmission parameters to the UE at once. Another implementation may provide improved quality and reliability of service at the base station 105, as latency and the number of separate resources allocated to the UE 115 may be reduced.

The reference uplink grant configuration transmitter 1420 may transmit, to a UE, a reference uplink grant configuration including a set of reference transmission parameters for subsequent communications within a single BWP.

The different transmission parameter transmitter 1425 may transmit, to the UE, at least one transmission parameter that is different from a corresponding transmission parameter of the set of reference transmission parameters in the reference uplink grant configuration.

The transmission parameter communication component 1430 may communicate, with the UE, using the at least one transmission parameter.

The RACH parameter transmitter 1435 may transmit, to a UE, a set of transmission parameter sets for a RACH procedure, each of the set of transmission parameter sets differing by at least one transmission parameter.

The RACH message receiver 1440 may receive, from the UE, a RACH message for the RACH procedure in accordance with one of the set of transmission parameter sets. In some examples, the RACH message receiver 1440 may receive the random access preamble via a random access channel and receive the information message via an information channel.

The transmitter 1445 may transmit signals generated by other components of the device 1405. In some examples, the transmitter 1445 may be collocated with a receiver 1410 in a transceiver module. For example, the transmitter 1445 may be an example of aspects of the transceiver 1620 described with reference to FIG. 16. The transmitter 1445 may utilize a single antenna or a set of antennas.

Figure 15:
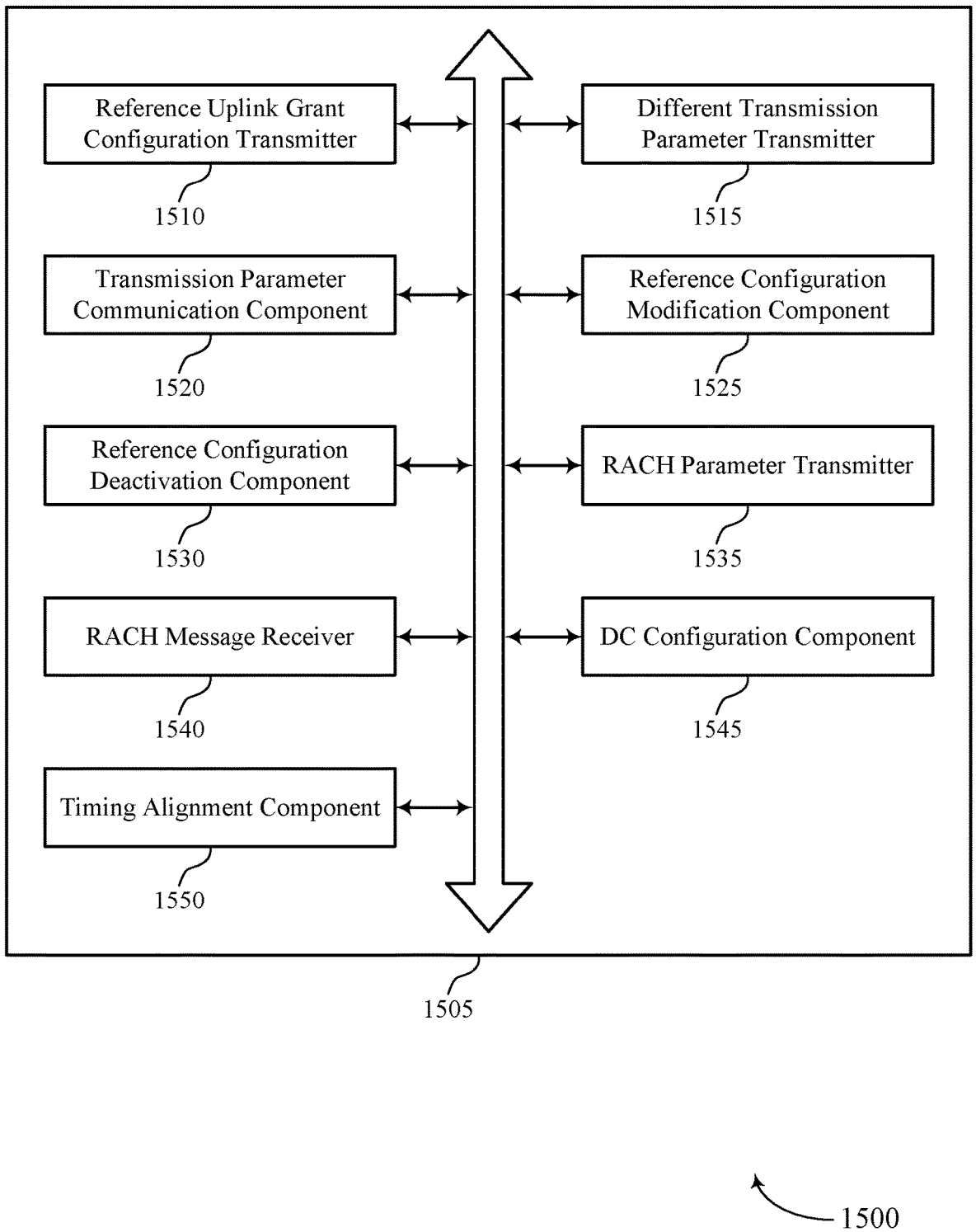
FIG. 15 shows a block diagram of a base station communications manager that supports signaling of transmission parameters in accordance with aspects of the present disclosure.

FIG. 15 shows a block diagram 1500 of a base station communications manager 1505 that supports signaling of transmission parameters in accordance with aspects of the present disclosure. The base station communications manager 1505 may be an example of aspects of a base station communications manager 1315, a base station communications manager 1415, or a base station communications manager 1610 described herein. The base station communications manager 1505 may include a reference uplink grant configuration transmitter 1510, a different transmission parameter transmitter 1515, a transmission parameter communication component 1520, a reference configuration modification component 1525, a reference configuration deactivation component 1530, a RACH parameter transmitter 1535, a RACH message receiver 1540, a DC configuration component 1545, and a timing alignment component 1550. Each of these modules may communicate, directly or indirectly, with one another (e.g., via one or more buses).

The reference uplink grant configuration transmitter 1510 may transmit, to a UE, a reference uplink grant configuration including a set of reference transmission parameters for subsequent communications within a single BWP. In some cases, the reference uplink grant configuration may include at least one of a modulation and coding scheme, a transport block size, power control parameters, spreading factor for non-orthogonal multiple access, or a combination thereof. Additionally, the reference uplink grant configuration may be transmitted via RRC signaling, SIB transmissions, or specified configurations for the UE.

In some examples, the reference uplink grant configuration transmitter 1510 may transmit one or more reference uplink grant configurations with a reference configuration index for each reference uplink grant configuration, where the at least one transmission parameter includes an indication of one reference configuration index for the UE to identify the at least one transmission parameter that is different than the corresponding transmission parameter of the set of reference transmission parameters.

Additionally or alternatively, the reference uplink grant configuration transmitter 1510 may transmit the reference uplink grant configuration with a field that indicates the reference uplink grant configuration is used by the UE to identify the at least one transmission parameter instead of the corresponding transmission parameter of the set of reference transmission parameters after the reference uplink grant configuration is transmitted.

In some examples, the reference uplink grant configuration transmitter 1510 may transmit a dedicated reference uplink configuration, where the at least one transmission parameter is identified by the UE to be used instead of a corresponding transmission parameter based on the dedicated uplink configuration.

Additionally or alternatively, the reference uplink grant configuration transmitter 1510 may transmit a higher-layer configured uplink grant in the dedicated reference signal, where the higher-layer configured uplink grant activates a type one configured grant for the UE.

In some examples, the reference uplink grant configuration transmitter 1510 may transmit a configured uplink grant including the reference uplink grant configuration and transmit, in a dependent uplink configuration, the at least one transmission parameter that is different from the corresponding transmission parameter of the set of reference transmission parameters in the reference uplink grant configuration.

Additionally or alternatively, the reference uplink grant configuration transmitter 1510 may transmit, to the UE, the reference set of transmission parameters, where the subsequent communications are transmitted based on a difference between the at least one transmission parameter and the reference set of transmission parameters.

In some examples, the reference uplink grant configuration transmitter 1510 may transmit, to the UE, an uplink grant configuration, where the uplink grant configuration includes the reference uplink grant configuration. Additionally or alternatively, the reference uplink grant configuration transmitter 1510 may transmit a set of uplink grant configurations, where each of the set of uplink grant configurations includes one of a set of reference uplink grant configurations.

The different transmission parameter transmitter 1515 may transmit, to the UE, at least one transmission parameter that is different from a corresponding transmission parameter of the set of reference transmission parameters in the reference uplink grant configuration. In some cases, the at least one transmission parameter that is different than the corresponding transmission parameter of the set of reference signals may include a time resource allocation, a frequency resource allocation, a DMRS port, a DMRS scrambling seed, a DMRS seed identification, a DMRS physical uplink shared channel rate matching parameter, a traffic to pilot ratio, or a combination thereof.

The transmission parameter communication component 1520 may communicate, with the UE, using the at least one transmission parameter.

The reference configuration modification component 1525 may transmit a modification to the reference uplink grant configuration and communicate, with the UE, based on the modification. In some examples, the reference configuration modification component 1525 may reconfigure the at least one transmission parameter based on the modification. Additionally or alternatively, the reference configuration modification component 1525 may transmit, to the UE, the at least one reconfigured transmission parameter.

The reference configuration deactivation component 1530 may receive an indication to deactivate the reference uplink grant configuration and communicate, with the UE, based on the indication to deactivate the reference uplink grant configuration.

The RACH parameter transmitter 1535 may transmit, to a UE, a set of transmission parameter sets for a RACH procedure, each of the set of transmission parameter sets differing by at least one transmission parameter. In some cases, the RACH procedure may be performed for an initial access procedure, a RRC resume procedure, a timing advance refresh procedure, or a combination thereof. Additionally, the RACH procedure is a contention based RACH procedure or a contention free RACH procedure. In some cases, the RACH procedure includes a two-step RACH procedure.

Additionally, the set of transmission parameter sets for the RACH procedure may be transmitted via RRC signaling, SIB transmissions, or specified configurations for the UE. In some cases, the at least one transmission parameter includes a RACH preamble for the RACH message, time and frequency resources for the RACH message, DMRS parameters, or a combination thereof.

The RACH message receiver 1540 may receive, from the UE, a RACH message for the RACH procedure in accordance with one of the set of transmission parameter sets.

The DC configuration component 1545 may transmit, to the UE, a configuration for dual connectivity communications with a primary cell and a secondary cell and receive the RACH message on the primary cell or secondary cell. In some examples, the DC configuration component 1545 may receive an indication of the primary cell or secondary cell via a preamble of the RACH message, a DMRS for the RACH message, RACH resources for the RACH message, or a combination thereof.

The timing alignment component 1550 may transmit, to the UE, a timing advance parameter and an alignment timer and receive, from the UE, uplink data with the RACH message after the alignment timer expires.

In some examples, the timing alignment component 1550 may transmit a second timer that indicates a time window after the alignment timer expires, where the uplink data is received with the RACH message within the time window.

Figure 16:
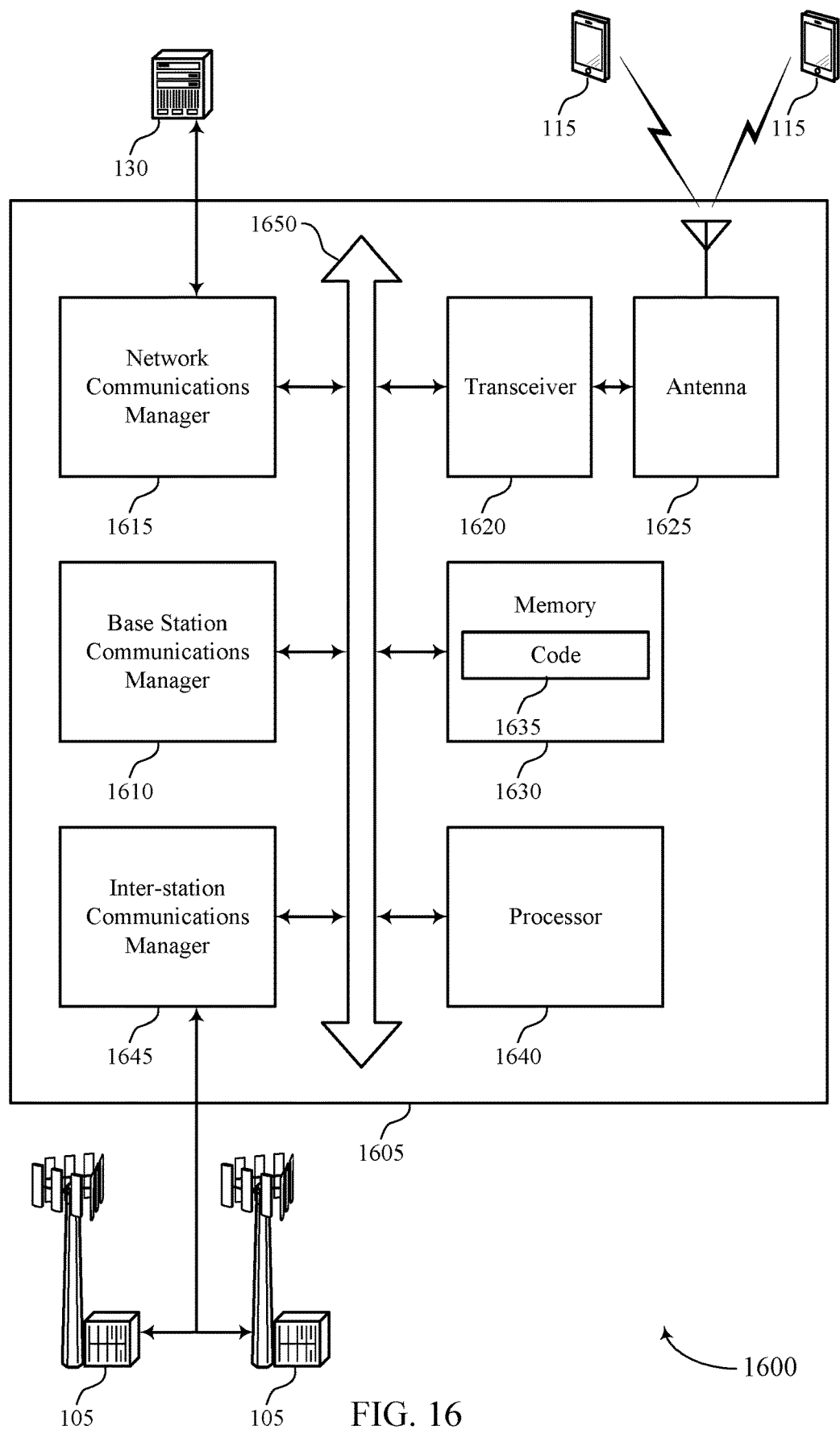
FIG. 16 shows a diagram of a system including a device that supports signaling of transmission parameters in accordance with aspects of the present disclosure.

FIG. 16 shows a diagram of a system 1600 including a device 1605 that supports signaling of transmission parameters in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a base station communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The base station communications manager 1610 may transmit, to a UE, a reference uplink grant configuration including a set of reference transmission parameters for subsequent communications within a single BWP. Additionally, the base station communications manager 1610 may transmit, to the UE, at least one transmission parameter that is different from a corresponding transmission parameter of the set of reference transmission parameters in the reference uplink grant configuration. In some cases, the base station communications manager 1610 may communicate, with the UE, using the at least one transmission parameter.

Additionally or alternatively, the base station communications manager 1610 may also transmit, to a UE, a set of transmission parameter sets for a RACH procedure, each of the set of transmission parameter sets differing by at least one transmission parameter. In some cases, the base station communications manager 1610 may receive, from the UE, a RACH message for the RACH procedure in accordance with one of the set of transmission parameter sets.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting signaling of transmission parameters).

Based on enhanced signaling of transmission parameters, a processor 1640 may efficiently determine transmission parameters for subsequent communications with a UE. In an example, any change to the transmission parameters may lead to all of the transmission parameters being transmitted again. As such, in reducing transmission parameters, the processor may be ready to respond more efficiently through the reduction of a ramp up in processing power.

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
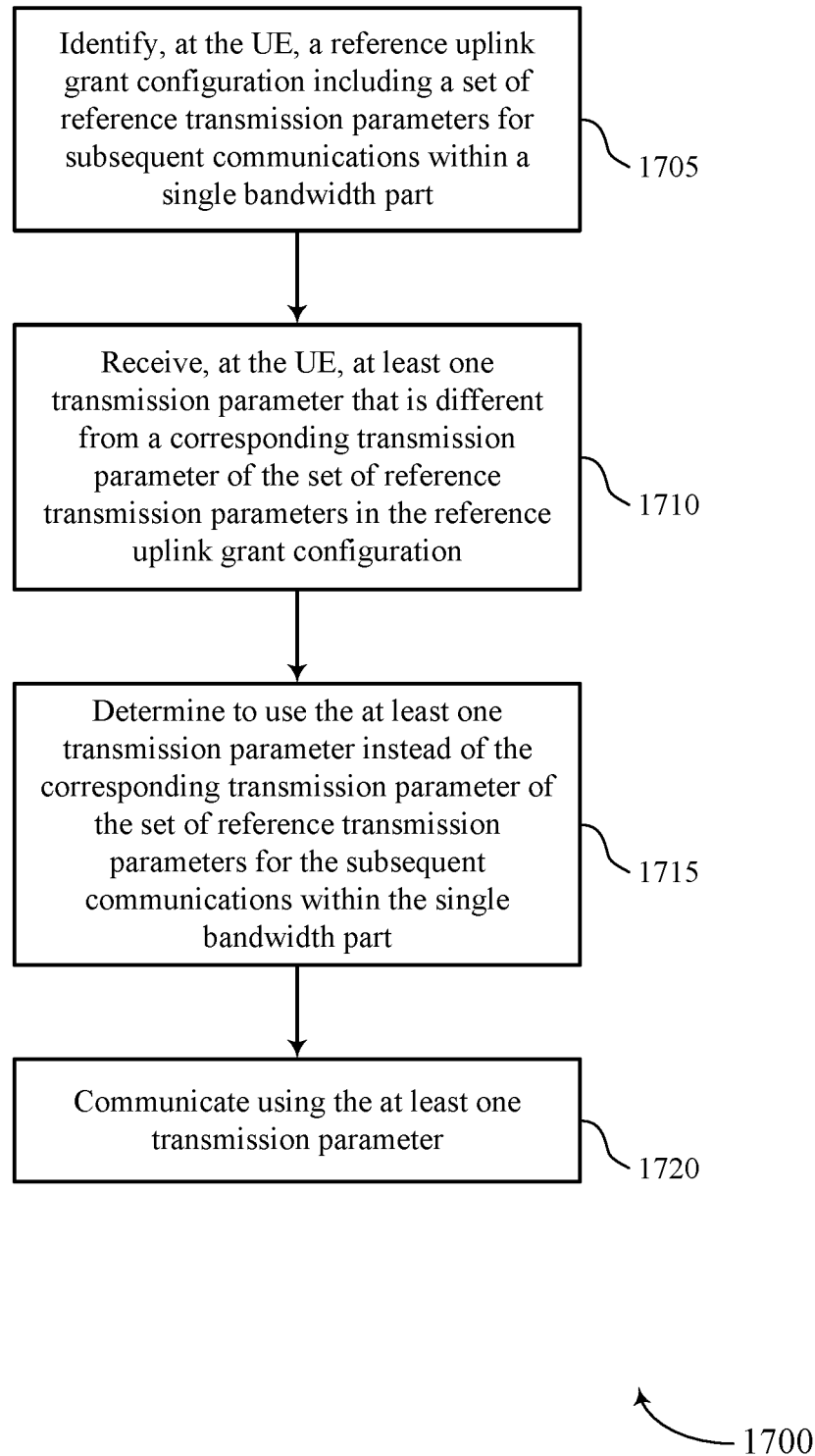
FIGS. 17 through 20 show flowcharts illustrating methods that support signaling of transmission parameters in accordance with aspects of the present disclosure.

FIG. 17 shows a flowchart illustrating a method 1700 that supports signaling of transmission parameters in accordance with aspects of the present disclosure. The operations of method 1700 may be implemented by a UE 115 or its components as described herein. For example, the operations of method 1700 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may identify, at the UE, a reference uplink grant configuration including a set of reference transmission parameters for subsequent communications within a single BWP. The operations of 1705 may be performed according to the methods described herein. In some examples, aspects of the operations of 1705 may be performed by a reference uplink grant configuration identifier as described with reference to FIGS. 9 through 12.

At 1710, the UE may receive, at the UE, at least one transmission parameter that is different from a corresponding transmission parameter of the set of reference transmission parameters in the reference uplink grant configuration. The operations of 1710 may be performed according to the methods described herein. In some examples, aspects of the operations of 1710 may be performed by a different transmission parameter receiver as described with reference to FIGS. 9 through 12.

At 1715, the UE may determine to use the at least one transmission parameter instead of the corresponding transmission parameter of the set of reference transmission parameters for the subsequent communications within the single BWP. The operations of 1715 may be performed according to the methods described herein. In some examples, aspects of the operations of 1715 may be performed by a transmission parameter determination component as described with reference to FIGS. 9 through 12.

At 1720, the UE may communicate using the at least one transmission parameter. The operations of 1720 may be performed according to the methods described herein. In some examples, aspects of the operations of 1720 may be performed by a transmission parameter communicator as described with reference to FIGS. 9 through 12.

Figure 18:
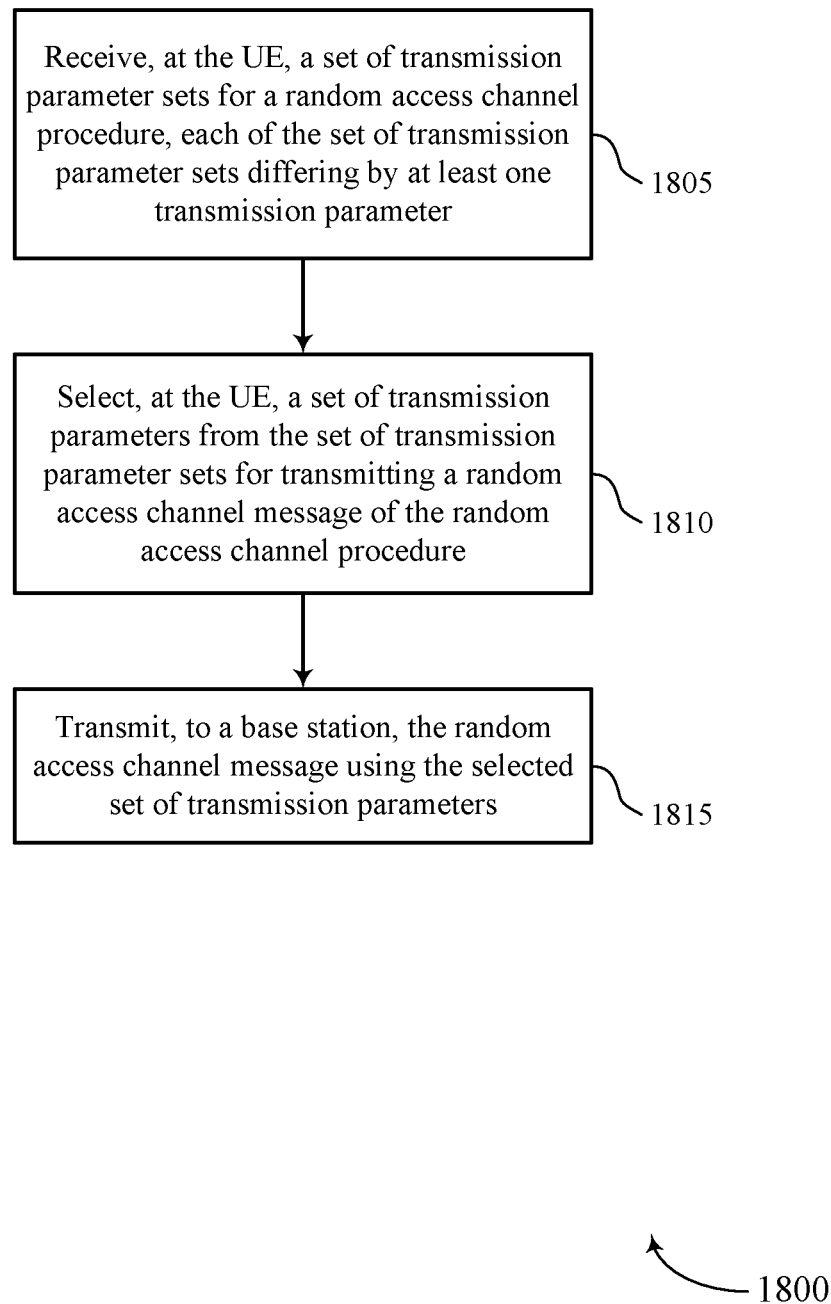

FIG. 18 shows a flowchart illustrating a method 1800 that supports signaling of transmission parameters in accordance with aspects of the present disclosure. The operations of method 1800 may be implemented by a UE 115 or its components as described herein. For example, the operations of method 1800 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may receive, at the UE, a set of transmission parameter sets for a RACH procedure, each of the set of transmission parameter sets differing by at least one transmission parameter. The operations of 1805 may be performed according to the methods described herein. In some examples, aspects of the operations of 1805 may be performed by a RACH parameter receiver as described with reference to FIGS. 9 through 12.

At 1810, the UE may select, at the UE, a set of transmission parameters from the set of transmission parameter sets for transmitting a RACH message of the RACH procedure. The operations of 1810 may be performed according to the methods described herein. In some examples, aspects of the operations of 1810 may be performed by a RACH parameter selector as described with reference to FIGS. 9 through 12.

At 1815, the UE may transmit, to a base station, the RACH message using the selected set of transmission parameters. The RACH message may include, for example, a random access preamble and an information message (e.g., data, UCI). The random access preamble may be transmitted via a random access channel, and the information message may be transmitted via a physical uplink control channel or a physical uplink shared channel. A first one of the plurality of transmission parameter sets may be associated with a first set of resources of the random access channel, a first subset of random access preambles, a first DMRS parameter, or a combination thereof. A second one of the plurality of transmission parameter sets may be associated with a second set of resources of the random access channel, a second subset of random access preambles, a second DMRS parameter, or a combination thereof. The operations of 1815 may be performed according to the methods described herein. In some examples, aspects of the operations of 1815 may be performed by a RACH transmitter as described with reference to FIGS. 9 through 12.

Figure 19:
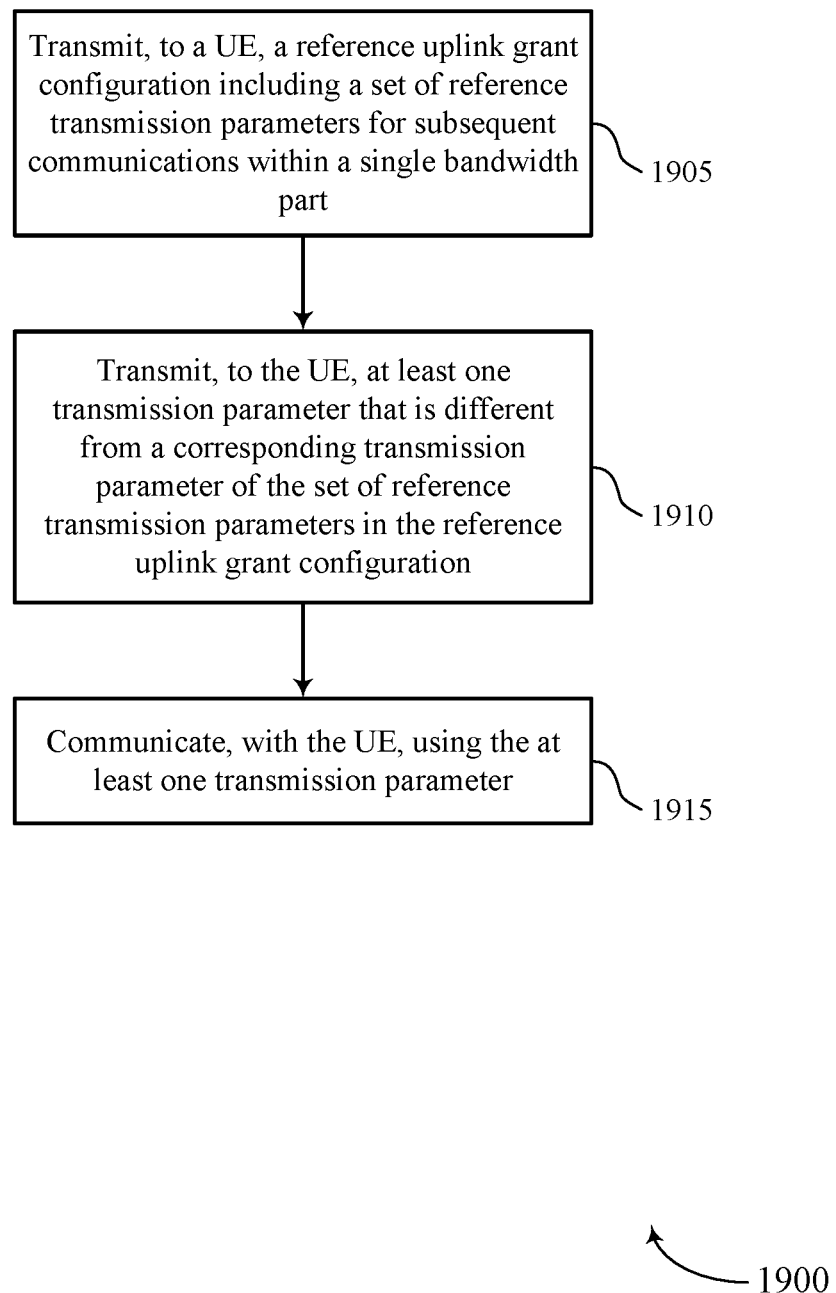

FIG. 19 shows a flowchart illustrating a method 1900 that supports signaling of transmission parameters in accordance with aspects of the present disclosure. The operations of method 1900 may be implemented by a base station 105 or its components as described herein. For example, the operations of method 1900 may be performed by a base station communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE, a reference uplink grant configuration including a set of reference transmission parameters for subsequent communications within a single BWP. The operations of 1905 may be performed according to the methods described herein. In some examples, aspects of the operations of 1905 may be performed by a reference uplink grant configuration transmitter as described with reference to FIGS. 13 through 16.

At 1910, the base station may transmit, to the UE, at least one transmission parameter that is different from a corresponding transmission parameter of the set of reference transmission parameters in the reference uplink grant configuration. The operations of 1910 may be performed according to the methods described herein. In some examples, aspects of the operations of 1910 may be performed by a different transmission parameter transmitter as described with reference to FIGS. 13 through 16.

At 1915, the base station may communicate, with the UE, using the at least one transmission parameter. The operations of 1915 may be performed according to the methods described herein. In some examples, aspects of the operations of 1915 may be performed by a transmission parameter communication component as described with reference to FIGS. 13 through 16.

Figure 20:
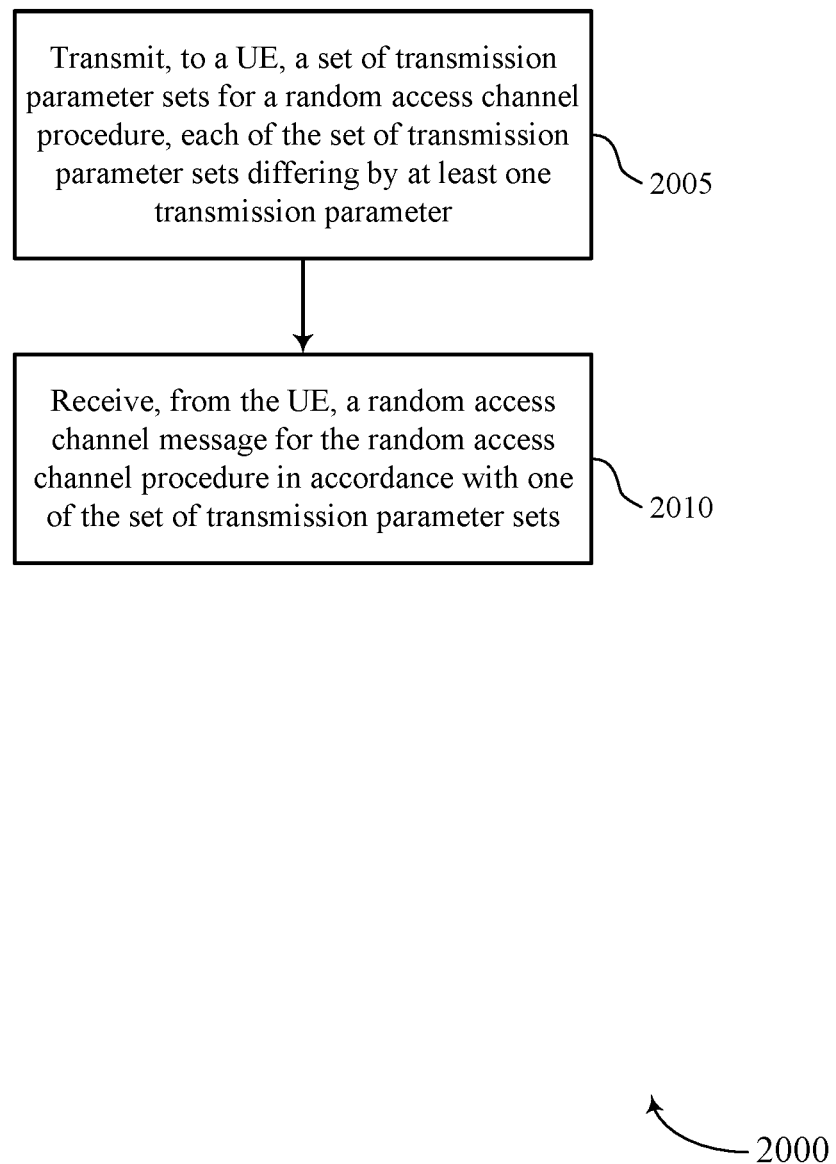

FIG. 20 shows a flowchart illustrating a method 2000 that supports signaling of transmission parameters in accordance with aspects of the present disclosure. The operations of method 2000 may be implemented by a base station 105 or its components as described herein. For example, the operations of method 2000 may be performed by a base station communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, a set of transmission parameter sets for a RACH procedure, each of the set of transmission parameter sets differing by at least one transmission parameter. The operations of 2005 may be performed according to the methods described herein. In some examples, aspects of the operations of 2005 may be performed by a RACH parameter transmitter as described with reference to FIGS. 13 through 16.

At 2010, the base station may receive, from the UE, a RACH message for the RACH procedure in accordance with one of the set of transmission parameter sets. The RACH message may include, for example, a random access preamble and an information message (e.g., data, UCI). The random access preamble may be received via a random access channel, and the information message may be received via a physical uplink control channel or a physical uplink shared channel. A first one of the plurality of transmission parameter sets may be associated with a first set of resources of the random access channel, a first subset of random access preambles, a first DMRS parameter, or a combination thereof. A second one of the plurality of transmission parameter sets may be associated with a second set of resources of the random access channel, a second subset of random access preambles, a second DMRS parameter, or a combination thereof. The operations of 2010 may be performed according to the methods described herein. In some examples, aspects of the operations of 2010 may be performed by a RACH message receiver as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving, at the UE, a plurality of transmission parameter sets for-associated with a two-step random access channel procedure, each of the plurality of transmission parameter sets comprising transmission parameters for a transmitting a first random access channel message of the two-step random access procedure, and each of the plurality of transmission sets differing by at least one transmission parameter, wherein a first transmission parameter set indicates first time-frequency resources, a first modulation and coding scheme, and a first demodulation reference signal parameter and a second transmission parameter set indicates second time-frequency resources, a second modulation and coding scheme, and a second demodulation reference signal parameter;
    selecting the first transmission parameter set or the second transmission parameter set from the plurality of transmission parameter sets associated with the two-step random access procedure for transmitting the first random access channel message of the two-step random access channel procedure; and
    transmitting, to a network access node the first random access channel message of the two-step random access procedure based on the selected transmission parameter set, wherein the first random access channel message includes a random access preamble and an information message.

2. The method of claim 1, wherein transmitting the first random access channel message further comprises:
transmitting the random access preamble via a random access channel; and
transmitting the information message via a physical uplink control channel or a physical uplink shared channel over the first time-frequency resources or the second time-frequency resources of the selected first transmission parameter set or the second transmission parameter set.

3. The method of claim 2, wherein the first transmission parameter set is associated with a first set of random access occasions of the random access channel and the second transmission parameter set is associated with a second set of random access occasions of the random access channel.

4. The method of claim 1, wherein the first transmission parameter set is associated with a first subset of random access preambles and the second transmission parameter set is associated with a second subset of random access preambles.

5. The method of claim 1, wherein the first demodulation reference signal parameter is different than the second demodulation reference signal parameter.

6. The method of claim 1, wherein selecting the first transmission parameter set or the second transmission parameter set comprises:
identifying a purpose of the two-step random access channel procedure; and
selecting the first transmission parameter set or the second transmission parameter set based at least in part on the identified purpose.

7. The method of claim 6, wherein the purpose of the two-step random access channel procedure comprises at least one of an initial access procedure, a radio resource control resume procedure, a timing advance refresh procedure, or a combination thereof.

8. The method of claim 1, wherein selecting the first transmission parameter set or the second transmission parameter set comprises:
identifying if the two-step random access channel procedure is contention based or contention free; and
selecting the first transmission parameter set or the second transmission parameter set based at least in part on the identified contention based or contention free two-step random access channel procedure.

9. The method of claim 1, wherein selecting the first transmission parameter set or the second transmission parameter set comprises:
selecting the first transmission parameter set or the second transmission parameter set based at least in part on a size of uplink control information to be transmitted in the first random access channel message.

10. The method of claim 1, further comprising:
receiving a configuration for dual connectivity communications with a primary cell and a secondary cell;
selecting the primary cell or the secondary cell for the two-step random access channel procedure;
selecting the first transmission parameter set or the second transmission parameter set for transmission of the first random access channel message of the two-step random access procedure based at least in part on which of the primary cell or the secondary cell is selected; and
transmitting the first random access channel message to the selected primary cell or secondary cell using the selected first transmission parameter set or the second transmission parameter set.

11. The method of claim 10, wherein the primary cell or secondary cell is selected based at least in part on a quality of service, a listen-before-transmit outcome, an interference measurement, coverage requirements, or a combination thereof.

12. The method of claim 10, further comprising:
indicating the selected primary cell or secondary cell using a preamble for the first random access channel message, a demodulation reference signal for the first random access channel message, random access channel resources for the first random access channel message, or a combination thereof.

13. The method of claim 1, wherein the plurality of transmission parameter sets for the random access channel procedure are received via radio resource control signaling, system information block transmissions, or specified configurations for the UE.

14. A method for wireless communications at a network access node, comprising:
transmitting, to a user equipment (UE), a plurality of transmission parameter sets associated with a two-step random access channel procedure, each of the plurality of transmission parameter sets comprising transmission parameters for a first random access channel message of the two-step random access procedure, and each of the plurality of transmission sets differing by at least one transmission parameter, wherein a first transmission parameter set indicates first time-frequency resources, a first modulation and coding scheme, and a first demodulation reference signal parameter and a second transmission parameter set indicates second time-frequency resources, a second modulation and coding scheme, and a second demodulation reference signal parameter; and
receiving, from the UE, the first random access channel message of the two-step random access channel procedure in accordance with one of the first transmission parameter set or the second transmission parameter set of the plurality of transmission parameter sets associated with the two-step random access procedure, wherein the first random access channel message includes a random access preamble and an information message.

15. The method of claim 14, wherein the random access preamble is received via a random access channel, and the information message is received via a physical uplink control channel or a physical uplink shared channel.

16. The method of claim 15, wherein the first transmission parameter set is associated with a first set of random access occasions of the random access channel and the second transmission parameter set is associated with a second set of random access occasions of the random access channel.

17. The method of claim 14, wherein the first transmission parameter set is associated with a first subset of random access preambles and the second transmission parameter set is associated with a second subset of random access preambles.

18. The method of claim 14, wherein the first demodulation reference signal parameter is different than the second demodulation reference signal parameter.

19. The method of claim 14, wherein the two-step random access channel procedure is performed for an initial access procedure, a radio resource control resume procedure, a timing advance refresh procedure, or a combination thereof.

20. The method of claim 14, wherein the two-step random access channel procedure is a contention based random access channel procedure or a contention free random access channel procedure.

21. The method of claim 14, further comprising:
transmitting, to the UE, a configuration for dual connectivity communications with a primary cell and a secondary cell; and
receiving the first random access channel message on the primary cell or secondary cell.

22. The method of claim 21, further comprising:
receiving an indication of the primary cell or secondary cell via the random access preamble, a demodulation reference signal for the first random access channel message, random access channel resources for the first random access channel message, or a combination thereof.

23. The method of claim 14, wherein the plurality of transmission parameter sets associated with the two-step random access channel procedure are transmitted via radio resource control signaling, system information block transmissions, or specified configurations for the UE.

24. An apparatus for wireless communications at a user equipment (UE), comprising:
a processor,
memory coupled with the processor; and
instructions stored in the memory and executable by the processor to cause the apparatus to:
receive, at the UE, a plurality of transmission parameter sets associated with a two-step random access channel procedure, each of the plurality of transmission parameter sets comprising transmission parameters for a transmitting a first random access channel message of the two-step random access procedure, and each of the plurality of transmission sets differing by at least one transmission parameter, wherein a first transmission parameter set indicates first time-frequency resources, a first modulation and coding scheme, and a first demodulation reference signal parameter and a second transmission parameter set indicates second time-frequency resources, a second modulation and coding scheme, and a second demodulation reference signal parameter;
select the first transmission parameter set or the second transmission parameter set from the plurality of transmission parameter sets associated with the two-step random access procedure for transmitting the first random access channel message of the two-step random access channel procedure; and
transmit, to a network access node the first random access channel message of the two-step random access procedure based on the selected transmission parameter set, wherein the first random access channel message includes a random access preamble and an information message.

25. The apparatus of claim 24, wherein the instructions to transmit the first random access channel message are executable by the processor to cause the apparatus to:
transmit the random access preamble via a random access channel; and
transmit the information message via a physical uplink control channel or a physical uplink shared channel over the first time-frequency resources or the second time-frequency resources of the selected first transmission parameter set or the second transmission parameter set.

26. The apparatus of claim 25, wherein the first transmission parameter set is associated with a first set of random access occasions of the random access channel and the second transmission parameter set is associated with a second set of random access occasions of the random access channel.

27. The apparatus of claim 24, wherein the first transmission parameter set is associated with a first subset of random access preambles and the second transmission parameter set is associated with a second subset of random access preambles.

28. The apparatus of claim 24, wherein the first demodulation reference signal parameter is different than the second demodulation reference signal parameter.

29. The apparatus of claim 24, wherein the instructions to select the first transmission parameter set or the second transmission parameter set are executable by the processor to cause the apparatus to:
identify a purpose of the two-step random access channel procedure; and
select the transmission parameter set based at least in part on the identified purpose.

30. The apparatus of claim 29, wherein the purpose of the two-step random access channel procedure comprises at least one of an initial access procedure, a radio resource control resume procedure, a timing advance refresh procedure, or a combination thereof.

31. The apparatus of claim 24, wherein the instructions to select the first transmission parameter set or the second transmission parameter set are executable by the processor to cause the apparatus to:
identify if the two-step random access channel procedure is contention based or contention free; and
select the first transmission parameter set or the second transmission parameter set based at least in part on the identified contention based or contention free two-step random access channel procedure.

32. The apparatus of claim 24, wherein the instructions to select the first transmission parameter set or the second transmission parameter set are executable by the processor to cause the apparatus to:
select the first transmission parameter set or the second transmission parameter set based at least in part on a size of uplink control information to be transmitted in the first random access channel message.

33. The apparatus of claim 24, wherein the instructions are further executable by the processor to cause the apparatus to:
receive a configuration for dual connectivity communications with a primary cell and a secondary cell;
select the primary cell or the secondary cell for the random access channel procedure;
select the first transmission parameter set or the second transmission parameter set for transmission of the first random access channel message based at least in part on which of the primary cell or the secondary cell is selected; and
transmit the first random access channel message to the selected primary cell or secondary cell using the selected first transmission parameter set or the second transmission parameter set.

34. The apparatus of claim 33, wherein the primary cell or secondary cell is selected based at least in part on a quality of service, a listen-before-transmit outcome, an interference measurement, coverage requirements, or a combination thereof.

35. The apparatus of claim 33, wherein the instructions are further executable by the processor to cause the apparatus to:
indicate the selected primary cell or secondary cell using a preamble for the first random access channel message, a demodulation reference signal for the first random access channel message, random access channel resources for the first random access channel message, or a combination thereof.

36. The apparatus of claim 24, wherein the plurality of transmission parameter sets associated with the two-step random access channel procedure are received via radio resource control signaling, system information block transmissions, or specified configurations for the UE.

37. An apparatus for wireless communications at a network access node, comprising:
a processor,
memory coupled with the processor; and
instructions stored in the memory and executable by the processor to cause the apparatus to:
transmit, to a user equipment (UE), a plurality of transmission parameter sets associated with a two-step random access channel procedure, each of the plurality of transmission parameter sets comprising transmission parameters for a first random access channel message of the two-step random access procedure, and each of the plurality of transmission sets differing by at least one transmission parameter, wherein a first transmission parameter set indicates first time-frequency resources, a first modulation and coding scheme, and a first demodulation reference signal parameter and a second transmission parameter set indicates second time-frequency resources a second modulation and coding scheme, and a second demodulation reference signal Parameter; and
receive, from the UE, the first random access channel message of the two-step random access channel procedure in accordance with one of the first transmission parameter set or the set second transmission parameter set of the plurality of transmission parameter sets associated with the two-step random access procedure, wherein the first random access channel message includes a random access preamble and an information message.

38. The apparatus of claim 37, wherein the random access preamble is received via a random access channel, and the information message is received via a physical uplink control channel or a physical uplink shared channel.

39. The apparatus of claim 38, wherein the first transmission parameter set is associated with a first set of random access occasions of the random access channel and the second transmission parameter set is associated with a second set of random access occasions of the random access channel.

40. The apparatus of claim 37, wherein the first transmission parameter set is associated with a first subset of random access preambles and the second transmission parameter set is associated with a second subset of random access preambles.

41. The apparatus of claim 37, wherein the first demodulation reference signal parameter is different than the second demodulation reference signal parameter.

42. The apparatus of claim 37, wherein the random access preamble is a contention based random access preamble or a contention free random access preamble.

43. The apparatus of claim 37, wherein the instructions are further executable by the processor to cause the apparatus to:
transmit, to the UE, a configuration for dual connectivity communications with a primary cell and a secondary cell; and
receive the first random access channel message on the primary cell or secondary cell.

44. The apparatus of claim 43, wherein the instructions are further executable by the processor to cause the apparatus to:
receive an indication of the primary cell or secondary cell via a preamble of the first random access channel message, a demodulation reference signal for the first random access channel message, random access channel resources for the first random access channel message, or a combination thereof.

45. The apparatus of claim 37, wherein the instructions to transmit the random access channel message are executable by the processor to cause the apparatus to:
receive the random access preamble via a random access channel; and
receive the information message via an information channel.

46. The apparatus of claim 45, wherein the information channel comprises a physical uplink control channel or a physical uplink shared channel.

47. The apparatus of claim 37, wherein the plurality of transmission parameter sets of associated with the two-step random access channel procedure are transmitted via radio resource control signaling, system information block transmissions, or specified configurations for the UE.

* * * * *

UNITED STATES PATENT AND TRADEMARK OFFICE
CERTIFICATE OF CORRECTION

PATENT NO. : 11,979,912 B2
APPLICATION NO. : 16/783149
DATED : May 7, 2024
INVENTOR(S) : Sarkis et al.

It is certified that error appears in the above-identified patent and that said Letters Patent is hereby corrected as shown below:

In the Claims

Claim 1, Column 62, Lines 46 and 47 should read:
"sets associated with a two-step random access channel procedure, each of the plurality of transmission"
Claim 1, Column 62, Line 49 should read:
"transmitting a first random access channel message of"
Claim 1, Column 62, Line 51 should read:
"plurality of transmission parameter sets differing by at least one"
Claim 1, Column 62, Line 50 should read:
"the two-step random access channel procedure, and each of the"
Claim 1, Column 62, Lines 63 and 64 should read:
"random access channel procedure for transmitting the first random access channel message of the two-step random"
Claim 1, Column 63, Line 1 should read:
"channel procedure based on the selected transmission parameter"

Claim 10, Column 63, Lines 65 and 66 should read:
"random access channel message of the two-step random access channel procedure based at least in part on which of"

Claim 13, Column 64, Line 19 should read:
"transmission parameter sets for the two-step random access channel"

Claim 14, Column 64, Lines 30 and 31 should read:
"of the two-step random access channel procedure, and each of the plurality of transmission parameter sets differing by at least"
Claim 14, Column 64, Lines 44 and 45 should read:
"of the plurality of transmission parameter sets associated with the two-step random access channel procedure,"

Signed and Sealed this
Twelfth Day of November, 2024

Katherine Kelly Vidal
*Director of the United States Patent and Trademark Office*

CERTIFICATE OF CORRECTION (continued)
U.S. Pat. No. 11,979,912 B2

Claim 24, Column 65, Lines 37 through 40 should read:
"for transmitting a first random access channel message of the two-step random access channel procedure, and each of the plurality of transmission parameter sets differing by at least one transmission parameter, wherein"
Claim 24, Column 65, Line 51 should read:
"step random access channel procedure for transmitting the"
Claim 24, Column 65, Line 56 should read:
"access channel procedure based on the selected transmission"

Claim 33, Column 66, Line 56 should read:
"two-step random access channel procedure;"

Claim 37, Column 67, Lines 30 and 31 should read:
"channel procedure, and each of the plurality of transmission parameter sets differing by at least one transmission parameter,"
Claim 37, Column 67, Lines 35 and 36 should read:
"signal parameter and a second transmission parameter set indicates second time-frequency resources, a"
Claim 37, Column 67, Line 38 should read:
"demodulation reference signal parameter; and"
Claim 37, Column 67, Lines 41 and 42 should read:
"procedure in accordance with one of the first transmission parameter set or the second transmission"
Claim 37, Column 67, Line 45 should read:
"channel procedure, wherein the first random access channel"

Claim 47, Column 68, Line 47 should read:
"transmission parameter sets associated with the two-step"